United States Patent [19]
Harada et al.

[11] Patent Number: 5,721,583
[45] Date of Patent: Feb. 24, 1998

[54] INTERACTIVE TELEVISION SYSTEM FOR IMPLEMENTING ELECTRONIC POLLING OR PROVIDING USER-REQUESTED SERVICES BASED ON IDENTIFICATION OF USERS OR OF REMOTE CONTROL APPARATUSES WHICH ARE EMPLOYED BY RESPECTIVE USERS TO COMMUNICATE WITH THE SYSTEM

[75] Inventors: Takenosuke Harada, Kawasaki; Ryota Tsukidate, Tokyo, both of Japan

[73] Assignee: Matsushita Electric Industrial Co., Ltd., Osaka, Japan

[21] Appl. No.: 756,773

[22] Filed: Nov. 26, 1996

[30] Foreign Application Priority Data

Nov. 27, 1995 [JP] Japan .................................. 7-307081
Nov. 27, 1995 [JP] Japan .................................. 7-307082

[51] Int. Cl.$^6$ .................................................. H04N 7/173
[52] U.S. Cl. .......................... 348/12; 348/13; 348/7; 348/1; 455/5.1
[58] Field of Search ............................ 348/1, 2, 6, 7, 348/10, 12, 13, 734; 455/2, 3.1, 3.2, 4.1, 4.2, 5.1, 6.1, 6.2; H04N 7/173

[56] References Cited

U.S. PATENT DOCUMENTS

| | | |
|---|---|---|
| 4,546,382 | 10/1985 | McKenna et al. . |
| 4,930,011 | 5/1990 | Kiewit ................................. 348/2 |
| 5,155,591 | 10/1992 | Wachob . |
| 5,497,185 | 3/1996 | Dufresne et al. ....................... 348/2 |
| 5,638,113 | 6/1997 | Lappington ............................ 348/12 |

FOREIGN PATENT DOCUMENTS

| | | |
|---|---|---|
| 62-258541 | 11/1987 | Japan . |
| 5-250080 | 9/1993 | Japan . |

*Primary Examiner*—Michael H. Lee
*Assistant Examiner*—Nathan J. Flynn
*Attorney, Agent, or Firm*—Lowe, Price, LeBlanc & Becker

[57] ABSTRACT

An interactive television system which can provide services such as entertainment programs to users or conduct electronic polls of users, formed of a central computer installation, a plurality of terminal apparatuses each bidirectionally communicating with the central computer installation via a CATV network and each providing video/audio inputs to a display apparatus, with each of the terminal apparatuses being linked to one or more remote control apparatuses whereby users can request services or participate in polling, and in which any message data such as a service request which is issued by a remote control apparatus is automatically accompanied by identifier information, read out from a memory of the remote control apparatus, for identifying that remote control apparatus, and may also be accompanied by personal information concerning a registered user of the remote control apparatus. User recognition can be implemented by an arrangement such as a plug-in IC card interface section or fingerprint recognition section, for enabling restriction of each remote control apparatus to use by only a specific registered user, or to enable only a specific registered user to access certain services.

30 Claims, 44 Drawing Sheets

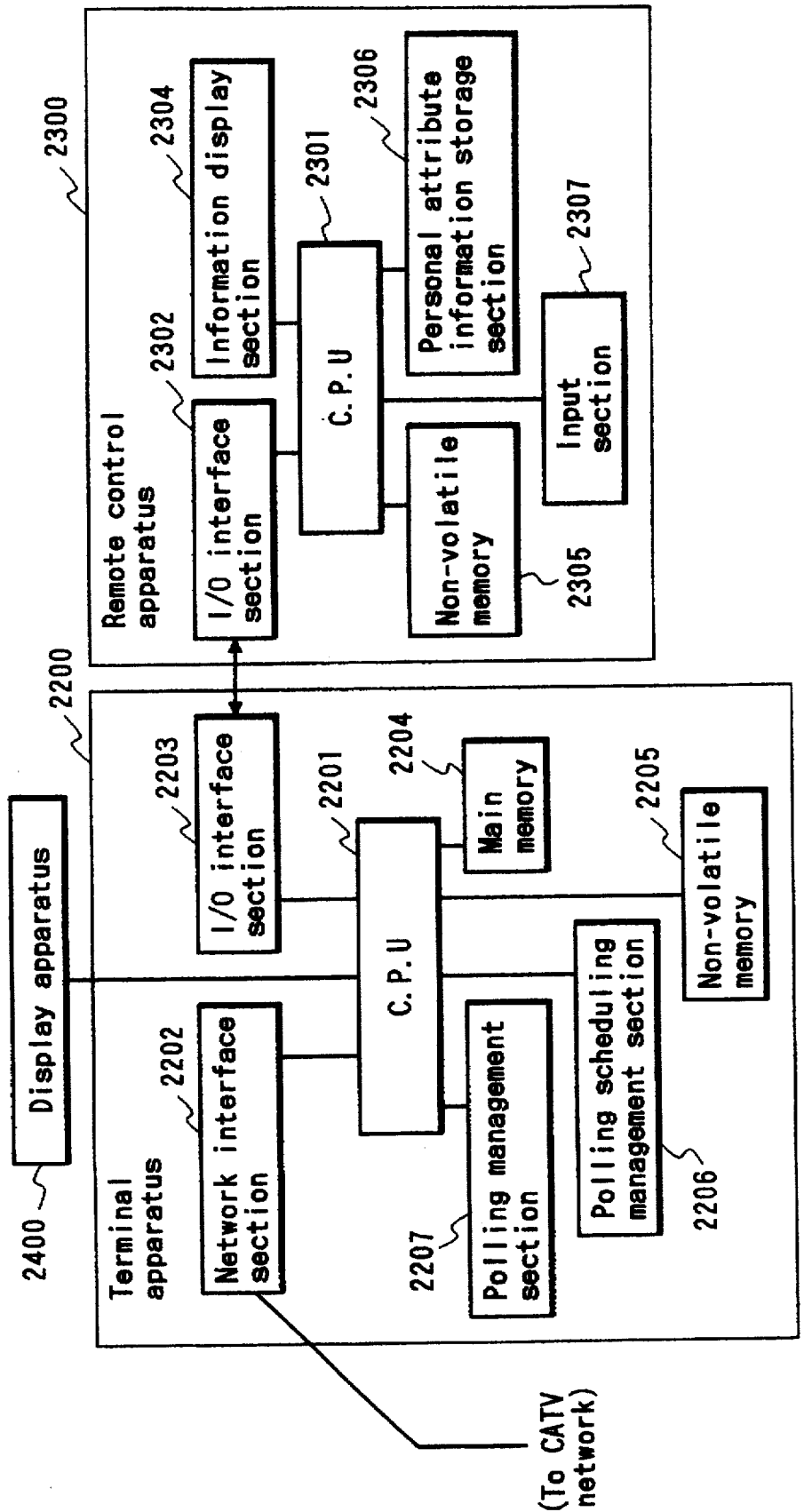

FIG. 4

| Personal attribute item | Item data |
|---|---|
| Name | John Jones |
| Address | 000 State St., Sacramento, CAL. |
| Sex | Male |
| Age | 40 |
| Date of birth | 1/1/1945 |
| Profession | Self-employed |
| Place of birth | Utah |
| Hobbies | Chess |

FIG. 5

| Terminal apparatus I.D. number | Remote control apparatus I.D. number | User name | Address | Telephone number |
|---|---|---|---|---|
| 000001 | R0000001 | John Jones | XXX State St., Sacramento, CAL. | 510-XXX-YYYY |
| 000001 | R0000002 | Janet Jones | XXX State St., Sacramento, CAL. | 510-XXX-YYYY |
| 000001 | R0000003 | Jill Jones | XXX State St., Sacramento, CAL. | 510-XXX-YYYY |
| 000002 | R0000004 | David Black | YYYY South St., Seattle, WASH. | 210-XXX-YYYY |
| 000002 | R0000005 | Donna Black | YYYY South St., Seattle, WASH. | 210-XXX-YYYY |
| 000002 | R0000006 | Delia Black | YYYY South St., Seattle, WASH. | 210-XXX-YYYY |

FIG. 6

| Polling request data | Polling eligibility conditions | Personal attribute information attachment list | Polling validity term information |

FIG. 7

| Remote control apparatus I.D. number | Personal attribute information | Polling response data |

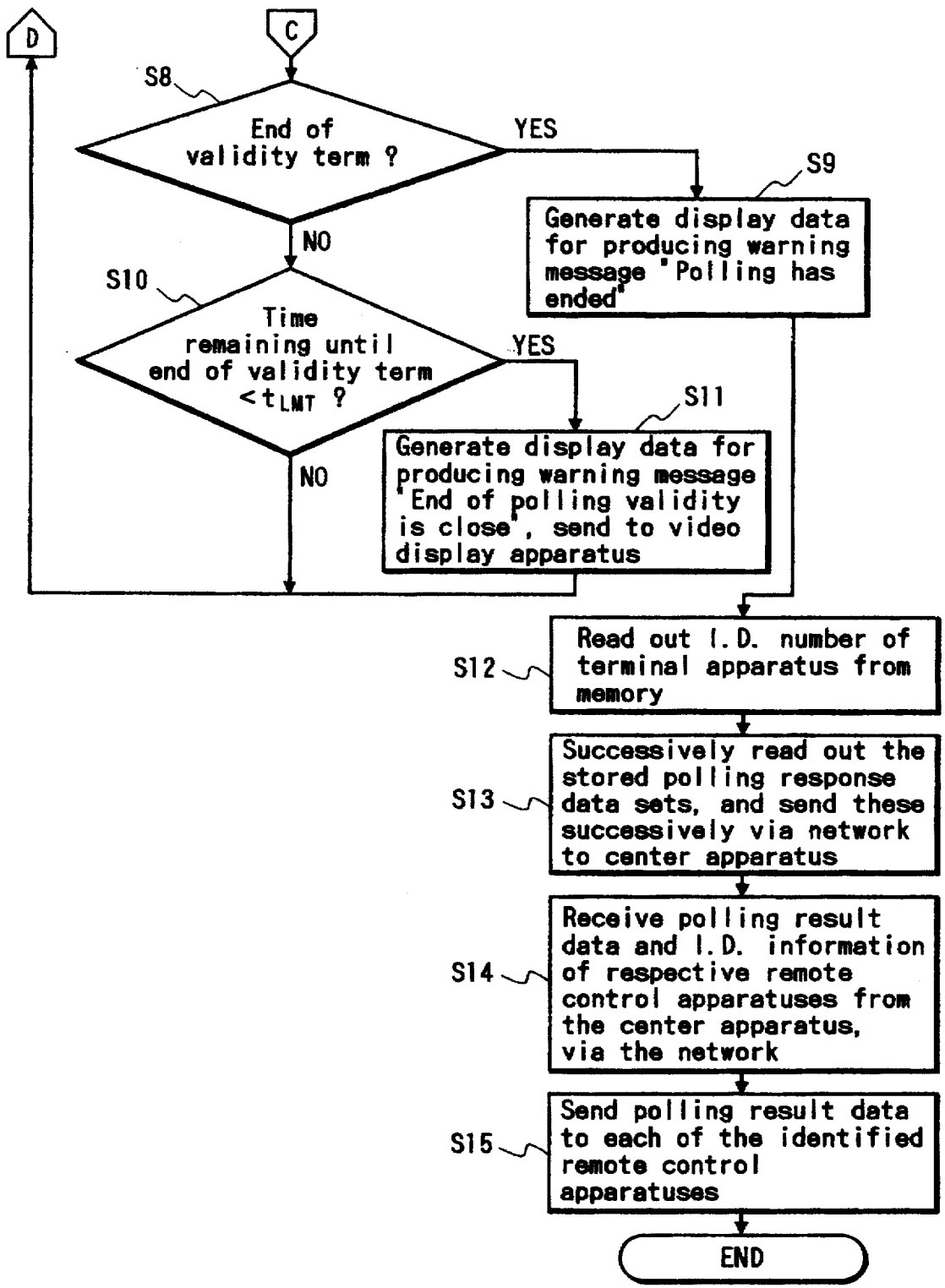

FIG. 13

| Polling position | Polling response arrival time | Response time interval (seconds) |
|---|---|---|
| 1 | 00:03.30 | 0.3 |
| 2 | 00:03.00 | 0.5 |
| 3 | 00:03.10 | 0.7 |
| 4 | 00:30.40 | 1 |

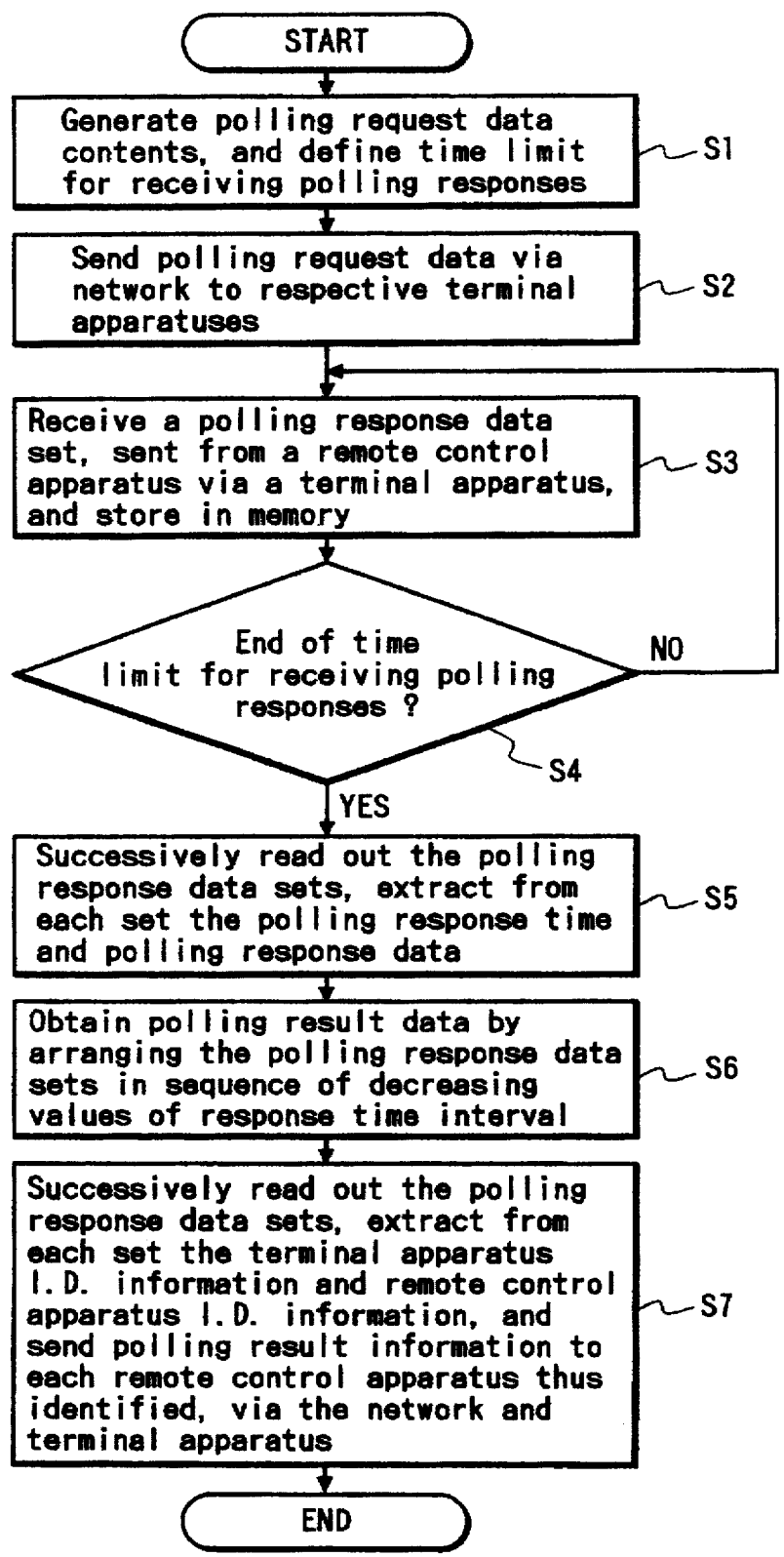

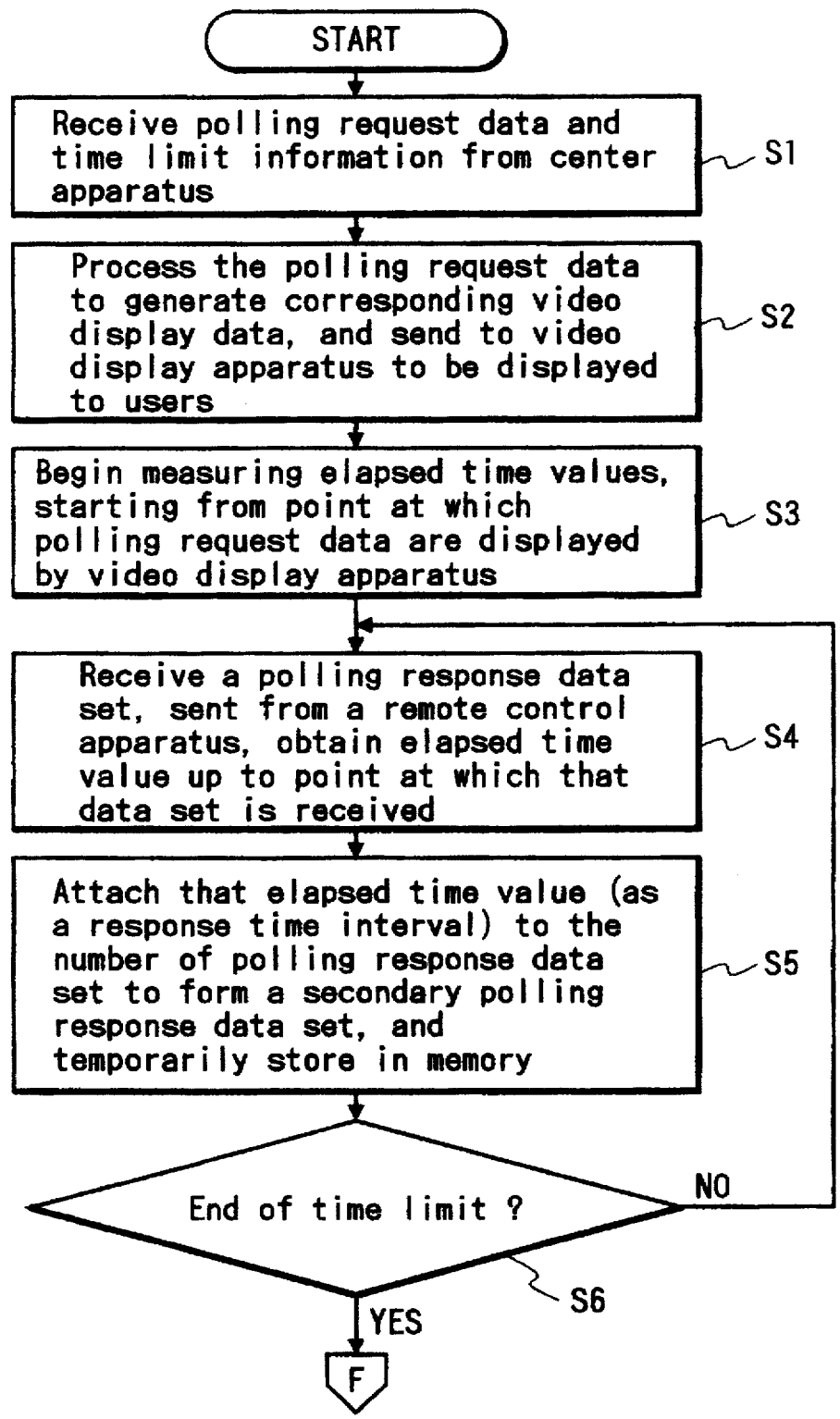

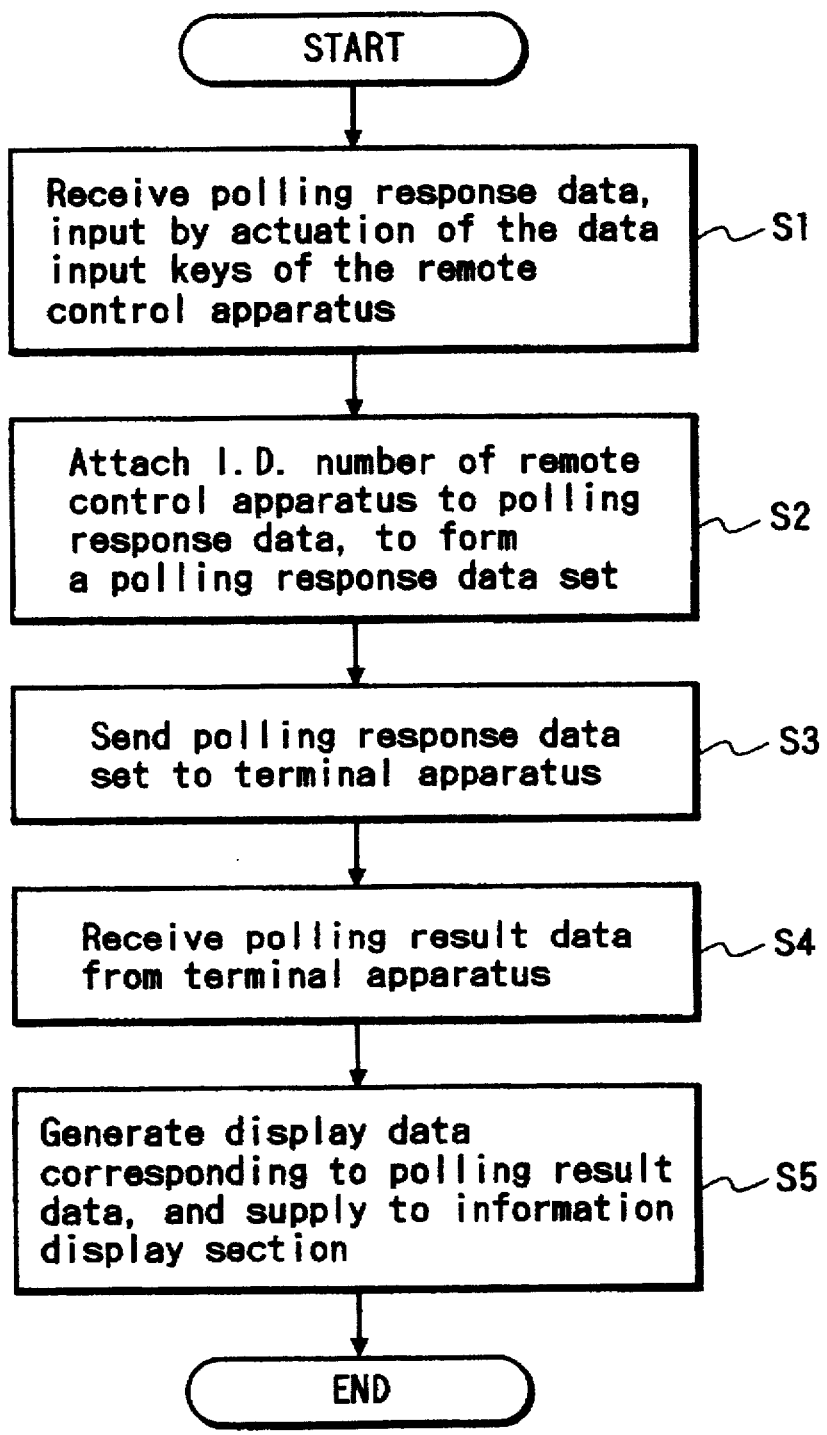

INTERACTIVE TELEVISION SYSTEM FOR IMPLEMENTING ELECTRONIC POLLING OR PROVIDING USER-REQUESTED SERVICES BASED ON IDENTIFICATION OF USERS OR OF REMOTE CONTROL APPARATUSES WHICH ARE EMPLOYED BY RESPECTIVE USERS TO COMMUNICATE WITH THE SYSTEM

BACKGROUND OF THE INVENTION

1. Field of the Invention

The present invention relates to an improved interactive television system whereby each user can employ a remote control apparatus to request specific services or to participate in electronic polling.

Basically, such a system employs identification of respective remote control apparatuses which are actuated by users, and may also employ information identifiying users, or personal information relating to users, for purposes such as determining the validity of polling responses or the eligibility of respective users to participate in a poll or request a specific service.

2. Description of the Prior Art

In the prior art there have been proposals for various types of interactive television systems whereby services such as television programs or films are selectively distributed, on request from users, from a centralized computer installation (referred to in general in the following as a center apparatus) via a digital CATV (cable television) network to respective terminal apparatuses of requesting users. The center apparatus basically combines the functions of a computer network server apparatus, for sending/receiving data to/from remote terminal apparatuses via the network in accordance with a predetermined data communication protocol, together with functions for generating (in response to requests sent via the network from users) services such as television programs, e.g. by selectively playing pre-recorded television programs or movies from a mass-storage recording medium, with the resultant service data being sent via the network to respective terminal apparatuses of requesting users, to be displayed and made audible to the users. Each terminal apparatus is a computer installation which functions as a client installation with respect to the center apparatus, i.e. requests and receives service data from the center apparatus, with the data being transferred via the network by utilizing an appropriate digital data communication protocol. The users of a terminal apparatus are provided with one or more remote control apparatuses, which can be actuated to send request data via the local terminal apparatus to the center apparatus, for requesting desired services.

Furthermore, some television programs consist of (or may include) polls, e.g. whereby a survey can be taken of opinions of the users, or of a certain category of users. That is to say, it is possible to utilize such an interactive television system to provide the functions of an electronic polling system. In the following description, it should be understood that the term "polling" is used in a very general sense, which covers such concepts as a television quiz program in which users are asked to participate, an opinion survey (which may form example constitute only a portion of a television entertainment program), etc. Thus the interactive television system may for example be temporarily put to use as an electronic polling system, during part of a television entertainment program which is provided to users of the interactive television system (as a service) on request. It should thus be understood that there is not necessarily any clear distinction between a "an interactive television system which provides services to users on demand" and "an interactive television system which can be used as an electronic polling system".

A typical example of how a CATV type of interactive television system might be used as an electronic polling system in the prior art will first be described, referring to FIG. 40, which shows the basic configuration of such a system. To simplify the drawing, the CATV network has been omitted, and only a single terminal apparatus is shown. In FIG. 40, when a poll is to be executed, e.g. to take an opinion survey of the system users, polling requests are sent from a center apparatus 11001 to a terminal apparatus 11002, and displayed by a display apparatus 11003 to the users of that terminal apparatus. In order to send their polling responses, the user or users of the terminal apparatus 11002 must use a telephone 1104 which can connect to the center apparatus 11001 via a public telephone line, i.e the user must dial a specified telephone number, wait for a response from the center apparatus, then inform the center apparatus of his/her response to the poll. A system using such a configuration is described for example in Japanese patent SHO 62-258541.

However such a procedure for responding to a polling request is inconvenient for the users. In addition, such a system causes time delays, which are an obstacle to providing effective and efficient polling. Furthermore, since there is no way of confirming who has actually sent a polling response, it is possible for the same person to send a polling response two or three times in succession. Thus, it is not possible to ensure that fair and unbiased polling results can be obtained.

A second problem arises for example in the case of a survey such as a quiz program, in which results are determined based on the time taken for respective polling responses to arrive, e.g. with the person who responds most rapidly to a question being the winner. In that case, respective amounts of transmission delays of the various telephone system paths used to send the polling responses, which the users are not aware of, will affect the times taken for polling responses to be received. This is an obstacle to achieving polling that is fair.

A third problem is as follows. In general, a plurality of users may be accessing a single terminal apparatus at the same time. For example, where the terminal apparatus serves a single household, various members of the family may be watching television together, i.e. may be using the terminal apparatus at the same time. In some cases it would be desirable to have a capability for separately notifying each of such users of the results which occur from their sending of a polling response. As an example, the system may for some reason judge that a polling response sent by one user is not valid, and it would be desirable for the system to be able to individually notify the user in question of this fact. However such a function is not practicable with the remote control apparatuses used in prior types of interactive television system, since the remote control apparatuses do not have a bidirectional communication function which can send information from the system to specifically identified remote control apparatuses, to be displayed thereby.

A fourth problem arises with regard to storing personal attribute information of users of an interactive television system (in the following, the term "personal attribute information" will be used in a very general sense, to signify any information relating to a user, such as age, sex, home address, telephone number, etc.). In some applications, for example in order to be able to effectively interpret the results of a survey which is performed by electronic polling using an interactive television system, is is desirable to have some personal attribute information available at the center apparatus. In that way it becomes possible for example to separately totalize polling results in various different categories of users, e.g. categorized in terms of age, in terms of area of residence, etc. However if comprehensive personal attribute information of users is held stored in a database at the center apparatus, then such personal information will be constantly available to any individuals who have access to the database at the center apparatus. Thus, there is a danger of violation of user privacy.

In addition, if comprehensive personal attribute information of the users held stored in that way, the problem arises that it becomes difficult to ensure that such information is kept continuously up-to-date.

As a further problem, the greater the number of users, the greater will become the amount of such personal attribute information that must be held stored at the center apparatus, so that an excessive information storage load may become concentrated on the center apparatus.

Furthermore even if such comprehensive personal attribute information were to be held stored by the center apparatus, it would be difficult to effectively use such information in evaluating the results of polling, e.g. for totalizing the results of a survey within each of a number of different categories of user. In order to achieve such a function it would be necessary to ensure that each user, when sending a polling response via telephone as described above, also accurately identifies herself/himself, i.e. so that the polling response can be linked to a corresponding set of personal attribute information for that user which is held stored at the center apparatus.

Yet another problem is as follows. If users who are not actually eligible to participate in the polling are permitted to take part, then the polling results may not provide the desired information (for example, information concerning the opinions of a certain specific category of the users). Moreover, if such non-eligible user participation occurs to any substantial extent, then the overall level of communication traffic between the center apparatus and the various terminal apparatuses of the system will be increased. In the prior art, it has not been possible to ensure that only responses from eligible users will be accepted by the system.

Furthermore, in the prior art when an interactive television system is used as an electronic polling system, management of the polling responses is executed only only at the center apparatus. As a result, the problem arises that there may be an excessive load placed on the data-processing functions of the center apparatus, particularly during those times when responses to a poll are being received.

A further problem is as follows. For practical reasons, when conducting polling by using an interactive television system as an electronic polling system, it is necessary to set a time limit within which users must respond to polling request data which are sent from the center apparatus to the various terminal apparatuses (where the term "polling request data" as is used herein in the general sense of signifying data expressing the question or questions which the users will be asked to respond to). If for some reason a user does not respond immediately to that polling request data, then it is possible that the user will not notice or will forget the time limit that has been set for responding to the poll. This may results in the loss of the right to take part in the polling, for some users, and may cause a reduction of the total number of valid polling responses that are obtained.

Yet another problem of the prior art, when using an interactive television system as an electronic polling system, is that it has not been possible to ensure the validity of polling responses which are sent from the remote control apparatuses. Specifically, it has not been possible to ensure that polling responses are received by the center apparatus only from individuals who satisfy certain predetermined conditions.

In addition to the above, there is a basic disadvantage of such a prior art system, in that (for example, in a typical household) although there may be a plurality of users who utilize the same terminal apparatus, by operating respective ones of a plurality of remote control apparatuses, it has only been possible to obtain a single response to a polling request from each terminal apparatus. This is due to the fact that, in the prior art, it has not been possible for the system to separately identify respective responses that are sent from the various different remote control apparatuses of a terminal apparatus.

As well as such problems which have arisen in the prior art with respect to the use of an interactive television system as an electronic polling system, various other problems occur with respect to use of the remote control apparatuses by users for requesting services to be sent to a terminal apparatus from the center apparatus. For example, there may be certain data (e.g. relating to a specific terminal apparatus) such as initial setting data, which should only be accessible (for the purpose of changing the data contents) by a certain authorized user or by a specific group of users. However in the prior art, even where changing of such data can be executed only by actuation of a specific remote control apparatus, it has not been possible to prevent unauthorized tampering with such data by persons who may have access to the remote control apparatus. This may result in accidental destruction of important data. In addition, where personal attribute information for users is held stored at a center apparatus as described hereinabove, it may be possible for such data to be accidentally altered or destroyed by an unauthorized individual who obtains the use of a remote control apparatus which should only be available to a specific authorized user.

Another problem has been that, with respect to providing services to users on demand, such as transmitting entertainment programs, movies, etc., to respective terminal apparatuses from the center apparatus, it has not been possible to control the selection of such services in accordance with the particular user or category of user who requests the service. As an example, in the case of a terminal apparatus which is installed in an ordinary household, it will in general be undesirable for a child to be able to request any arbitrary service that is available from the center apparatus, such as movies for which a fee must be paid by the user, or entertainment programs which are unsuitable for viewing by children. However in the prior art there has been no simple way in which this can be prevented. That is to say, it would be desirable to ensure that the type of service which is provided by a terminal apparatus to the users of its remote control apparatuses is selectively controlled in accordance with various different categories of users, e.g. adults and children.

As a related problem, it has not been possible to reliably ensure that certain services which should be available only to a specific individual user (for example, access to the personal electronic mail of that user, sent from the center apparatus to the terminal apparatus of that user) and which can be requested by operation of a remote control apparatus, will in fact be made available only to the appropriate individual, when a number of different individuals can use remote control apparatuses to communicate with that same terminal apparatus.

Yet another problem has been the difficulty and inconvenience which arises for users in selecting a particular service, from among a wide range of services which may be available from the center apparatus. In the prior art, such selection has generally been executed based on a multi-level menu, i.e. with the user having to actuate the remote control apparatus to select successive menu sections or pages, while viewing the displayed menu contents, until a desired service item is found, whereupon the user can actuate the remote control apparatus such as to send data specifying that item, from the remote control apparatus via the terminal apparatus to the center apparatus. This can be especially troublesome in the case of on-line shopping, for example, if the user wishes to locate and purchase a number of different items, and must execute a number of actuations of the remote control apparatus to successively call up and scan through a number of different menu pages to accomplish this.

SUMMARY OF THE INVENTION

It is an objective of the present invention to overcome the problems of the prior art set out hereinabove.

Specifically, in relation to an interactive television system which is utilized as an electronic polling system, it is a first objective of the present invention to prevent multiple polling responses from the same user.

A second objective is to enable the polling to be free from effects of delay times of respective data transmission paths over which polling requests from the system and polling responses from users must travel. A third objective is to enable users to be individually notified of polling results, i.e. to enable specific result information to be supplied to only specific users.

A fourth objective is to ensure the privacy of users, by ensuring that detailed personal information of users is not held fixedly stored in a computer installation which could be accessed by persons other than the respective users, but also ensuring that such information can be made available for the purpose of categorizing polling results obtained from the users, so that the polling results can be effectively evaluated and used.

A sixth objective is to minimize the quantity of data which must be transferred within the interactive television system during polling.

A seventh objective is to enable the users' polling rights to be effectively utilized, by ensuring as far as possible that users will not inadvertently lose the right to participate in a poll.

An eighth objective is to provide an interactive television system which can provide various services on demand from users, while ensuring that specific users, or specific categories of users, can be accurately identified by the system. Such a system can thereby determine, in accordance with the particular user or category of user, the types of service which will be provided to a user in response to a request that is input to the system by using a remote control apparatus.

A ninth objective is to provide an interactive television system in which identification of respective users or respective remote control apparatuses by the system is possible, and whereby information for use in identifying a user or a remote control apparatus can be sent to the system from an remote control apparatus in encrypted code form, to thereby ensure improved security.

A tenth objective of the invention is to provide an interactive television system for supplying services to users on demand, whereby a restriction control code can be superimposed on data of a specific service which is provided to a user by the system, and whereby, when such a restriction control code is superimposed on the service data, such service data will be prevented from being made visible/ audible to the user unless the system has identified the user as being within a category of users who are authorized to receive that service.

An eleventh objective of the invention is to provide an interactive television system for supplying services to users on demand, whereby it becomes unnecessary for a user to execute repetitive data input operations in relation to successive displayed menu pages, in order to locate a desired service within a large number of services which are available from the interactive television system and to input to the system a request for such a desired service.

To achieve the above objectives, the present invention provides an interactive television system formed of a center apparatus, a plurality of terminal apparatuses which can perform bidirectional communication with the center apparatus via a data communication network capable of transmitting video data, such as a CATV network, whereby it a basic feature of the present invention that each remote control apparatus is assigned an identifier, e.g. an identifier number, and each terminal apparatus is also assigned an identifier, enabling the center apparatus to identify a remote control apparatus which originates a request for a service or sends a polling response, and whereby the center apparatus can send appropriate service data to the terminal apparatus corresponding to the originating remote control apparatus or can send messages directed to the users of specific remote control apparatuses. In the following description and in the appended claims, the term "message data set" will be used as a general term to refer to a data set which is sent from a remote control apparatus to a terminal apparatus or from a terminal apparatus to the center apparatus, consisting of (at least) polling request data with the identifier of the originating remote control apparatus attached thereto, or consisting of service request data with the identifier of the originating remote control apparatus attached thereto.

Preferably, the identifiers assigned to the remote control apparatuses and to the terminal apparatuses are respectively unique within the system, while the center apparatus holds information which relates the remote control apparatus identifiers to their respective terminal apparatus identifiers. In that case, it is unnecessary for the terminal apparatus identifier to be attached to data which are sent from a remote control apparatus via its terminal apparatus to the center apparatus. However the center apparatus must store information relating each remote control apparatus identifier to the identifier of the corresponding terminal apparatus. Such an arrangement is assumed in the various embodiments of the invention described hereinafter. However that is not essential, and it would be equally possible to ensure only that the terminal apparatus identifiers are unique within the system, and to arrange that when data are sent from a remote control apparatus via its terminal apparatus to the center apparatus, both the remote control apparatus identifier and terminal apparatus identifier are attached. In that case, it becomes unnecessary for the center apparatus to store the aforementioned relationships between remote control apparatus identifiers and terminal apparatus identifiers, but it would be necessary for the center apparatus to receive, attached to each message data set (i.e. a polling response data set or a service request data set) received from a terminal apparatus, both the remote control apparatus identifier and the terminal apparatus identifier, so that the center apparatus can send appropriately addressed data in response to that message data set.

Since the remote control apparatus identifier is always attached to message data which are sent by a user to the center apparatus, then if it can be assumed that each remote control apparatus will only be used by a specific user, or by one of a specific category of users, the center apparatus can identify each user who originates such message data, or can ascertain that the user falls within a predetermined category. However it is possible that an remote control apparatus may be usable by a plurality of different user, so that such identification is not reliable. For that reason, according to another aspect of the present invention, each remote control apparatus can be provided with user identification means. Such means can include key input means for a user to input a predetermined code or password, and means for recognizing that code or password. Alternatively, each remote control apparatus can be provided with fingerprint recognition means, or voice pattern recognition means, and can store data for use in identifying fingerprint or voice pattern of a registered user.

Each remote control apparatus can also include means for storing personal information relating to a registered user, and means for attaching that information to message data which is input by the user, to be sent to the center apparatus, while no such personal information are sent to the center apparatus when message data are input by some other user, i.e. a non-authorized user. Alternatively, it can be arranged that message data which are input by a user can only be sent from the remote control apparatus to the center apparatus if the user has been recognized by the aforementioned identification means.

More specifically, according to a first basic aspect, the invention provides an interactive television system comprising a center apparatus, a plurality of terminal apparatuses, a plurality of display apparatus and a plurality of remote control apparatuses, the terminal apparatuses being respectively configured for bidirectional data communication with the center apparatus via a digital data communication network and each configured for receiving data by a wireless communication link from at least a corresponding one of the remote control apparatuses and for supplying to a corresponding one of the display apparatuses, data sent thereto from the center apparatus;
wherein
each remote control apparatus comprises means for input of message data by a user, means for storing a predetermined remote control apparatus identifier, means for reading out and attaching at least the remote control apparatus identifier to the user message data to form a message data set, and means for sending the message data set via the wireless communication link to the terminal apparatus,
each terminal apparatus comprises means for storing a predetermined terminal apparatus identifier, means for receiving a message data set which is sent from a remote control apparatus, and means for sending the message data set to the center apparatus via the data communication network and means for receiving data sent from the center apparatus via the data communication network and for supplying at least a part of the received data to a corresponding one of the display apparatuses in a form suitable for display thereby, and the center apparatus comprising means for storing data which relate each of the remote control apparatus identifiers to the terminal apparatus identifier of a corresponding one of the terminal apparatuses, means for receiving the message data set sent from a terminal apparatus, means for extracting the remote control apparatus identifier and the user message data from the message data set, means for generating resultant data in response to the user message data, and means for sending the resultant data via the network to the terminal apparatus having a terminal apparatus identifier which corresponds to the remote control apparatus identifier contained in the received message data set.

With such a system, the wireless communication link which connects each remote control apparatus to a terminal apparatus can be a bidirectional data communication link and each remote control apparatus can include data display means. The resultant data which are sent by the center apparatus to a terminal apparatus may include user-directed data which are directed to a specific remote control apparatus as designated by a remote control apparatus identifier, and wherein terminal apparatus may comprise means for supplying the user-directed data to the specific remote control apparatus via the wireless communication link, to be displayed by the data display means of the remote control apparatus.

Alternatively, the center apparatus comprises means for judging each received message data set in accordance with predetermined criteria, and for selectively generating, based on results of the judgement, the user-directed data which are to be sent to a remote control apparatus corresponding to a remote control apparatus identifier contained in the received message data set.

As a further alternative, such a system can be configured such that each of the remote control apparatuses further comprises means for input of user-specifying data by a user,
means for comparing the input user-specifying data with the stored user-specifying data to judge whether the user is a specific registered user, and
means for determining the contents of the message data set in accordance with results of the judgement of the user-specifying data.

In that case, the means for inputting the user-specifying data may comprise a plug-in integrated circuit card and interface means for electrically connecting the plug-in integrated circuit card to the remote control apparatus, the integrated circuit card having mounted thereon an integrated circuit operable for supplying data or signals which have been predetermined as being specific to an individual user.

Alternatively, the means for inputting the user-specifying data may comprise key input means, manually actuatable by a user for inputting a password code which has been predetermined as being specific to an individual user.

As another alternative, the means for inputting the user-specifying data may comprise fingerprint scanning means and fingerprint pattern processing means for operating on information obtained from the fingerprint scanning means to generate fingerprint pattern data, with the stored user-specifying data comprising fingerprint pattern data which have been predetermined as being specific to an individual user.

As a further alternative, the means for inputting the user-specifying data may comprise microphone input means for generating an audio signal in response to voice input by a user, and voice pattern processing means for operating on the audio signal to derive voice pattern data, with the stored user-specifying data comprising voice pattern data which have been predetermined as being specific to an individual user.

According to another basic aspect, the invention can provide such an interactive television system which is configured such that the system can take a poll of respective users of the remote control apparatuses, wherein the user message data comprises polling response data, wherein each of the remote control apparatuses comprises means for storing a set of predetermined personal attribute information items relating to a corresponding user, and wherein the center apparatus comprises means for sending a polling request data set to each of the terminal apparatuses via the network, the polling request data set comprising polling request data, a personal attribute information list specifying a list of personal attribute information items, and polling eligibility conditions data for specifying conditions whereby a user is made eligible to participate in the polling, each terminal apparatus comprises means for receiving the polling request data set, extracting the polling eligibility conditions data from the polling request data set and temporarily storing the polling eligibility conditions data, supplying the polling request data to be displayed by the corresponding data display apparatus, and sending the personal attribute information list to each of the corresponding remote control apparatuses;

each remote control apparatus comprises means for receiving the personal attribute information list, means for extracting, from the stored set of personal attribute information items, specific personal attribute information items which are defined in the personal attribute information list, means for receiving the polling response data as data which are input by a user in response to the displayed polling request data, means for reading out the remote control apparatus identifier, attaching the remote control apparatus identifier and the extracted personal attribute information items to the polling response data to form a message data set, and means for sending the message data set to the corresponding terminal apparatus, and each terminal apparatus comprises means for reading out the polling eligibility conditions data, extracting the personal attribute information items from the message data set, comparing the extracted personal attribute information items with the polling eligibility conditions data to judge the eligibility of the user to participate in the poll, and means for sending the message data set via the communication network to the center apparatus when the user is thereby judged to be eligible;

the center apparatus further comprising means for extracting the remote control identifier, the personal attribute information items and polling response data from each message data set which is received thereby, means for storing the remote control identifiers, and means for storing the personal attribute information and polling response data of respective users in a predetermined relational manner, means for analyzing the personal attribute information and polling response data obtained from a plurality of users to thereby obtain polling result data, and means for sending the polling result data via the data communication network to the terminal apparatuses.

With such a system, the center apparatus may also comprise means for comparing each remote control apparatus identifier of a received message data set with respective remote control apparatus identifiers which have been previously received and stored, for thereby detecting reception of multiple responses from any of the remote control apparatuses, and means for inhibiting use of the polling response data an personal attribute information contained in the message data set in deriving the polling result data.

Furthermore such a system can be configured wherein the wireless communication link which connects each remote control apparatus to a terminal apparatus is a bidirectional data communication link, wherein each remote control apparatus comprises data display means, and wherein the center apparatus comprises means responsive to the detection of multiple responses from a remote control apparatus for generating data of a warning message, attaching the warning message data to the identifier of the remote control apparatus to form a warning message data set and for sending the warning message data set via the data communication network to the terminal apparatus having a terminal apparatus identifier which corresponds to the remote control apparatus identifier of the remote control apparatus, and wherein each terminal apparatus comprises means responsive to receiving a warning message data set for extracting the remote control apparatus identifier therefrom and sending the warning message data to the corresponding remote control apparatus, to be displayed by the data display means of the remote control apparatus.

Alternatively, such a system can be configured whereby each terminal apparatus further comprises means for measuring, for each of the corresponding remote control apparatuses, an elapsed time amount which occurs from a commencement of the displaying of the polling request data until a message data set containing the polling response data is received from the remote control apparatus, and means for sending the elapsed time amounts in conjunction with respectively corresponding remote control apparatus identifiers, as resultant data, to the center apparatus via the data communication network, with the center apparatus further comprising means for analyzing the resultant data received from the terminal apparatuses to obtain, as polling result data, data relating the remote control apparatus identifier to successively increasing values of the elapsed time amounts, and means for sending the polling result data to the terminal apparatuses.

According to another basic aspect, the invention provides such an interactive television system, but wherein the center apparatus includes means for selectively providing data of a plurality of services, each of the terminal apparatuses being configured for supplying, to the corresponding one of the display apparatus, service data which are sent thereto from the center apparatus;

wherein each remote control apparatus comprises means operable by a user for inputting service request data to request a specific one of the services, means for storing a predetermined remote control apparatus identifier, means for storing predetermined user-specifying data which is specific to an individual user, means for storing a predetermined user identifier which is specific to the individual user, means for input of user-specifying data by a user, means for comparing the input user-specifying data with the stored user-specifying data to achieve recognition of the specific individual user, means functioning when the recognition has been achieved, in response to input of the service request data, for reading out the user identifier and the remote control apparatus identifier and for attaching the the user identifier and the remote control apparatus identifier to the service request data to form a message data set, and functioning, when the recognition has not been achieved, to attach the remote control apparatus identifier to the service request data to form a message data set, and means for sending the message data set via the wireless communication link to the terminal apparatus;

wherein each terminal apparatus comprises means for receiving a message data set sent from a remote control apparatus, and means for sending the message data set to the center apparatus via the data communication network;

and wherein the center apparatus further comprises means for storing information which relates each of the remote control apparatus identifiers to the terminal apparatus identifier of the corresponding one of the terminal apparatuses, means for receiving respective ones of the message data sets from the terminal apparatuses sent via the network, means for extracting the remote control apparatus identifier and the service request data from each message data set, means for extracting the user identifier from each the message data set which contains the user identifier, means for storing user status data designating at least one of the user identifiers as as that of a registered user, means for storing service status data designating at least one of the plurality of services as being a restricted service, available only to registered users, means responsive to receiving a message data set which contains a user identifier for judging, based on the user status data, the service status data and the user identifier, whether a service specified by the service request data of the message data set is a restricted service which is available to the requesting user corresponding to the user identifier of the message data set, or is a service which is available to all users, and means functioning when it is judged that the service specified by the service request data of a message data set is available to the user, for providing the corresponding service data and sending the service data via the network to the terminal apparatus having a terminal apparatus identifier which corresponds to the remote control apparatus identifier contained in the received message data set.

In that way, the system can ensure that specific restricted services, such as certain television entertainment programs or films, are supplied only to the users of certain registered remote control apparatuses, while non-restricted services are available to all users of the system.

With such a system each remote control apparatus may comprise bar code scanner means, operable to acquire the service request data by scanning a bar code which appears on printed matter.

In that case, each remote control apparatus can further comprise temporary data storage means for storing a plurality of service request data items which are successively acquired by the scanning of respective bar codes, means operable for designating that acquisition of the plurality of service request data items has been completed, and means responsive to the designation that the acquisition has been completed for reading out the plurality of service request data items from the temporary data storage means, reading out the remote control apparatus identifier and attaching the identifier to the plurality of service request data items to form a message data set, and means for sending the message data set via the wireless communication link to the terminal apparatus.

Alternatively, if bar code scanning is available, then each remote control apparatus may further comprise temporary data storage means for storing a plurality of service request data items which are successively acquired by the scanning of respective bar codes, means for reading out the plurality of stored service request data items, generating display data for displaying the plurality of stored service request data items in the form of a menu, and supplying the display data to the data display means of the remote control apparatus, means operable for designating at least one of the plurality of stored service request data items, as displayed in the menu, as a selected service request data item, means for reading out the selected service request data item from the temporary data storage means, reading out the remote control apparatus identifier and attaching the identifier to the selected service request data item to form a message data set, and means for sending the message data set via the wireless communication link to the terminal apparatus.

According to another aspect of the invention, in the case of a system which provides services on demand to users, the center apparatus may comprise means for extracting the remote control apparatus identifier and the service request data from each of the received message data sets, means for storing service status data designating at least one of the plurality of services as being a restricted service, available only to users of registered remote control apparatuses, means for storing information specifiying identifiers of registered remote control apparatuses, means for judging, based on the the service status data, information specifying registered remote control apparatuses, and the remote control apparatus identifier contained in a received message data set, whether a service specified by the service request data of the message data set is a restricted service which is available to the user of the remote control apparatus having the remote control apparatus identifier, or is a service which is available to all users, and means functioning when it is judged that the service specified by the service request data of a message data set is available to the user, for providing the corresponding service data and sending the service data via the network to the terminal apparatus having a terminal apparatus identifier corresponding to the remote control apparatus identifier which is contained in the received message data set.

BRIEF DESCRIPTION OF THE DRAWINGS

FIGS. 3A, 3B constitute a basic system block diagram of an example of an interactive television system according to the present invention, conceptually illustrating internal functions of a center apparatus, a terminal apparatus and a remote control apparatus;

FIG. 4 is a table showing an example of the contents of a personal attribute information list, sent to remote control apparatuses attached to polling request data with a first embodiment of the invention;

FIG. 5 is a table showing an example of part of the contents of a list of personal attribute information items of users, held stored at a center apparatus of the first embodiment;

FIG. 6 shows an example of the contents of a polling request data set, sent to each terminal apparatus from the center apparatus, when executing polling with the first embodiment;

FIG. 7 shows an example of the contents of a polling response data set, sent by each of respective remote control apparatuses to the corresponding terminal apparatus, during polling with the first embodiment;

FIGS. 10A, 10B constitute a flow diagram showing an example of the processing executed by a terminal apparatus of the first embodiment, in correspondence with the processing of FIGS. 9A, 9B;

FIG. 13 is a table showing an example of polling results obtained with the second embodiment;

FIG. 14 is a flow diagram showing an example of the processing executed by the center apparatus of the second embodiment;

FIGS. 15A, 15B constitute a flow diagram showing an example of the processing executed by a terminal apparatus of the second embodiment, in correspondence with the processing of FIG. 14;

FIG. 16 is a flow diagram showing an example of the processing executed by a remote control apparatus of the second embodiment, in correspondence with the processing of FIGS. 14 and 15A, 15B;

DESCRIPTION OF THE PREFERRED EMBODIMENTS

Figure 1:
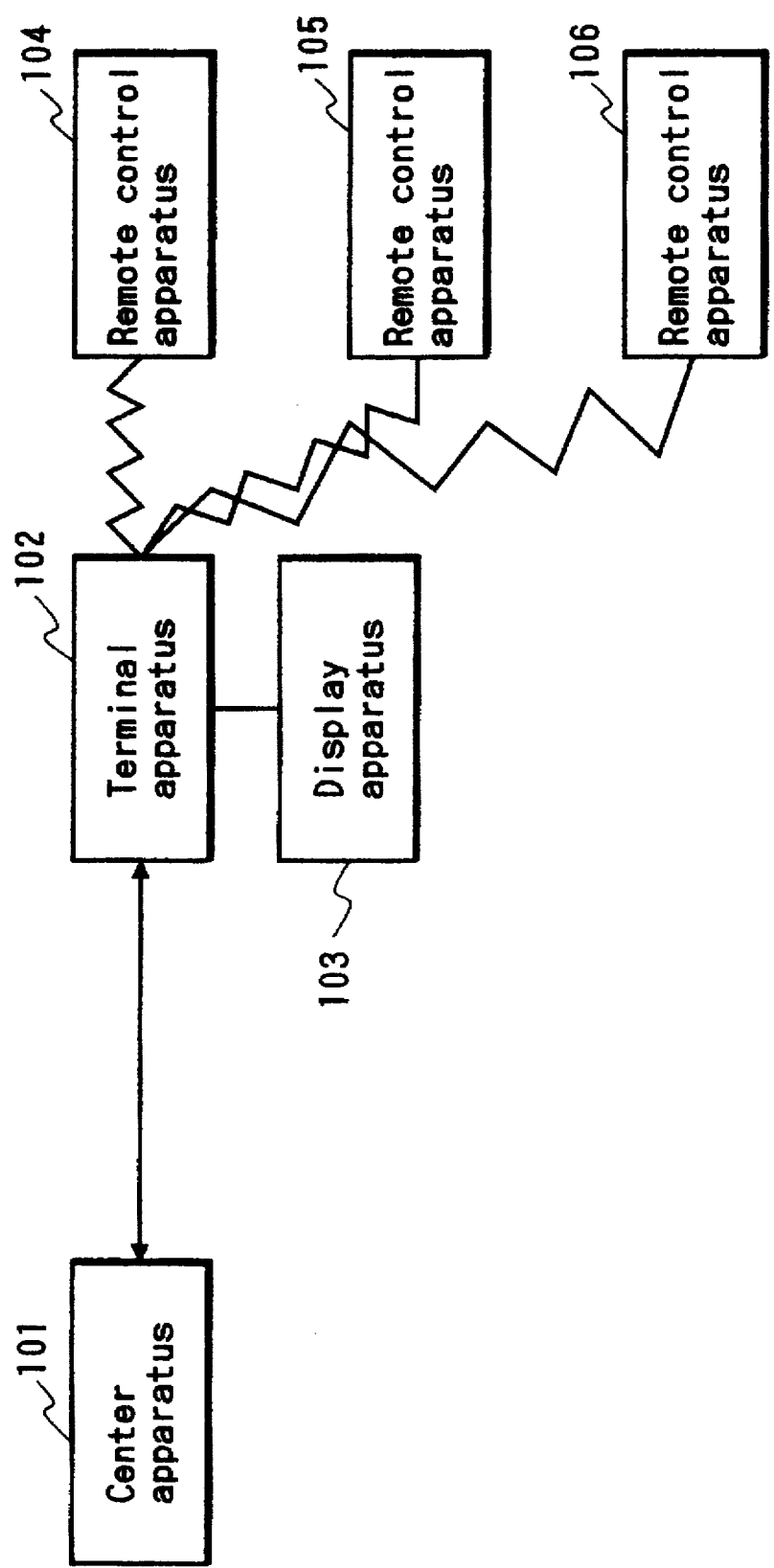
FIG. 1 is a conceptual system block diagram for illustrating the basic structure of an interactive television system according to the present invention.

Embodiments of an interactive television system which can be used to implement an electronic polling system will first be described in the following, referring to the drawings. FIG. 1 is a conceptual diagram illustrating the structure of such an interactive television system. In FIG. 1, 101 denotes a center apparatus which executes processing relating to polling, transmits television programs and computer programs as required, receives and totalizes polling responses, and returns polling results. Each of the embodiments of the present invention described in the following will be assumed (for the purpose of description) to be a CATV system which provides services such as television programs on demand, and/or electronic polling. However the invention is basically applicable to various types of data communication systems whereby video data or (video+audio) data can be generated at a central installation and transmitted on demand via a network (which can be local area network or wide-area network) to various users. The term "center apparatus" as used in the following is to be understood as signifying a central installation of a CATV system, formed of one or more computer systems, video data storage devices, etc., which originates service data such as television programs and/or polling data, and implements network server functions (i.e. using a suitable data communication protocol) to transmit the data via a digital data communication network such as a CATV (cable television) network to respective terminal apparatuses. The term "terminal apparatus" as used in the following is to be understood as signifying a computer installation which uses the aforementioned communication protocol for bidirectional communication with the center apparatus via the CATV network, and which also implements bidirectional communication (in general, via a wireless optical link) with each of a set of one or more remote control apparatuses. The terminal apparatus may for example implement the aforementioned communication protocol by means of program routines stored in a ROM (Read Only Memory), or may operate by executing computer programs which has been sent from the center apparatus and stored in memory. 103 denotes a display apparatus which generates a video display picture, based on video data or a video signal that is output from the terminal apparatus 102. 104, 105 and 106 denote respective remote control apparatuses, for use by by respective users of the system.

Basic features of the present invention are:
(a) Each remote control apparatus is assigned an identifier, e.g. an identification number, which is unique within the system.
(b) Each terminal apparatus is assigned an identifier, which again may be an identification number, that is unique within the system.
(c) The center apparatus holds information stored in memory, e.g. in the form of a table, which relates each of the remote control apparatus identifiers to the identifier of the terminal apparatus which corresponds to that remote control apparatus, i.e. the terminal apparatus to which that remote control apparatus is connected by a wireless data communication link. Furthermore in the case of this embodiment, it is an essential feature that each of the remote control apparatuses can store personal attribute information of a specific user, i.e. each remote control apparatus is assigned to a specific user.

The users obtain information that is sent from the center apparatus 101 by observing the display apparatus 103, and operate the remote control apparatuses 104, 105, 106 accordingly, to send data to the terminal apparatus 102. Resultant processing is executed by the terminal apparatus 102, and data are sent to the center apparatus 101. Polling results are sent by the center apparatus 101 via the terminal apparatus 102 to the remote control apparatuses 104, 105, 106.

Figure 2:
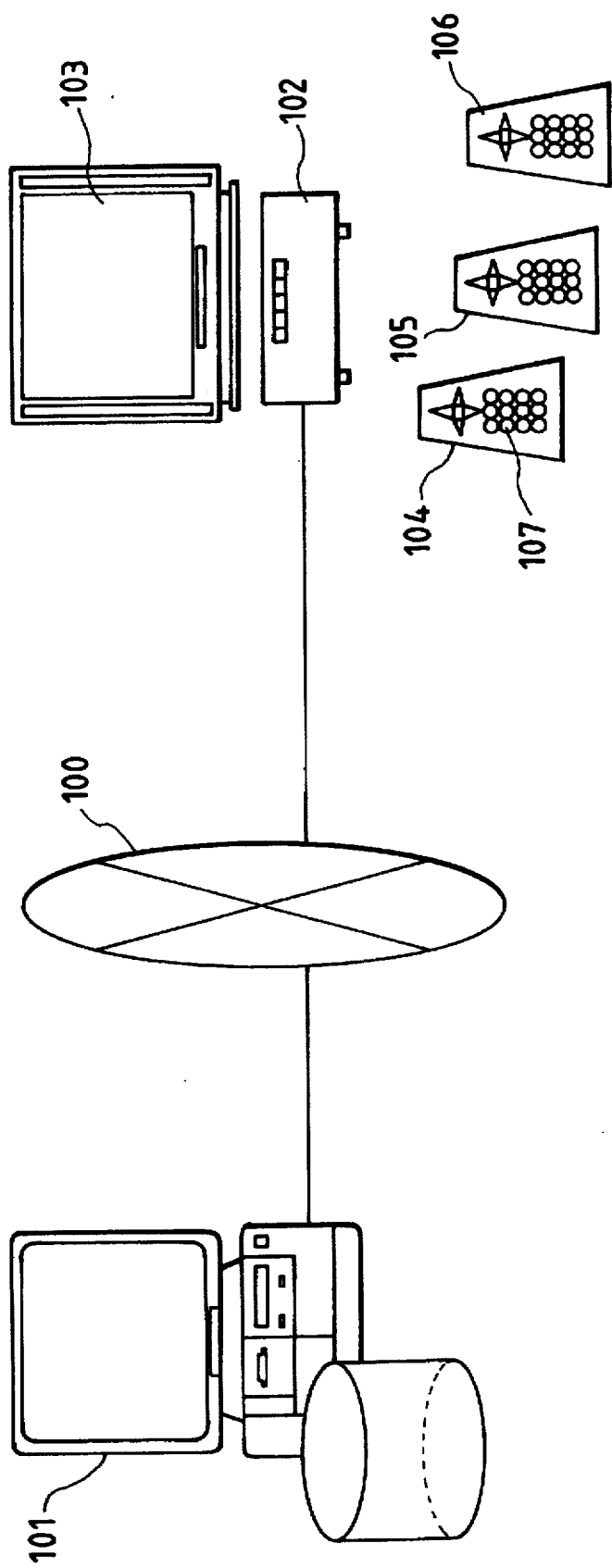
FIG. 2 shows the basic elements of an interactive television system according to the present invention.

The basic physical configuration of such a system is conceptually illustrated in FIG. 2. Here, the center apparatus 101 communicates via a CATV network 100 with a plurality of terminal apparatuses, one of which is designated as terminal apparatus 102. The terminal apparatus 102 supplies data (e.g. in the form of a video signal, or data which can be converted to a video signal by circuits in the display apparatus 103) to the display apparatus 103. As indicated, each of the remote control apparatuses which communicate with the terminal apparatus 102 can be provided with a set of data input keys 107, such as a numeric or alphanumeric key pad, whereby users can input data such as requests for services or responses to polling requests, to the system.

Figure 3B:
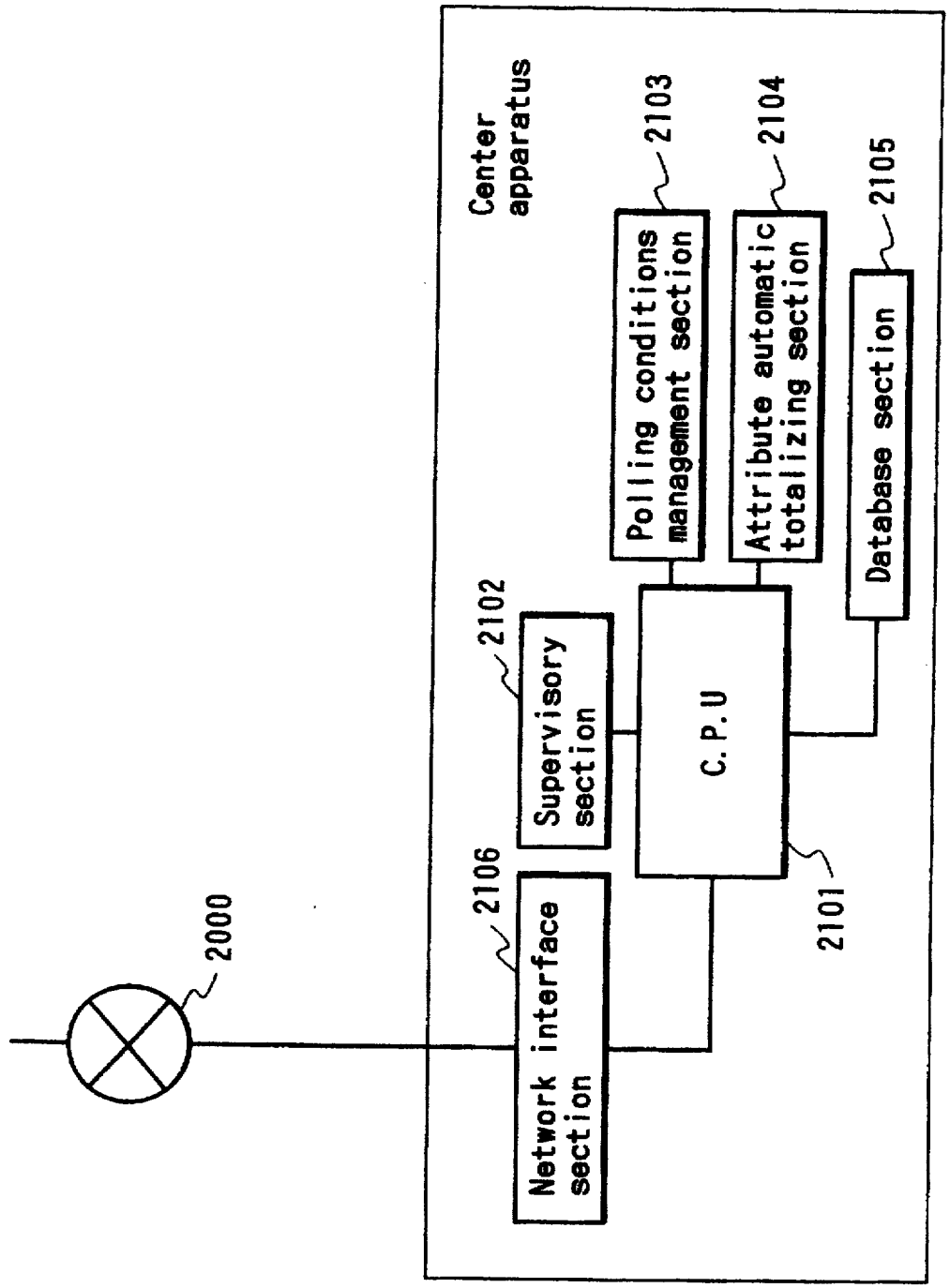

A specific first embodiment of the present invention, for the case in which the invention is applied to an electronic polling system, will be described in the following. FIGS. 3A, 3B (collectively referred to in the following simply as FIG. 3) show the configuration of this embodiment in the form of a basic block system diagram, showing the center apparatus of the system, one of the terminal apparatuses of the system, and one of the remote control apparatuses which is linked to that terminal apparatus. It should be understood that the various system blocks which are shown as performing specific functions in the the center apparatus, terminal apparatus and remote control apparatus in FIG. 3 are to taken as purely conceptual, since the respective operating functions are actually performed by computer program operations. For example, an "I/O interface section" of a terminal apparatus, for executing data communication via a network will in practice be implemented by computer program routines, stored in memory, which are invoked and executed when necessary for implementing a specific data communication protocol to send or receive data from or to the center apparatus. In FIG. 3, 2100 denotes a center apparatus, 2101 denotes a central processing unit which executes processing of programs for the center apparatus. 2102 denotes a monitoring section which monitors the polling contents. 2103 denotes a polling conditions management section which manages conditions that define polling eligibility. 2104 denotes an attribute automatic totalizing section which executes data totalization based on personal attribute information which is attached to the polling response data. 2105 denotes a data base section, which stores personal attribute information of users, polling data, etc. 2106 denotes a network interface to a digital CATV network.

2200 denotes a terminal apparatus. 2201 denotes a central processing unit which executes processing of programs for the terminal apparatus. 2202 denotes a network interface section to the digital CATV network. 2203 denotes an I/O interface section, for executing communication with the remote control apparatuses, via respective wireless data communication links such as optical data communication links. 2204 denotes a main memory for storing information. 2205 denotes a non-volatile data storage section, for storing attributes of the terminal apparatus. 2206 is a polling schedule management section for managing polling validity times, response time limits, etc. 2207 denotes a polling management section, for checking the polling conditions.

2300 denotes a remote control apparatus. 2301 denotes a central processing unit for executing processing of programs relating to the remote control apparatus. 2302 denotes an I/O (input/output) interface section for executing communication with the terminal apparatus. 2304 denotes an information display section for displaying information. 2305 denotes a non-volatile data storage section for storing attributes of the remote control apparatus. 2306 denotes a personal attribute information storage section, for storing personal attribute information of a user. 2307 denotes an input section, (such as a numeric or alphanumeric keyboard as mentioned above, in conjunction with a suitable interface) for inputting the user personal attribute information and for inputting polling response data.

2400 denotes a display apparatus, i.e. providing the video and audio output functions of a usual television receiver, for reproducing video and audio data, supplied from the terminal apparatus 2200. For simplicity of description, only the video display function of such a display apparatus will be mentioned in the following description, however it should be understood that in practice, both video and audio display/output will be provided.

The basic operation of this electronic polling system will be described in the following. As preparation for using the system, the user inputs personal attribute information to the remote control apparatus 2300, e.g. by actuating data input keys of the remote control apparatus. This input is executed via the input section 2307, and the personal attribute information is stored in the personal attribute information memory section 2306. FIG. 4 shows an example of the personal attribute information.

The non-volatile data memory section 2305 of the remote control apparatus 2300 has stored therein a remote control apparatus identifier, e.g. an identification number, which is unique within the entire system. The non-volatile data memory section 2205 of the terminal apparatus 2200 also has stored therein an identifier, e.g. an identification number, which is unique to the entire system. By means of these identification numbers, it is possible for the center apparatus to relate each remote control apparatus to its position within the system, i.e. to its corresponding terminal apparatus, since as described herein above the center apparatus holds information which relates the remote control apparatus identifiers to the terminal apparatus identifiers. In this embodiment, basic personal attribute information for the respective users of the remote control apparatuses are also stored, relationally linked to the corresponding remote control apparatus identifiers (and their corresponding terminal apparatus identifiers), in the database section 2105 of the center apparatus 2100. FIG. 5 is an example of the relationships established between such remote control apparatus and terminal apparatus identification numbers and corresponding sets of personal attribute information items. It is assumed in this example that the embodiment is applied to a CATV system which is connected to various homes of users. Within each home, one or more family members may be assigned respective remote control apparatuses (with each remote control apparatus having stored therein personal attribute information for the corresponding user, as described above). However the personal attribute information items which are stored at the center apparatus as shown in FIG. 5 constitute only a small part of the personal attribute information for each user, i.e. in this example, the name, address, and telephone number of each user.

It can be further understood from FIG. 5 that, for example, the terminal apparatus which is installed in the Jones household is linked to three remote control apparatuses, which are assigned to three different family members and so have respectively different remote control apparatus identification numbers.

Polling request data which are output from the central processing unit 2101 of the center apparatus 2100 are broadcast via the network interface sections 2106 and 2202 to each of the terminal apparatususe 2200 of the system. The polling request data received by each terminal apparatus are processed by the central processing unit 2201, and supplied to the display apparatus 2400 in suitable form for being displayed thereby.

Based on the polling request data which are displayed by the display apparatus 2400, a user operates the remote control apparatus 2300 to input a polling response. The polling request data are sent from the center apparatus 2200 to the terminal apparatus 2200 together with polling eligibility conditions, a personal attribute information attachment list (which is a list of personal attribute information items which are to be attached to the polling response data which will be sent back from the remote control apparatus of a user), and polling validity term data (which specify the time duration during which polling responses can be accepted from users), respectively attached to the polling request data. Such a set of data, i.e. polling request data together with polling eligibility condition information, a personal attribute information list, and polling validity term data, will be referred to in the following as a polling request data set. FIG. 6 shows an example of the configuration of such a polling request data set.

A polling request data set which is received by the terminal apparatus 2200 is stored in the main memory 2204 and analyzed by the central processing unit 2201, to extract the polling eligibility conditions, the personal attribute information attachment list, and the polling validity term data. The polling eligibility conditions are stored in the polling management section 2207, the polling validity term data are stored in the polling schedule management section 2206. The personal attribute information list is transmitted via the I/O interface sections 2203 and 2302 to each remote control apparatus 2300.

The central processing unit 2301 of the remote control apparatus 2300 attaches, to the polling response data which are input by the user from the input section 2307, personal attribute information items which are extracted from the contents of the personal attribute information memory section 2306, as specified by the personal attribute information attachment list, and also attaches the remote control apparatus identification number that is stored in the non-volatile data memory section 2305, to thereby generate a set of data which will be referred to as a polling response data set. That data set is sent via the I/O interface sections 2302 and 2203 to the terminal apparatus 2200. FIG. 7 shows an example of such a polling response data set.

If the user does not input a polling response, then when the time limit of the polling validity term becomes close, a message indicating that polling will soon be ended is supplied by the terminal apparatus to be displayed by the display apparatus 2400.

When a polling response data set is received by the terminal apparatus, the polling management section 2207 checks the contents, and if the polling eligibility conditions are satisfied, the terminal apparatus 2200 sends the polling response data set to the center apparatus, or temporarily stores the polling response data set, to subsequently send all received polling response data sets to the center apparatus. When the end of the polling term is reached (or when responses have been received from all of the remote control apparatuses which are linked to that terminal apparatus), the terminal apparatus sends all of the polling response data sets to the center apparatus, and deletes the polling term data which have been stored in the polling schedule management section 2206. Alternatively, the terminal apparatus can be configured to send each polling response data set (which meets the eligibility conditions) directly to the center apparatus when it is received from a remote control apparatus.

If the polling eligibility conditions are not met by a polling response data set which is received by the terminal apparatus, then data for an error message are sent by the terminal apparatus to the corresponding remote control apparatus 2300, to be displayed by the information display section 2304 of the remote control apparatus 2300. The user is thereby notified that his/her polling response has not been allowed.

When a polling response data set, sent from a terminal apparatus 2200, is received by the center apparatus 2100, the central processing unit 2101 extracts the remote control apparatus identification number, the personal attribute information, and the user input data which are attached to the polling response data, and stores these in the data base section 2105.

As each polling response data set is received, the center apparatus checks to ensure that multiple responses have not been sent from the same remote control apparatus, i.e. by the same user. This is done by checking that the remote control apparatus identifier of a received response is not identical to that of any remote control apparatus identifier which has already been received and stored as described above. If a second occurrence of the same remote control apparatus identification number is detected, then the monitoring section 2102 notifies the central processing unit that a polling response has already been received from the remote control apparatus concerned, so that the latest polling response received from that remote control apparatus is not valid. In that case, the center apparatus generates data of a warning message, and attaches thereto the identifier of the remote control apparatus concerned, to form a warning message data set. The center apparatus then determines the terminal apparatus identifier corresponding to that remote control apparatus identifier, and sends the warning message data set via the network to the appropriate terminal apparatus 2200. That terminal apparatus then sends the warning message data to the remote control apparatus 2300 concerned. On receiving the warning message data, that remote control apparatus 2300 displays a warning message by the information display section 2304, thereby notifying the user that her or she has input multiple polling responses.

Figure 8:
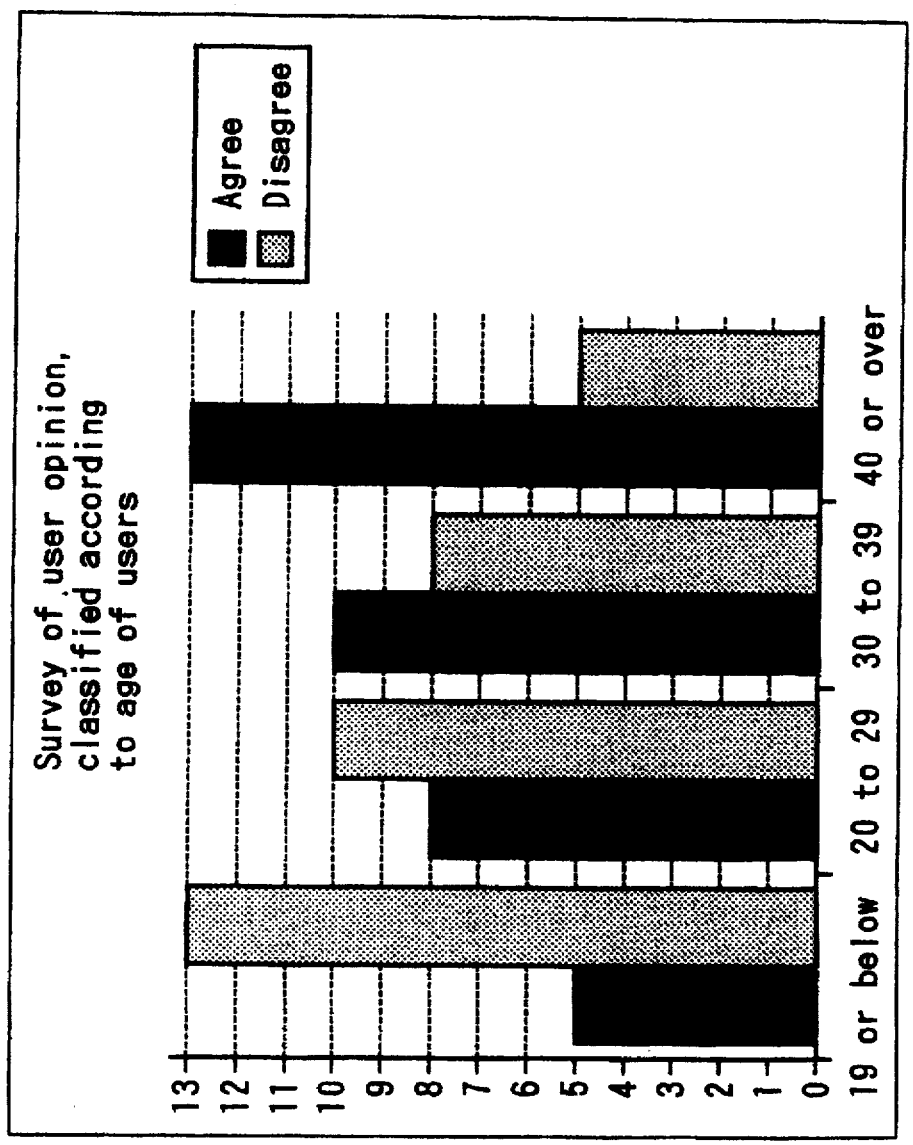
FIG. 8 is an example of polling results obtained with the first embodiment, whereby the results are respectively totalized for different categories of users.

The received polling response data are totalized by the center apparatus in accordance with user personal attributes, based on the personal attribute information which has been attached to the polling response data. FIG. 8 shows an example of the data totalized in that manner. In this example, the poll consists of an opinion survey of users, the personal attribute information item which is specified in the personal attribute information list is "age of user", and the polling result data are classified according to respective age ranges of the responding users, as shown.

Figure 9A:
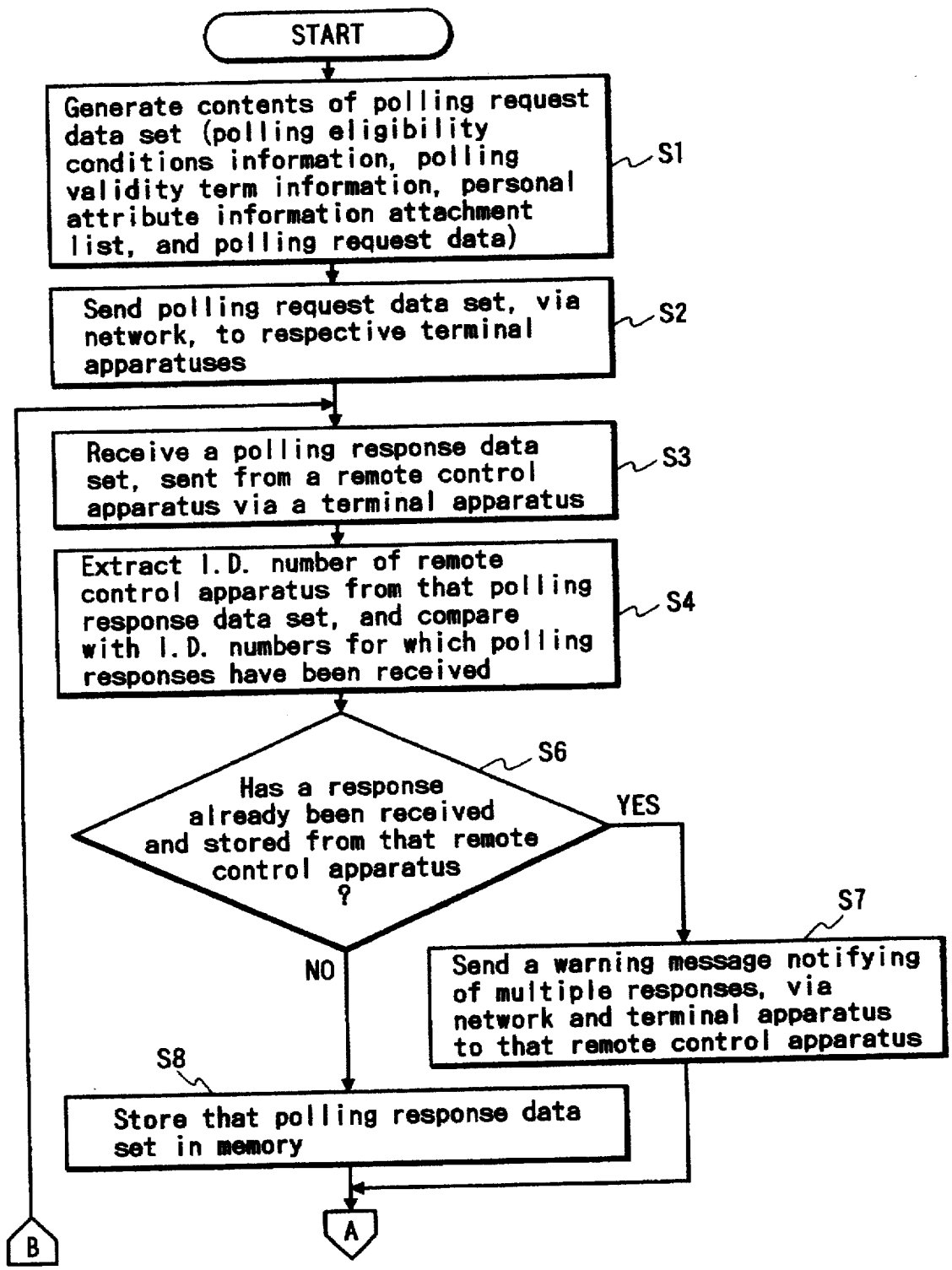
FIGS. 9A, 9B constitute a flow diagram showing an example of the processing executed by the center apparatus of the first embodiment, whereby a polling request data set specifying polling eligibility conditions, personal attribute information list, and polling request data is sent to each terminal apparatus from the center apparatus.
Figure 9B:
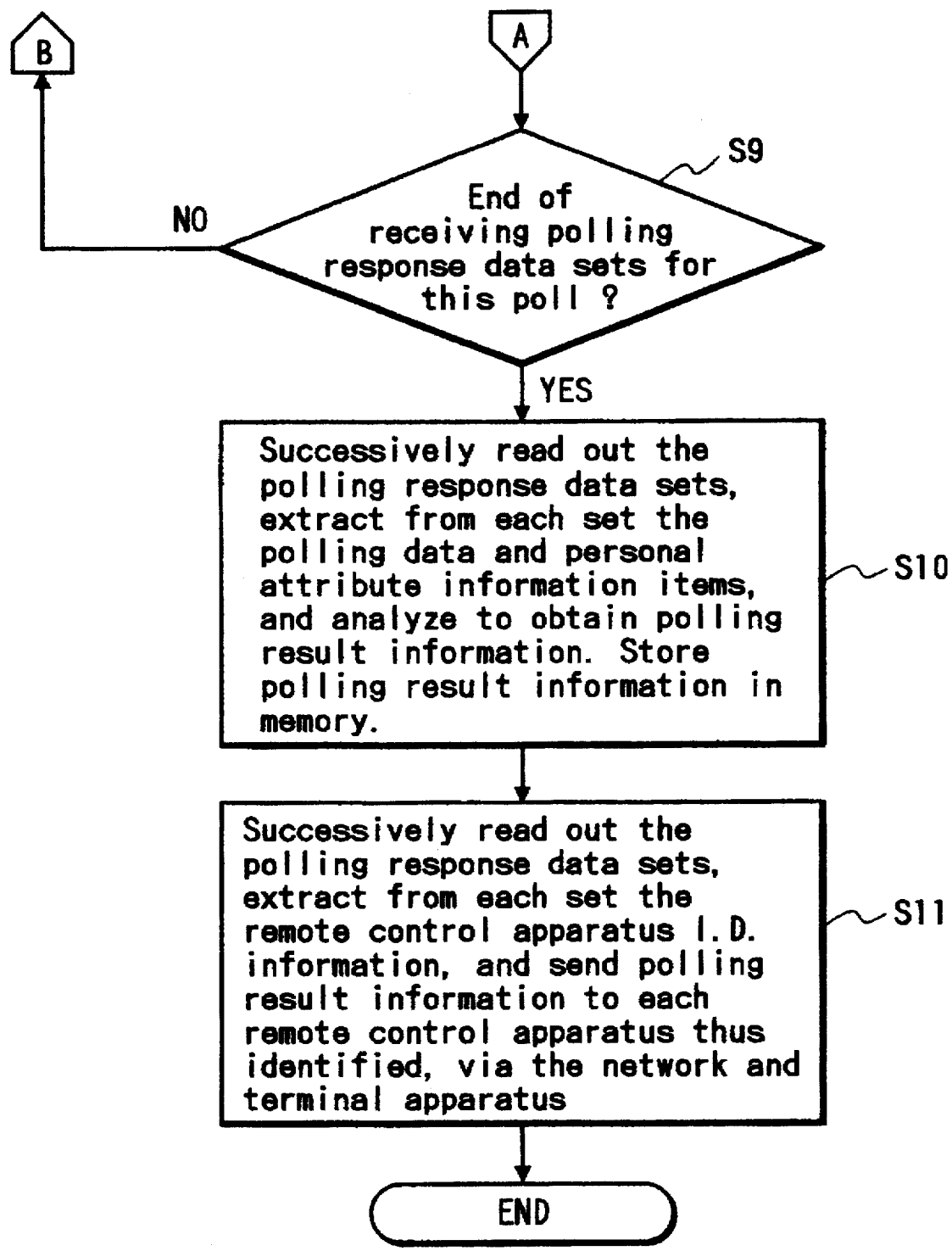
Figure 10A:
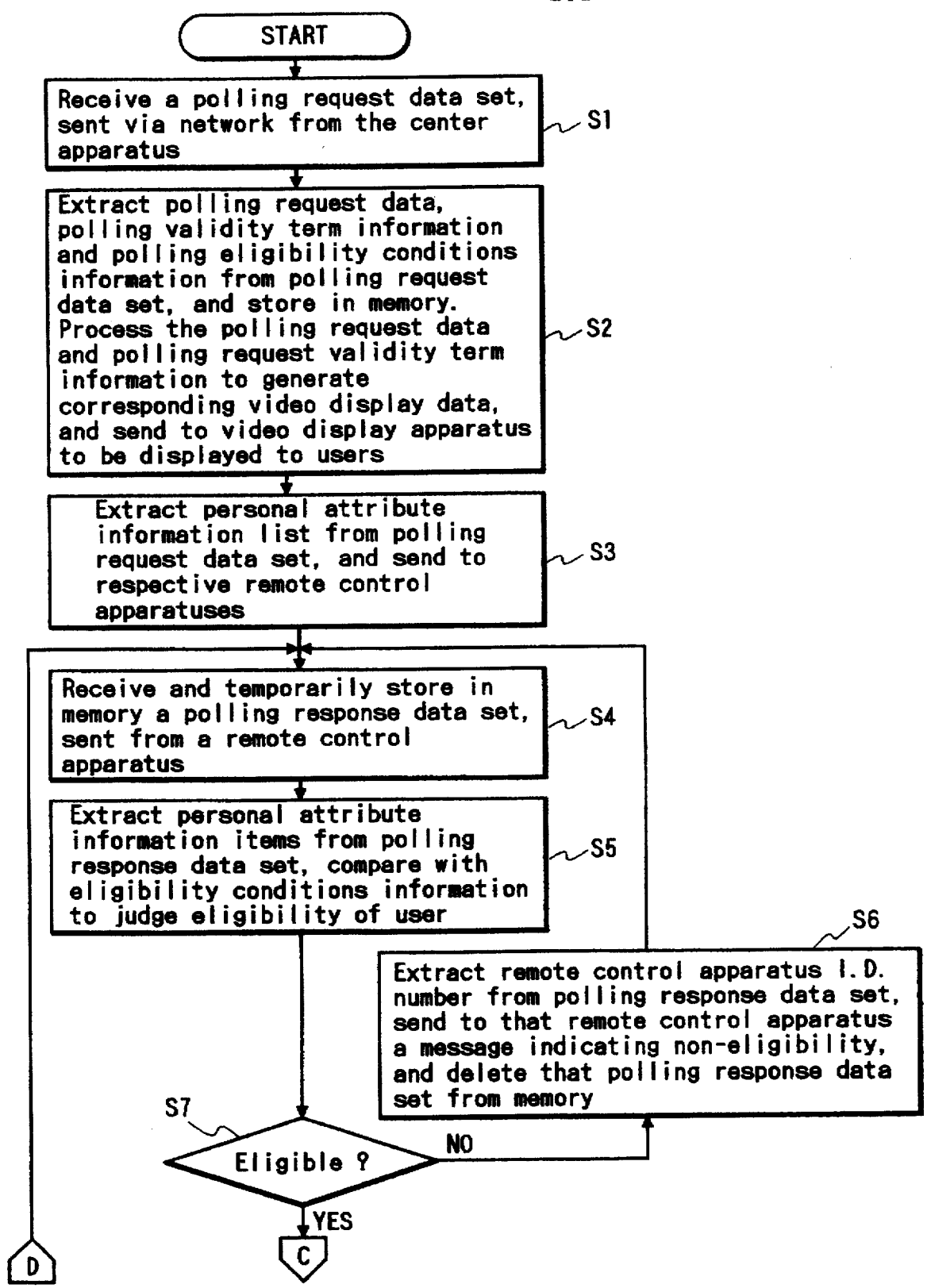
Figure 11A:
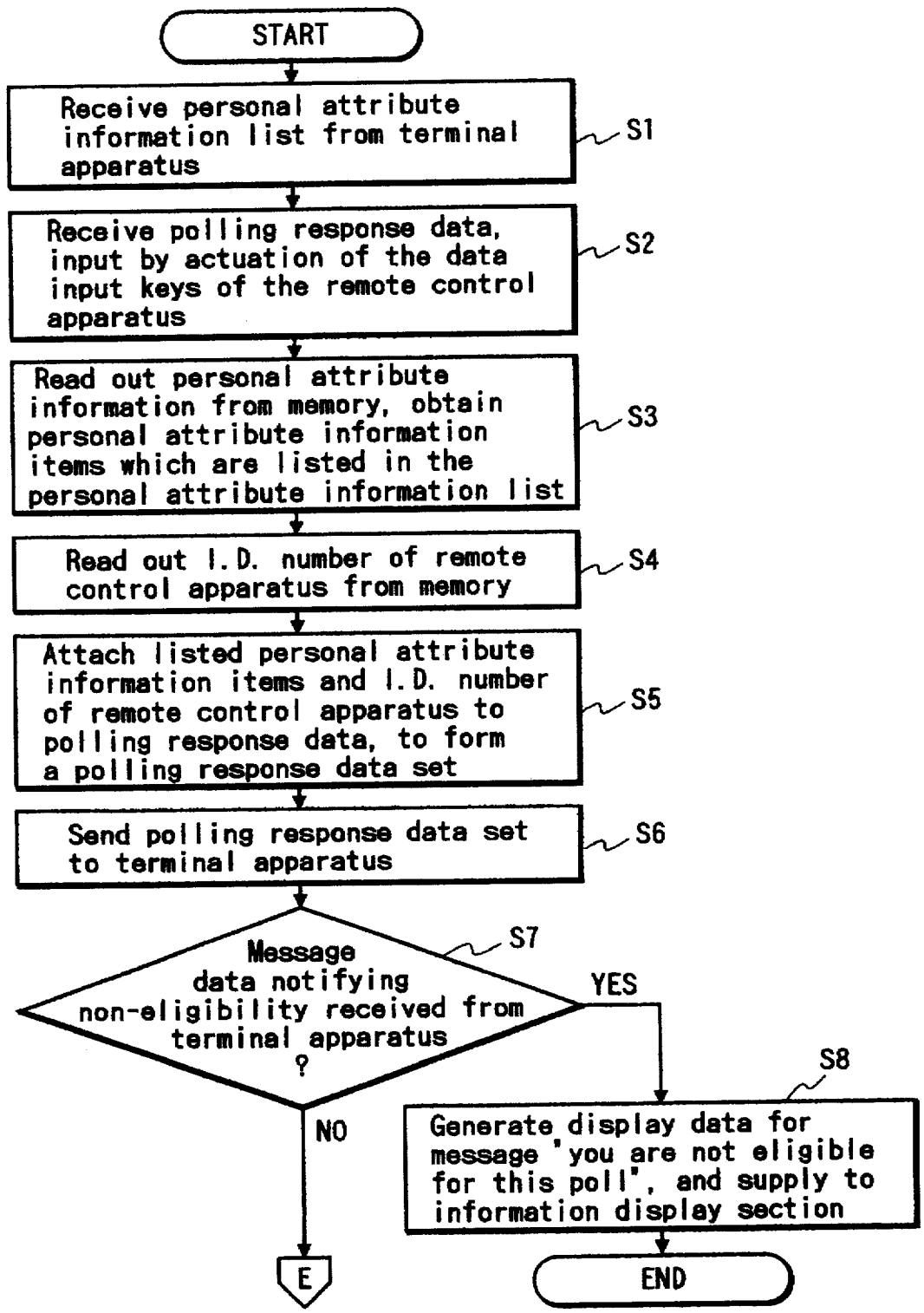
FIGS. 11A, 11B constitute a flow diagram showing an example of the processing executed by a remote control apparatus of the first embodiment, in correspondence with the processing of FIGS. 9A, 9B and 10A, 10B.
Figure 11B:
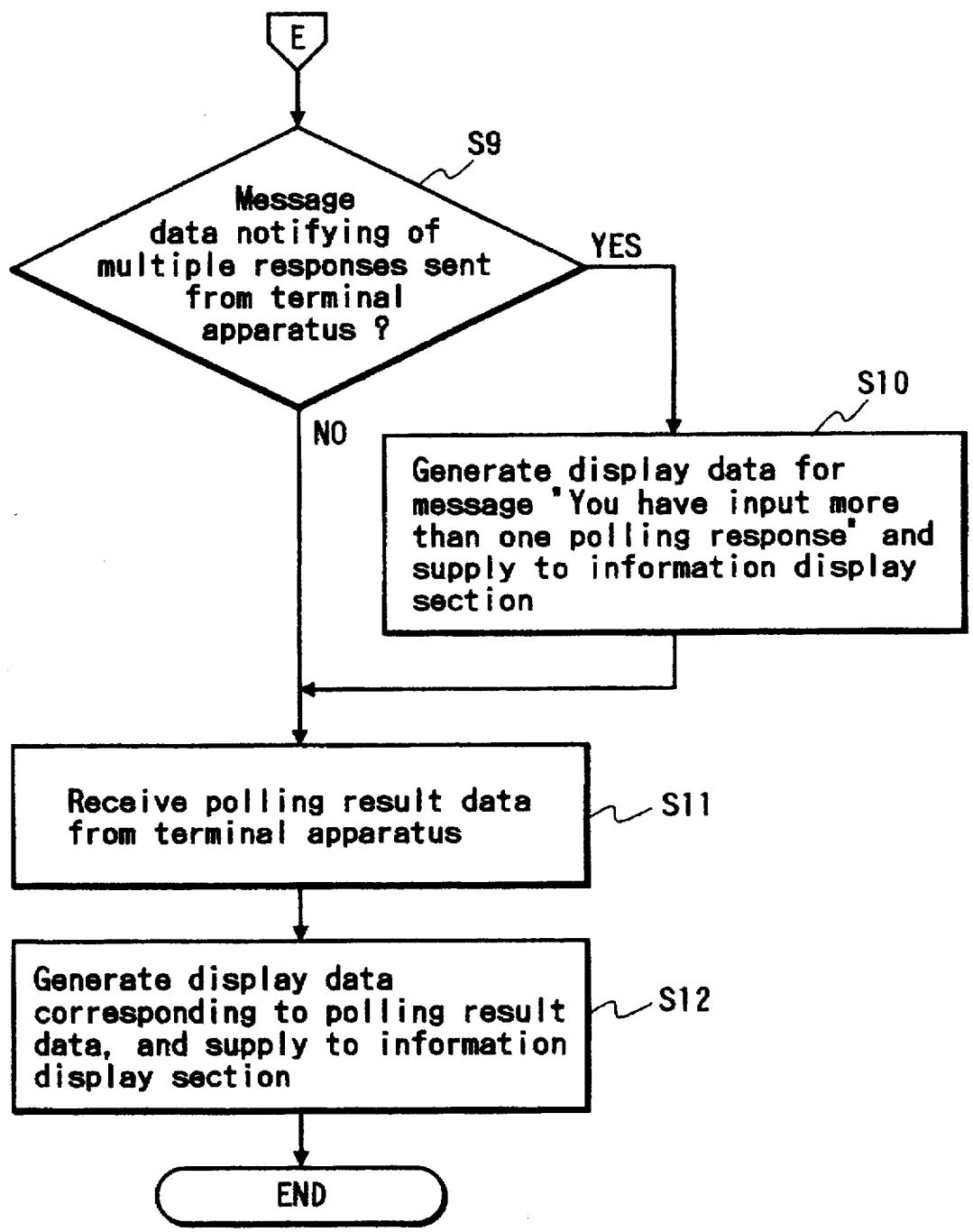

As stated hereinabove, the contents of FIG. 3, used in the above explanation, are provide only to illustrate the basic concepts of this embodiment. The actual functions described above are performed by execution of various computer program routines by the center apparatus, each terminal apparatus and each remote control apparatus, as required. FIGS. 9A, 9B constitute a flow diagram of an example of the processing executed by the center apparatus of this embodiment, FIGS. 10A, 10B constitute a flow diagram of an example of corresponding processing executed by a terminal apparatus of this embodiment, and FIGS. 11A, 11B constitute a flow diagram of an example of corresponding processing executed by a remote control apparatus of this embodiment. In FIGS. 9A, 9B it is assumed that polling result data are supplied by the system only to those users who have participated in the poll, i.e. that the result data are sent to the respective remote control apparatuses of those specific users, to be displayed by each remote control apparatus.

As an alternative to such an arrangement, the polling results could simply be broadcast from the center apparatus to all of the terminal apparatuses, to be displayed by their respective display apparatuses to all of the users.

As described in the above, according to a first characterizing feature of the above embodiment, it is possible to inherently prevent multiple polling responses by the same user, thereby preventing the polling results from being biased towards specific users. According to a second characterizing feature, since polling results can be directed by the center apparatus to specific remote control apparatuses (i.e. each identified by the corresponding remote control apparatus identifier), it is possible to provide specific information, such as warning indications, to individual users. According to a third characterizing feature of the above embodiment, detailed user personal attribute information can be be input by each user to his/her personal remote control apparatus, to be stored in that remote control apparatus, but held inaccessible to other users of the system. When any specific items of this detailed personal information is required for the purposes of a poll, then (by using the personal attribute information attachment list), it is possible for the system to obtain and use only these specific items from each user, to hold these personal information items (at the center apparatus) only for the amount of time which is required to complete polling and analyze the polling results. This enables both protection of the privacy of users (since such personal information items will not be held stored at the center apparatus for any significant length of time), while also enabling a wide range of user attributes to be used in the polling. Hence, polling can be achieved which provides large amounts of information.

Moreover, since users themselves can manage their personal attribute information through their respective remote control apparatuses, the burden of managing the personal attribute information is distributed among the remote control apparatuses, so that the data processing load imposed on the center apparatus can be minimized.

As another characterizing feature of the above embodiment, various processing which is necessary to execute polling can be performed by the various terminal apparatuses, so that it is only necessary to transmit to the center apparatus, for each polling response, a minimum amount of necessary data (i.e. the polling response data, the remote control apparatus identifier, and any specified item or items of personal attribute information of a user). Hence, the level of data traffic via the digital data communication network between the terminal apparatuses and the center apparatus can be minimized, and the burden of polling management which is imposed on the center apparatus can be further distributed to the terminal apparatuses.

It is another characterizing feature of the above embodiment that polling time limits can be automatically notified to the users, so that polling rights of users can be effectively utilized (i.e. there is a reduced possibility that users may fail to participate in polling as a result of inadvertently delaying the sending of a polling response beyond the specified response time limit).

Figure 12:
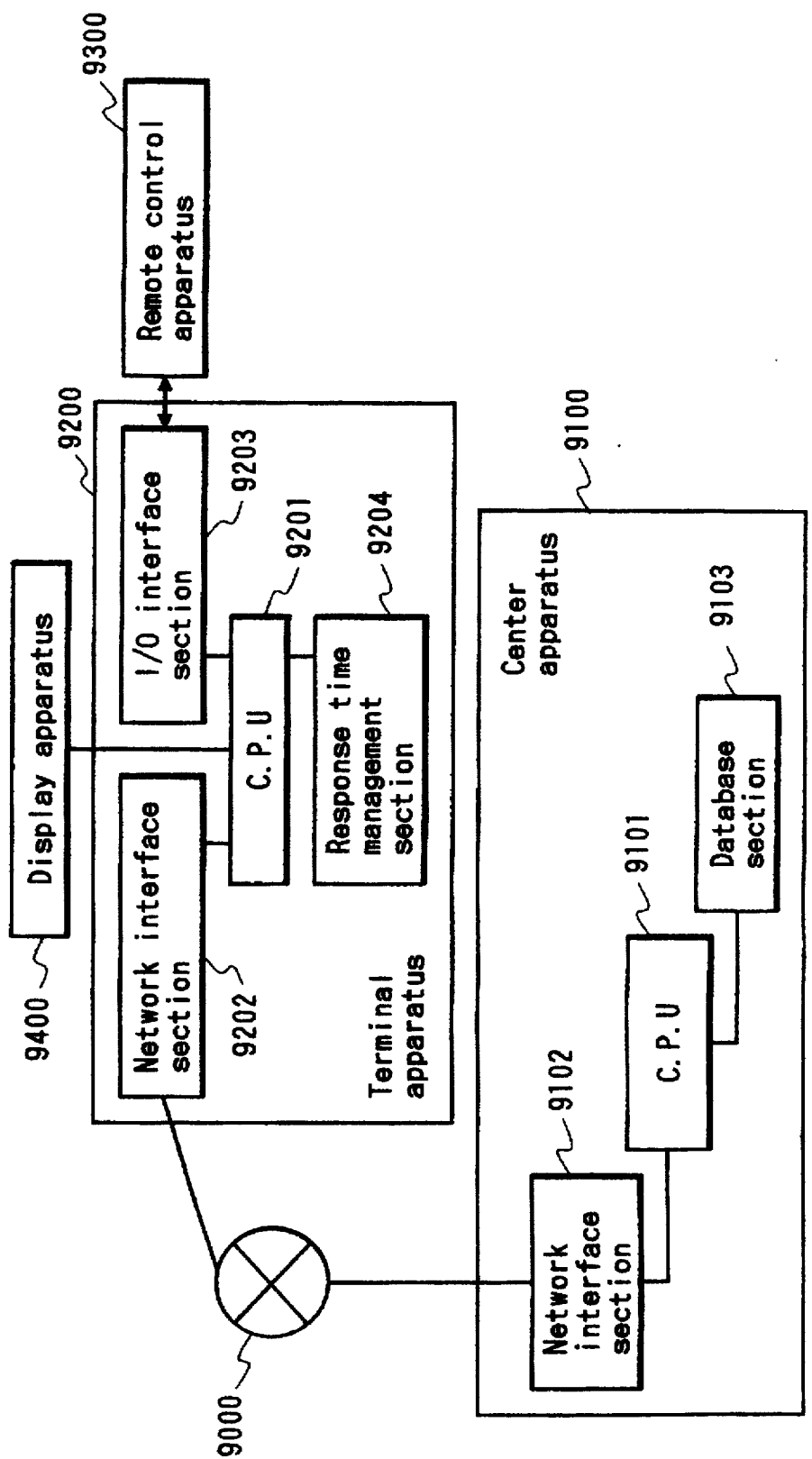
FIG. 12 is a basic system block diagram of an interactive television system according to a second embodiment of the present invention, whereby polling results are determined on the basis of polling response times of users, conceptually illustrating part of the internal functions of a center apparatus, a terminal apparatus and a remote control apparatus.

A second embodiment of the present invention will be described in the following referring to the drawings. FIG. 12 is a system block diagram of the basic configuration of this embodiment, which is also an interactive television system which functions as an electronic polling system. As described for the preceding embodiment, such a diagram shows only basic concepts, while the functions indicated shown are actually implemented by respective computer programs which are executed by the center apparatus, by each terminal apparatus and by each remote control apparatus of the system. Also as for the preceding embodiment, for simplicity of description, only the operations executed by a single terminal apparatus and by a single remote control apparatus which is linked to that terminal apparatus will be described. In FIG. 12, 9100 denotes a center apparatus, 9101 denotes a central processing unit for executing processing of programs for the center apparatus, 9102 denotes a network interface to a digital CATV network, 9103 denotes a database section for storing personal attribute information of users and polling data.

9200 denotes a terminal apparatus, 9201 denotes a central processing unit for executing processing of programs for the terminal apparatus, 9202 denotes a network interface to the digital CATV network, 9203 denotes an I/O interface section for use in communicating with remote control apparatuses, 9204 denotes a response time management section for measuring and recording response times that elapse from the time that a polling request starts to be displayed by a display apparatus 9400 until polling is executed by users of the corresponding remote control apparatuses 9300.

The operation of the electronic polling system having the above configuration is as follows. In the same way as for the preceding embodiment, polling request data which are output by the central processing unit 9101 of the center apparatus 9100 are distributed to each terminal apparatus 9200 through a CATV network 9000 via the network interface sections 9102, 9202. The polling request data received by the terminal apparatus 9200, are processed by the central processing unit 9201, and are displayed by the display apparatus 9400. The response time management section 9204 measures and records response times that elapse from the time that a polling request starts to be displayed by the display apparatus 9400 until polling is executed by respective users, i.e. the time which elapses until a user inputs a polling response from a remote control apparatus 9300 through the I/O interface section 9203 of the terminal apparatus.

In the same way as for the preceding embodiment, each remote control apparatus 9300 attaches, to polling response data which are input by the user, the remote control apparatus identifier, to thereby form a polling response data set, which is then sent to the terminal apparatus 9200. The central processing unit 9201 of the terminal apparatus then attaches, to that polling response data set, data expressing the value of response time which has been measured for that response by the response time management section 9204, to thereby form a complete polling response data set, and sends this via the network 9000 to the center apparatus 9100. The central processing unit 9101 of the center apparatus 9100 extracts the response time data from the polling response data set thus received, and stores the polling response data in the database section 9103. Respective polling response times which are thus obtained are arranged and stored (in conjunction with the respectively corresponding remote control apparatus identifiers) in a sequence which is determined by the respective response time values, i.e. arranged successively beginning from the shortest value, to thereby obtain the polling results. FIG. 13 shows an example of the relationship between the polling sequence, the times at which polling responses are received by the center apparatus, and response time intervals. This illustrates that the polling results are independent of the times at which polling responses are received from the terminal apparatuses, but depend only upon the respective response time intervals.

Thus, it is a feature of the second embodiment of the present invention that the response times of respective users with respect to each terminal apparatus are used as a reference for determining the arrival sequence of polling responses, so that the polling response sequence can be established in a fair manner, which is not affected by delays of respectively different transmission paths over which response data are sent to the center apparatus from the various users.

From the above description of the first and second embodiments, it can thus be understood that the following effects are obtained when an interactive television system is utilized as an electronic polling system according to the present invention:

First, multiple responses to a polling request by the same user can be prevented.

Second, the polling response sequence can be fairly established, irrespective of differences between delay times of different communication paths by which responses are sent to the center apparatus by respective users.

Third, it is possible for the center apparatus to send respectively separate messages (for example, to indicate to a specific user his or her position in the polling results) to each of various remote control apparatuses that are being used, with respectively different information being thereby displayed by the various remote control apparatuses.

Fourth, each of the remote control apparatuses can stored detailed personal attribute information of a user, however but only that part of the personal attribute information which is actually necessary for the purpose of executing a particular poll is transmitted from the remote control apparatus of a user to the corresponding terminal apparatus and the center apparatus, and that personal information is used only for the time required to analyze the polling results, i.e. need not be held stored for any substantial time at any position in the system other than in the personal remote control apparatus of a user. Hence, the possibility of violation of user privacy can be prevented. In addition, this enables the function of management of personal attribute information to be distributed among the remote control apparatuses, so that it becomes possible to prevent a concentration of information handling load on the center apparatus.

Fifth, since any requisite items of personal attribute information can be extracted from the detailed personal attribute information which is stored in each remote control apparatus, and attached to polling response data which are sent to the center apparatus, the polling results can be analyzed in terms of various types of personal attributes, thereby enabling the polling response data to be effectively analyzed and utilized.

Sixth, polling eligibility conditions can be established whereby polling is limited to only those users who are appropriate for participating in a specific poll. For example, some types of survey can be limited to adults, while others can be limited to children. Such a feature also has the advantage that, since unnecessary responses can be eliminated from being transmitted from remote control apparatuses through the system to the center apparatus, the number of polling responses received by the center apparatus can be minimized to only the necessary number, thereby enabling the total amount of transmitted data to be minimized. This enables efficient use of communication paths such as a CATV network. In addition, since it becomes unnecessary for the center apparatus to execute processing for examining each of the received polling responses to determine whether the user is eligible to participate in the poll, the polling management load is more effectively distributed within the system, i.e. among the remote control apparatuses rather than being excessively concentrated on the center apparatus.

Seventh, polling validity term data can be attached to the polling request data. As described above, this can be used to notify the users when the end of the term for sending polling responses becomes close, reducing the possibility of users inadvertently omitting to send responses.

Figure 15B:
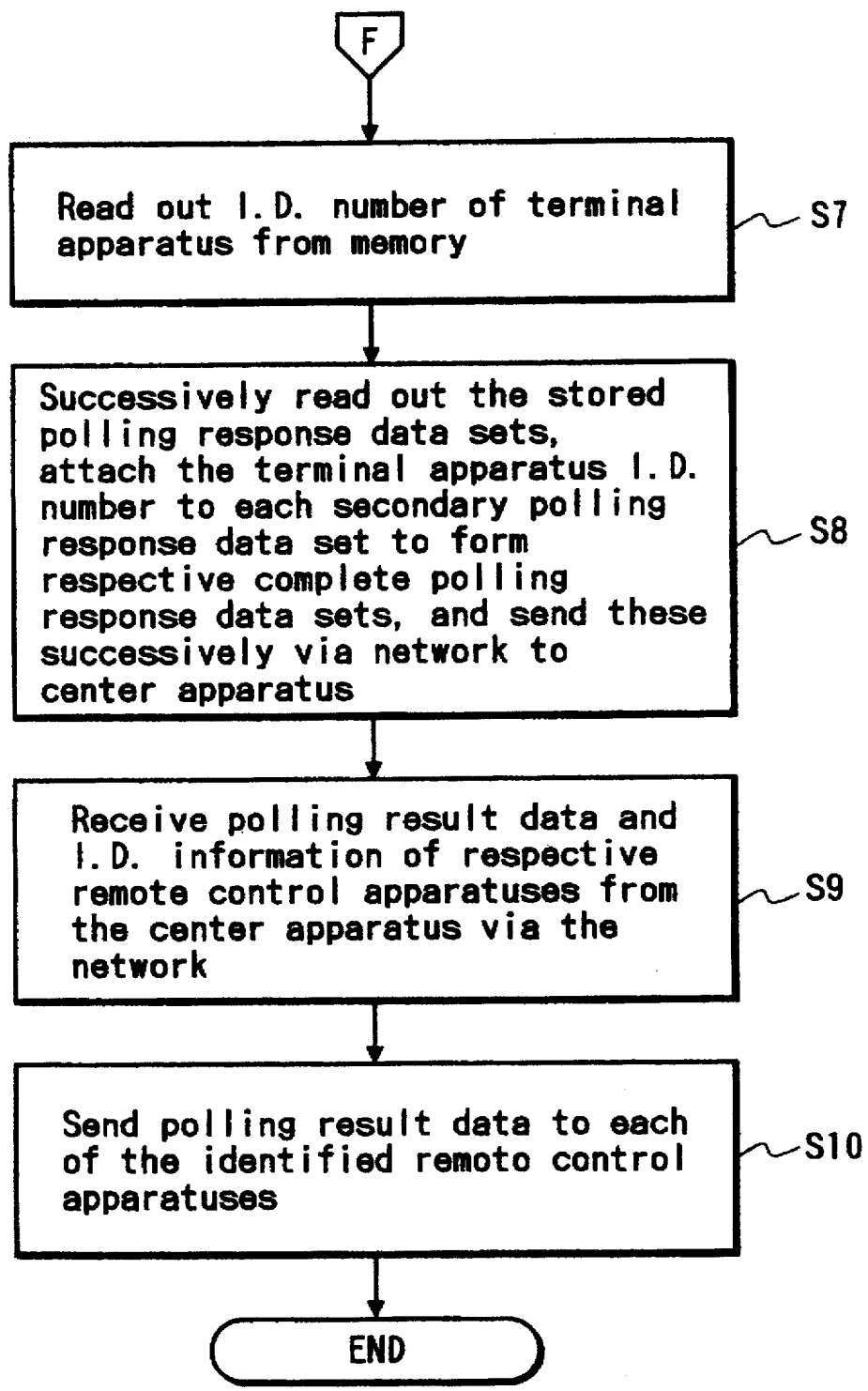

FIG. 14 is a flow diagram of an example of the operations executed by the center apparatus of the above second embodiment, to carry out a poll of users of the system. FIGS. 15A, 15B constitute a flow diagram of a corresponding example of the operations which would be executed by a terminal apparatus of the above embodiment, while FIG. 16 is a flow diagram of an example of the operations executed by a remote control apparatus of the above embodiment.

Figure 17:
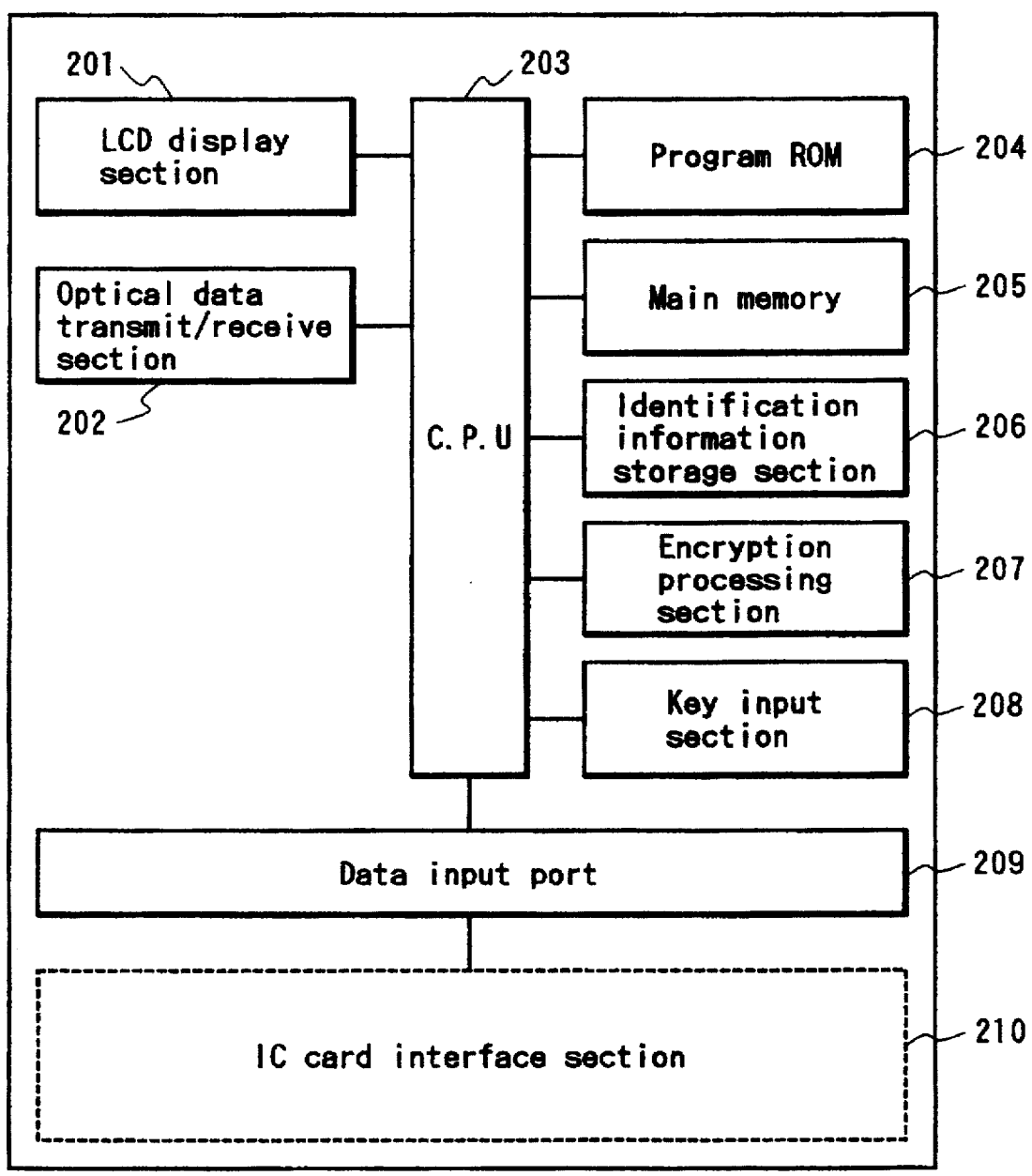
FIG. 17 is a system block diagram showing an example of the basic configuration of a remote control apparatus for use in an interactive television system according to a third embodiment of the invention, whereby user recognition by a remote control apparatus is performed by use of a plug-in IC card.

A third embodiment of the present invention will be described referring to the drawings. This embodiment will be described for the case in which the system is used to respond to requests (i.e. requests which are input by using a remote control apparatus) from users for various services which can be provided by the center apparatus. FIG. 17 is a diagram showing the configuration of a remote control apparatus of this embodiment. FIGS. FIG. 18A and 18B constitute a conceptual block system diagram showing the general configuration of an interactive television system according to this embodiment. In the same way as for the preceding embodiments, only a single terminal apparatus of the system is shown, for simplicity of description.

Figure 18A:
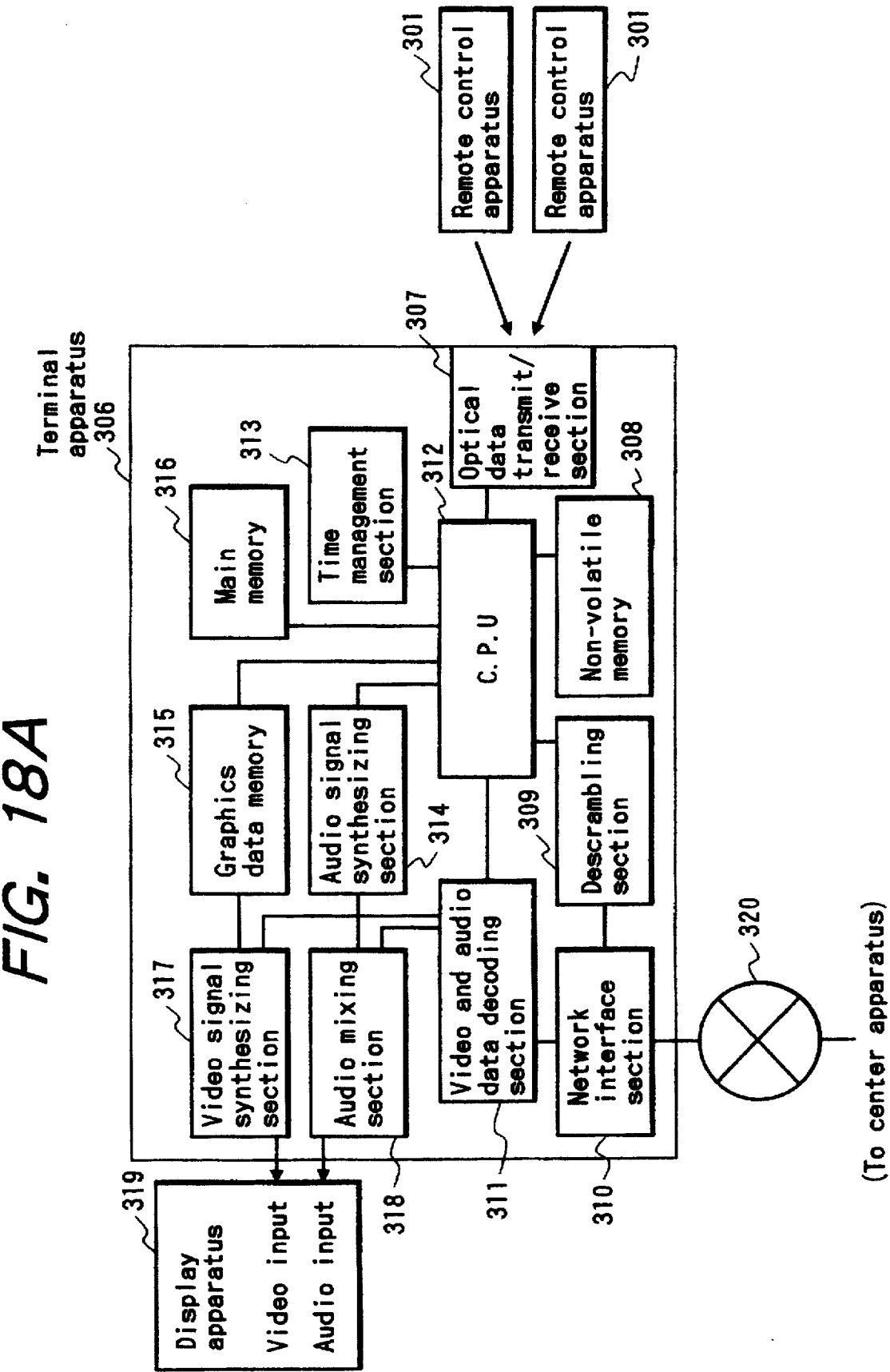
FIGS. 18A, 18B constitute a basic system block diagram of an example of an interactive television system according to the third embodiment, conceptually illustrating internal functions of a center apparatus, a terminal apparatus and a remote control apparatus.

In FIG. 18A, the terminal apparatus 306 receives message data, i.e. service request data, from remote control apparatuses 301, via an optical data transmit/receive section 307, i.e. it is assumed that bidirectional communication with the remote control apparatuses is possible, although that is not essential for this embodiment. Operations executed by the terminal apparatus are controlled by processing executed by a CPU 312, in accordance with a program which is stored in a non-volatile memory 308, which also holds the remote control apparatus identifier. As for the preceding embodiments, the terminal apparatus 306 executes bidirectional data communication with the center apparatus 330 via a CATV network 320. When service data are received from the center apparatus 330, the data are transferred via the network interface section 310 (i.e. which operates in accordance with a specific data communication protocol) to be converted to audio and video data by a video and audio data decoding section 311. Resultant audio and video signals are transferred to the audio and video inputs respectively of a display apparatus 319. In addition, the CPU 312 itself can generate audio and video data, for providing warning messages etc. to users, by data supplied to an audio signal synthesizing section 314 and a graphics data memory 315 and video signal synthesizing section 317, which can also be used by the CPU 312 to selectively enable or inhibit the supply of the aforementioned video and audio signals of a service (transmitted from the center apparatus) to the display apparatus 319.

Figure 18B:
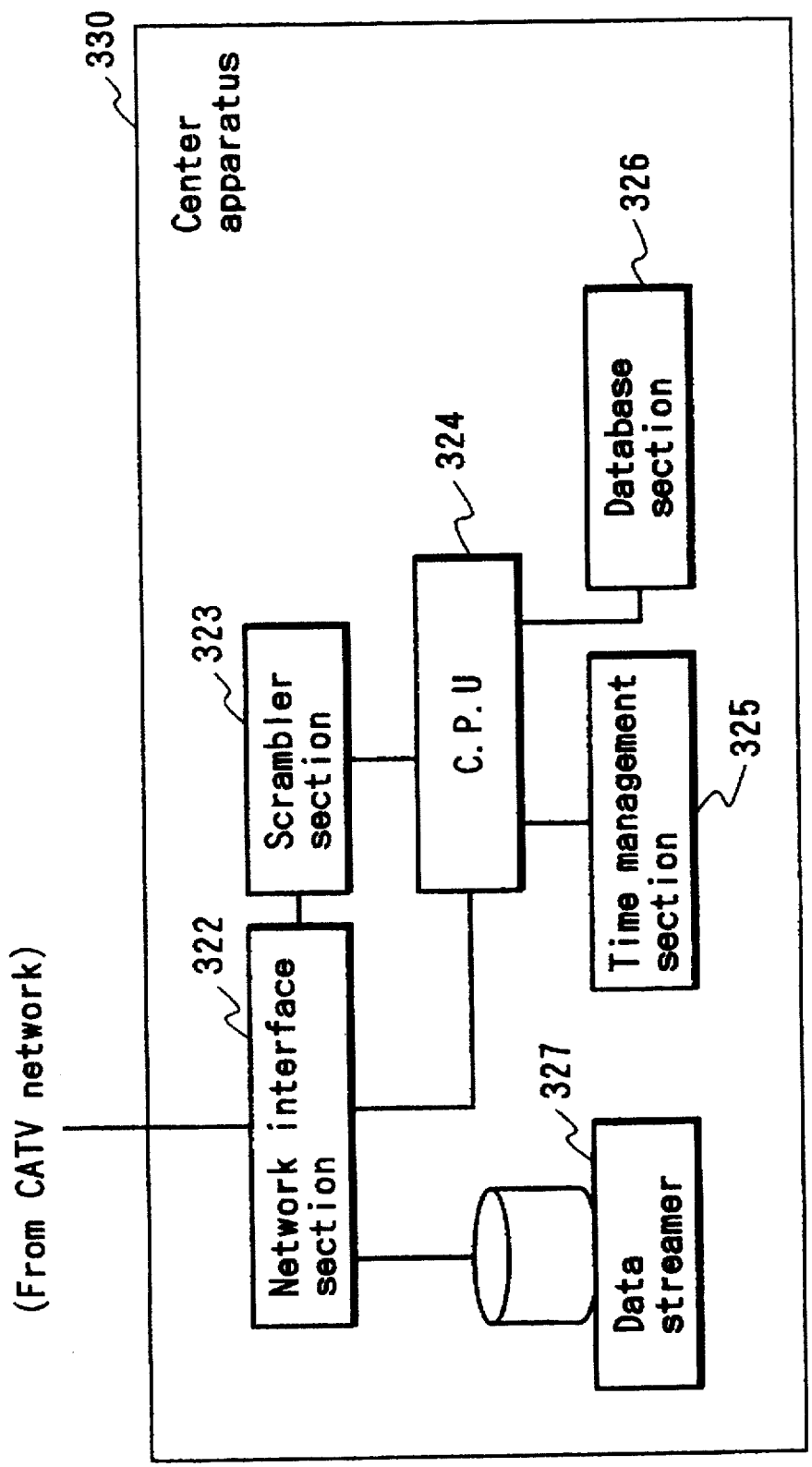

As shown in FIG. 18B, the center apparatus 330 of this embodiment includes a section, indicated as the data streamer 327, whereby data of various services can be generated as required (i.e. in response to user requests sent in the form of request data sets) and supplied via a network interface section 322 and the CATV network to the terminal apparatuses of respective users. The center apparatus 330 also includes a database section 326, which stores data including information relating to various users, information which relates each terminal apparatus identifier to the respectively corresponding remote control apparatus identifiers as described for the preceding embodiments, etc. In the same way as for a usual type of remote control apparatus, the remote control apparatus of this embodiment shown in FIG. 17 is provided with a key input processing section 208 (e.g. formed of a set of user-operable input keys and a corresponding interface circuit, as is well known in the art) whereby a user can input message data such as service requests, to be processed by a program which is executed by a CPU 203, with the program data being stored beforehand in a program ROM 204. Resultant data are transmitted to the corresponding terminal apparatus by an opto-emissive transmitting section 202. The terminal apparatus is provided with a corresponding opto-receptive receiving section, so that a data communication link is established.

However in addition to these elements, this remote control apparatus is provided with a personal information storage section 206, having stored therein a remote control apparatus identifier, which will be assumed to be an identifier number, i.e. which identifies that particular remote control apparatus. The personal information storage section 206 also has stored therein user identification information. Various types of information could be utilized as this user identification information. For example, the information could consist of one or more personal attribute information items, as described hereinabove for the preceding embodiments. Alternatively, the user identification information could simply consist of a identification number, which is uniquely assigned to a specific user, or to a specific category of user. In general in the following, such a user or user category will be referred to as an "authorized user" or "category of authorized users".

In addition, the personal information storage section 206 also has stored therein information which can be used by the remote control apparatus itself, to recognize that a user is an authorized user. Such information will be referred to in the following as user-specifying information. It will first be assumed that this stored user-specifying information consists of a code, such as a password. In this case, before inputting message data to be sent to the center apparatus, a user must first input the necessary password, by using the key input section 208. Processing is then executed to read out the stored password and compare this with the input password. If these are identical, then this indicates that the remote control apparatus is being used by an authorized user. When the user then (e.g. within a certain predetermined maximum time period after inputting the password) inputs message data, such as data to request a specific service, again by using the key input section 208, then the remote control apparatus identifier and the user personal information will be read out and attached to the service request data, to form a data set which will be referred to as a "request data set". This is then sent to the corresponding terminal apparatus, via the aforementioned optical data communication link, and then transferred via the CATV network to the center apparatus.

With the remote control apparatus of this embodiment, an encryption processing section 207 can be included. In that case, rather than directly attaching the user personal information to the request data set, the user personal information can first be encrypted, and the encrypted code transmitted in place of the user personal information, in the request data set. The terminal apparatus is capable of decrypting such encrypted information, i.e. is provided with a suitable decryption key, to recover the user personal information. This provides increased security, since there is a reduced possibility that user personal information could be interecepted by unauthorized individuals and used to access the system. However if such a security feature is not necessary then of course the encryption processing section 207 can be omitted, and the user personal information can be directly attached to the request data set.

Alternatively, as indicated in FIG. 17, an IC (integrated circuit) interface section can be provided in the remote control apparatus, i.e. a receptacle for a plug-in card having a specific type of IC mounted thereon, enabling the IC to be electrically connected via a data input port 209 to the CPU 203 of the remote control apparatus. The IC can for example be a small ROM (read-only memory) or data register having a specific code fixedly stored therein, with a corresponding user-specifying code being held in the personal information storage section 206. In that case, before inputting message data, e.g. before inputting service request data, a user must first insert the appropriate IC card into the interface section 210. The CPU 203 then executes processing to compare the data provided by the IC card with the user-specifying code which is stored in the personal information storage section 206, to effect recognition of an authorized user.

Figure 19:
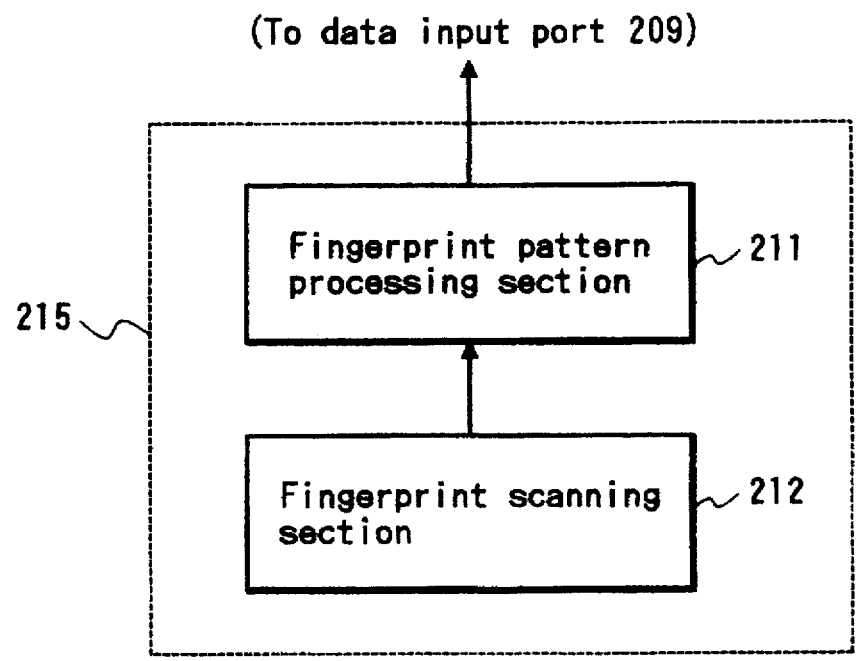
FIGS. 19 and 20 show alternative arrangements for achieving user recogntion by the remote control apparatus of FIG. 17, whereby recognition is performed based on fingerprint patterns and on voice patterns, respectively.

Alternatively, instead of supplying such code data obtained from an IC via the data input port 209, the remote control apparatus of this embodiment can be configured to include a fingerprint information generating section, as illustrated in FIG. 19. Here, the fingerprint information generating section 215 consists of a fingerprint scanning section 212, which can scan a user's fingerprints to obtain resultant signals, and a fingerprint pattern processing section 211, which converts these signals into fingerprint pattern data. In that case, the identification information storage section 206 has stored therein, as the user-specifying information, fingerprint pattern data of an authorized user, which have been set therein beforehand (e.g. by an authorized user employing the fingerprint information generating section 215 in a predetermined "registering" mode, to register his or her fingerprint pattern data in the identification information storage section 206, rather than in a usual "recognition" mode).

With that version of this embodiment, before inputting message data via the remote control apparatus, the user's fingerprint must first be recognized as that of an authorized user, e.g. by the user placing a finger over a specific region of the surface of the remote control apparatus, or simply by grasping the remote control apparatus in a normal manner. Since various types of circuits and components for performing such fingerprint recognition are now well known, detailed description will be omitted.

Figure 20:
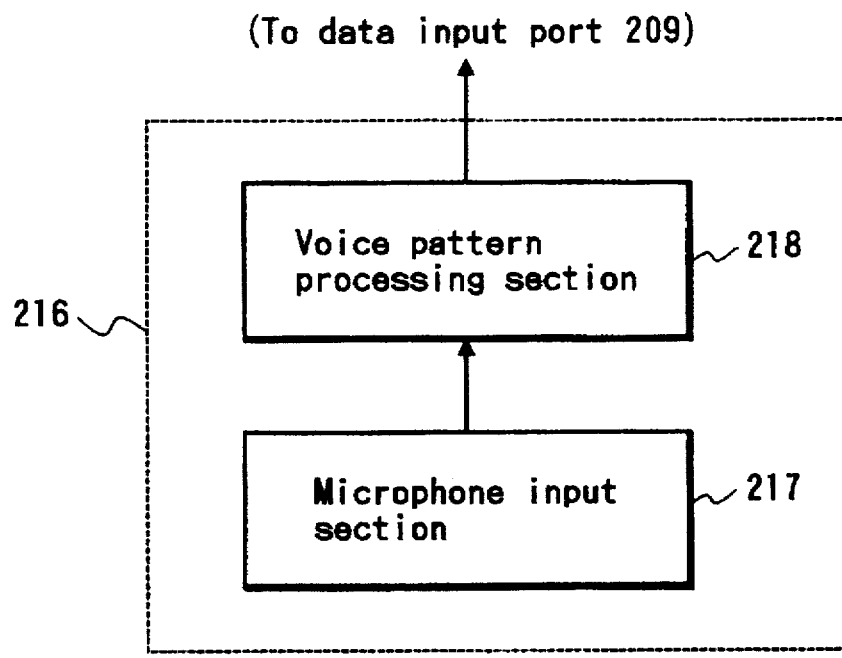

As a further alternative version of the remote control apparatus of this embodiment, the user-specifying information can be generated as voice pattern data. In that case, the user-specifying information which are supplied to the data input port 209 are generated by a voice information generating section 216 as illustrated in FIG. 20. As shown, this consists of a microphone input section 217 (e.g. a microphone and preamplifier circuit), which supplies electrical signals to a voice pattern processing section 218. The voice pattern processing section 218 generates corresponding voice pattern data, while voice pattern data of an authorized user are held stored, as user-specifying information, in the identification information storage section 206. The remote control apparatus is capable of registering such voice pattern data of an authorized user beforehand, as described for the case of fingerprint recognition. In this case, to achieve recognition of an authorized user, the user must speak into the microphone input section 217, and the resultant voice pattern data are then compared with the stored voice pattern data.

Figure 21:
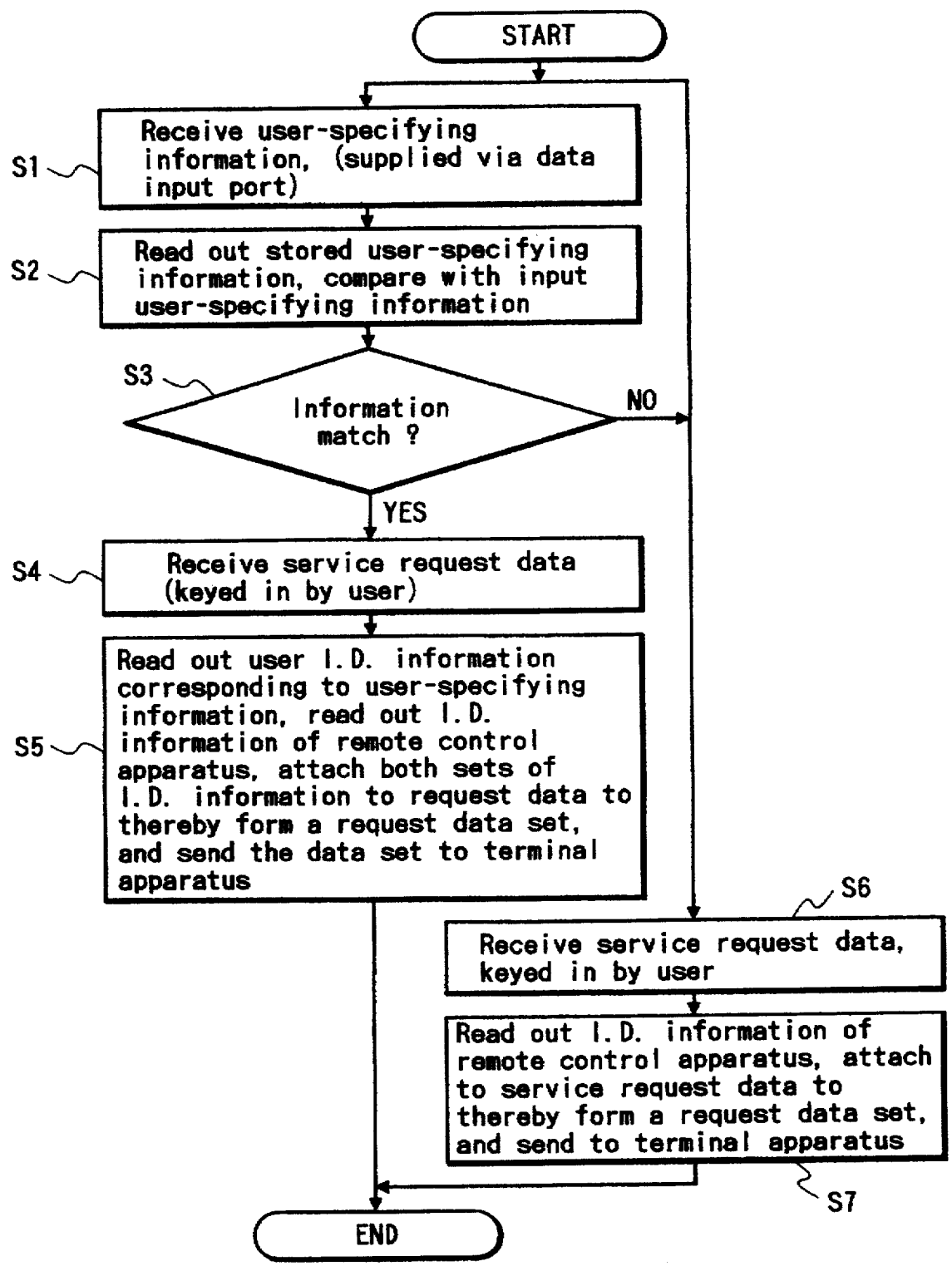
FIG. 21 is a flow diagram showing an example of the operation of a remote control apparatus of an interactive television system according to the third embodiment.
Figure 22:
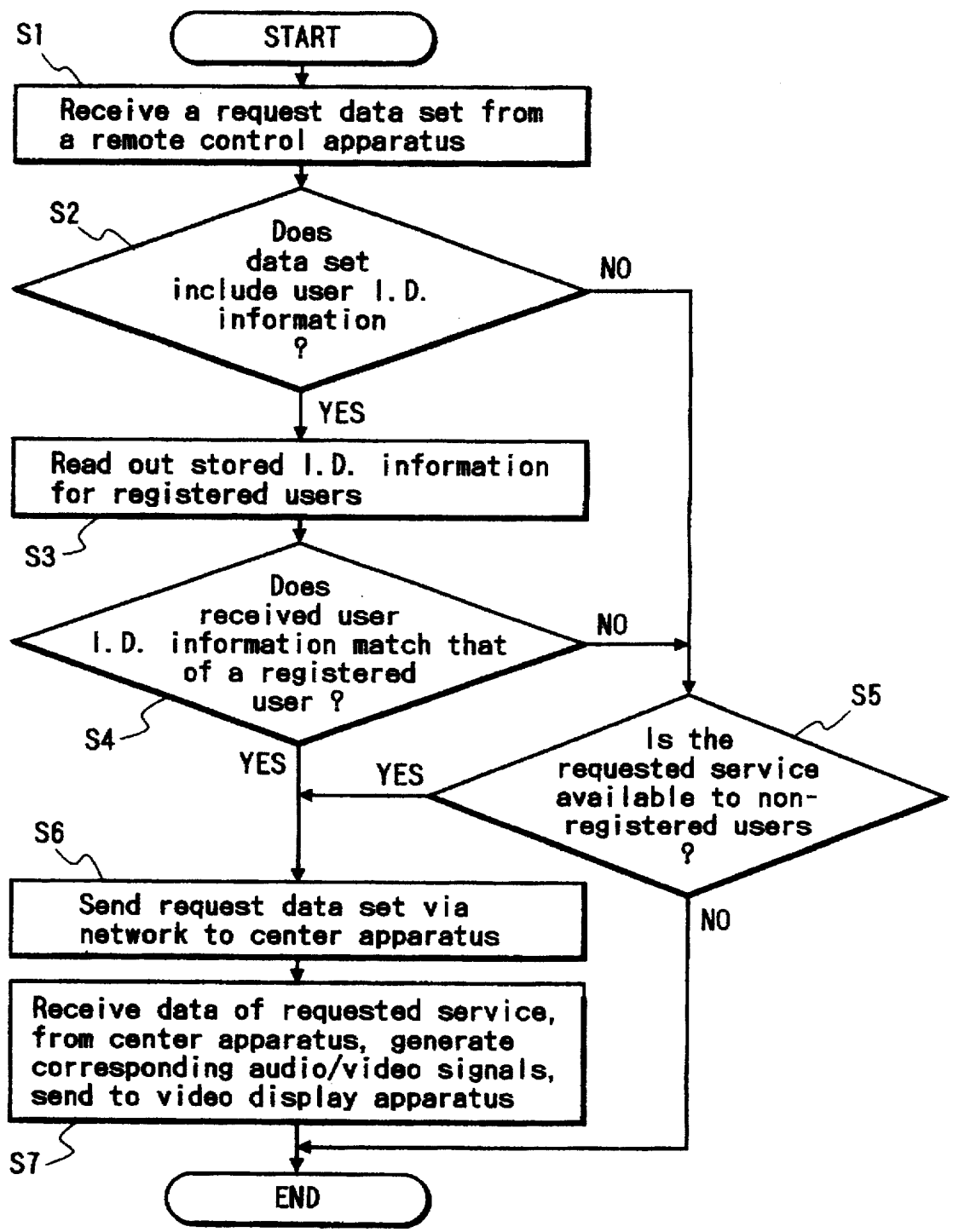
FIG. 22 is a flow diagram showing an example of the processing executed by a terminal apparatus of the third embodiment, in correspondence with the processing of FIG. 21.

FIG. 21 is a flow diagram of an example of the processing which is executed by the CPU 203 of a remote control apparatus of this embodiment to perform the operation described above, for the case in which the user identifier information is attached directly to the service request data, in a request data set, i.e. without encryption, not while FIG. 22 is a corresponding flow diagram of the processing executed by the CPU 312 of a corresponding terminal apparatus of this embodiment.

In these diagrams, it is assumed that each remote control apparatus can be utilized by both authorized and non-authorized users. If a non-authorized user inputs a service request, then the remote control apparatus generates and transmits a corresponding request data set, however that data set does not include the user identifier information. When such a request data set is received by the center apparatus, the center apparatus will provide only those services which are available to non-authorized users.

However it would be equally possible to ensure that each remote control apparatus, or some specific remote control apparatuses, are reserved for the use of only a particular authorized user. In that case, if user recognition is not achieved, then any service request which is input to the remote control apparatus will not result in transmission of a request data set. For example, this could readily be accomplished by a simple modification, e.g. whereby the steps S6 and S7 in the flow diagram of FIG. 21 are omitted, so that any data which are keyed in by an unauthorized user is, in effect, ignored by the remote control apparatus.

Figure 23:
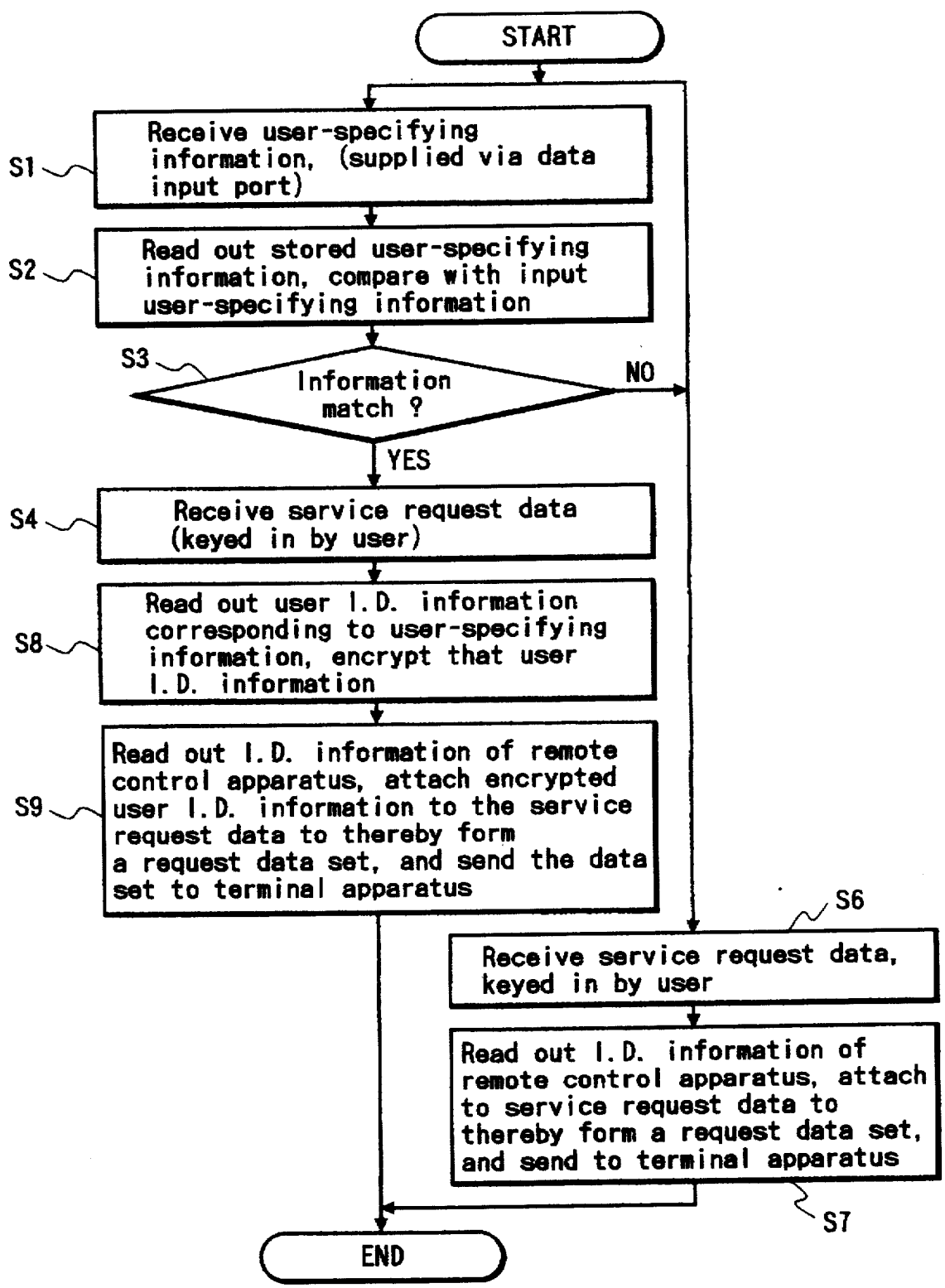
FIG. 23 is a flow diagram showing an example of the operation of a remote control apparatus of an interactive television system according to a modification of the third embodiment, whereby user identification information is encrypted before being sent from and remote control apparatus to a terminal apparatus.
Figure 24:
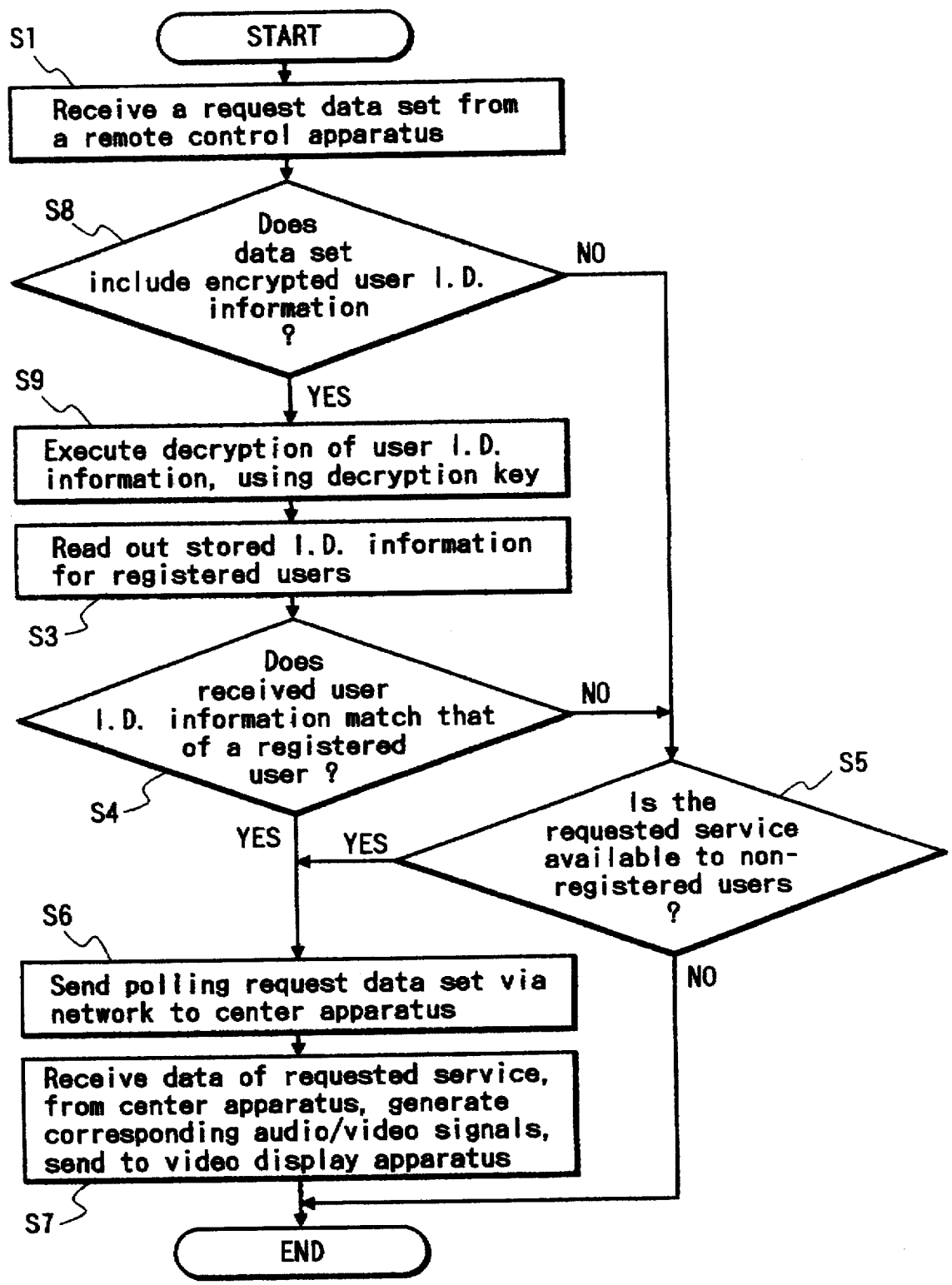
FIG. 24 is a flow diagram showing an example of the processing executed by a terminal apparatus of the modified third embodiment, in correspondence with the processing of FIG. 24.
Figure 25:
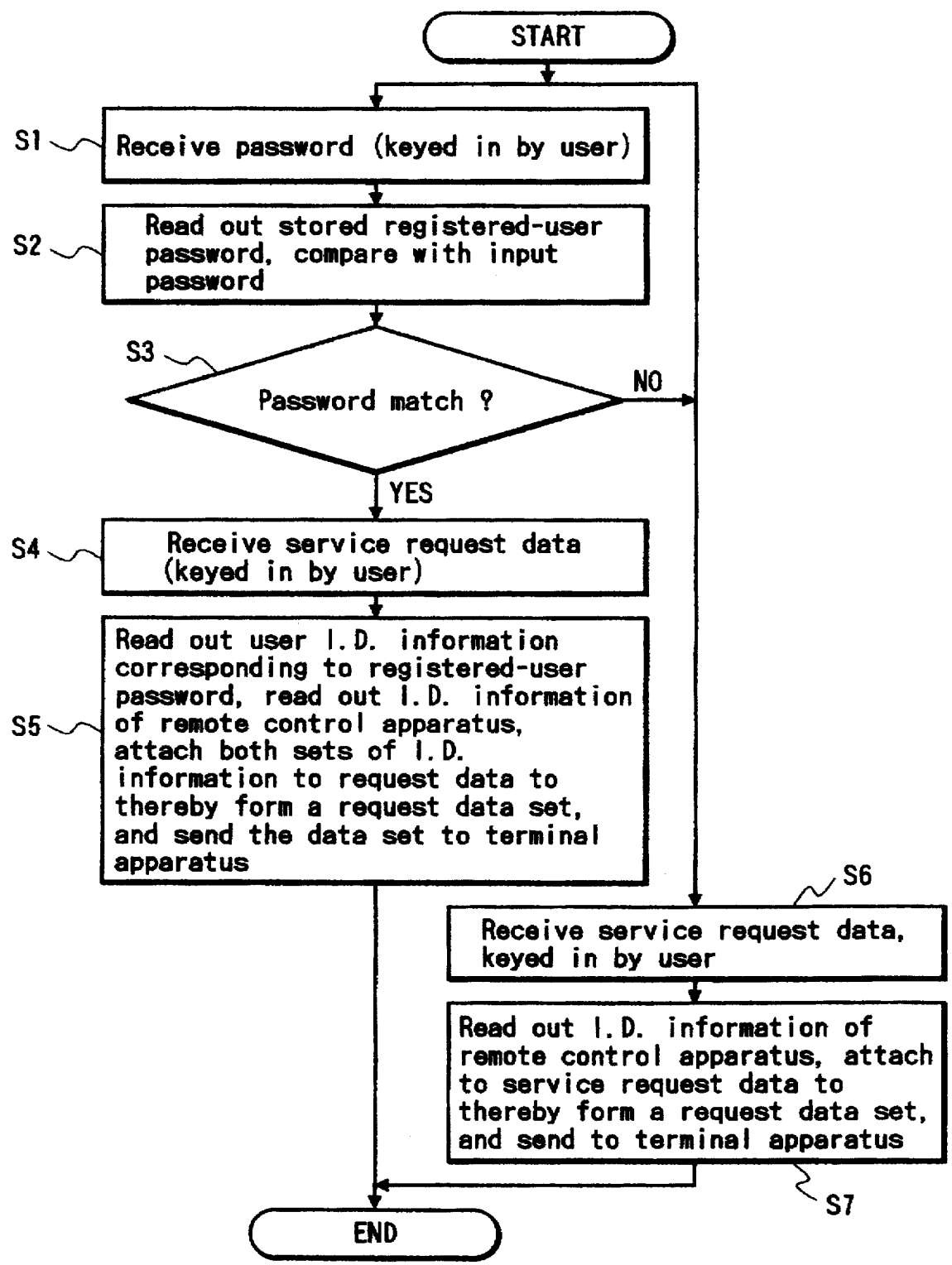
FIG. 25 is a flow diagram showing an example of the operation of a remote control apparatus of an interactive television system according to a second modification of the third embodiment, whereby user recognition is performed in response to keying-in of a predetermined password by a user.
Figure 26:
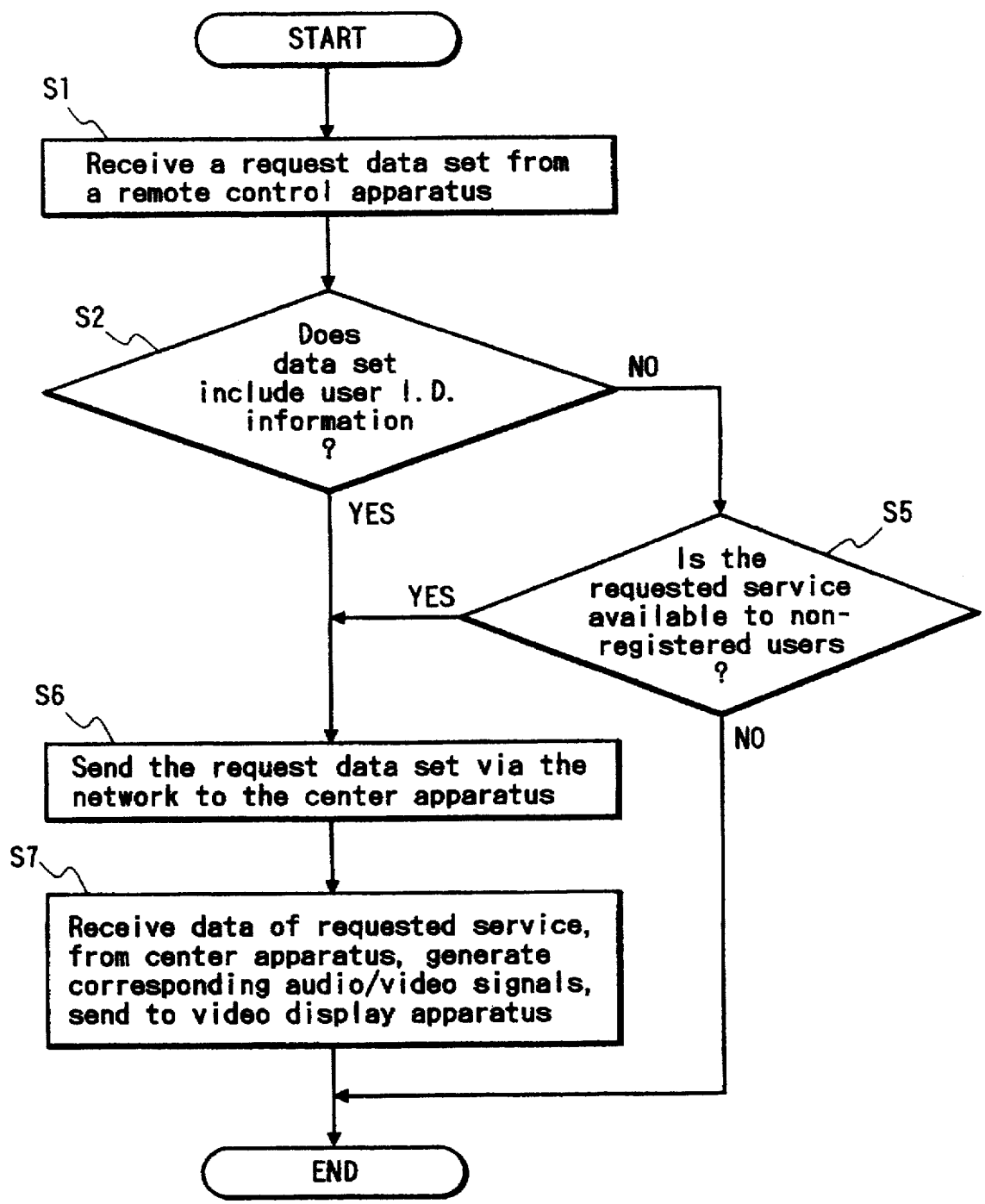
FIG. 26 is a flow diagram showing an example of the processing executed by a terminal apparatus of the second modification of the third embodiment, in correspondence with the processing of FIG. 25

FIG. 23 is a flow diagram of an example of the processing which is executed by the CPU 203 of a remote control apparatus of this embodiment to perform the operation described above, for the case in which the user identifier information is encrypted before being attached to the service request data, in a request data set, to be subsequently decrypted when received by the terminal apparatus, while FIG. 24 is a corresponding flow diagram of the processing executed by the CPU 312 of the corresponding terminal apparatus. In the case of the processing shown in FIGS. 21, 22 and 23, 24, it can be assumed that the method of inputting the user-specifying information, by a user, is different from the method of inputting service request data, i.e. the user-specifying information may be input via the data input port 209 of FIG. 17, by a method such as the plug-in IC card, fingerprint recognition, or voice pattern recognition. However if the user-specifying information must be input by key actuations, i.e. is a specific code such as a password which must be input by the user, then it is necessary for the remote control apparatus to differentiate between input data which constitutes a user password and input data which constitutes service request data. Various ways of achieving this could readily be envisioned, so that detailed description will be omitted. FIG. 25 is a flow diagram of an example of the processing which is executed by the CPU 203 of a remote control apparatus of this embodiment to perform the operation described above, for the case in which the user must input a password to be recognized as an authorized user, while FIG. 26 is a corresponding flow diagram of the processing executed by the CPU 312 of the corresponding terminal apparatus.

In the above flow diagrams of FIGS. 21 to 26, e.g. in step S4 of FIG. 22, the terminal apparatus confirms that the received user identifier information matches that of a registered user, i.e. confirms that identifier information for that specific individual has been registered at the terminal apparatus, as a user who is authorized to receive certain specific services. However various other modifications could be utilized. For example, rather than user identifier information being employed as described above, one or more items of personal attribute information could be stored in each remote control apparatus in correspondence with the user-specifying information of the corresponding user. For example, the age of the user could be stored in the identification information storage section 206 of FIG. 17. In that case, the terminal apparatus can store information which relates a certain category of user (e.g. all users who are 18 years of age or higher) to specific services which are available only to such users. This could be readily accomplished by slightly modifying the flow diagrams described above, for example by changing the steps S2, S3, S4 in FIG. 22 to become respectively:

S1: Does data set include "user age" information item?

S2: Read out stored information relating specific services to the age range of users who are permitted to access the services.

S3: Does received "user age" value fall within specified age range?

In that way, without the need for the system (other than each remote control apparatus) to actually identify respective users, it becomes possible to reliably ensure that certain services will only be provided only to users who are known to fall within a specific category, such as the category "adult". It can thereby be ensured, for example in the case of a system in which the terminal apparatuses are installed in respective homes of users, that a remote control apparatus can be used in common by both adults and children, but that certain services will be provided by the interactive television system only in response to a request that is input by an adult.

The above is true also for the case in which decisions as to whether to provide a requested service are made by the center apparatus, rather than by each terminal apparatus, as described hereinafter with respect to other embodiments of the invention. In each case the system can be configured to either:

(a) recognize specific registered individuals as being authorized to receive a requested service (or to input data which will result in some change in the system operating conditions, such as a change in some initial parameters), or (b) recognize that a requesting user has sent a service request accompanied by personal attribute information (such as "user age") which indicates that the user falls within a predetermined category of users, i.e. the category of users who are authorized to receive a specific service.

Alternatively, each remote control apparatus could store a set of personal attribute information items (as described for the first embodiment hereinabove) relating to a specific user, all of which could be attached and sent with a service request, as a request data set, when the requesting user has been recognized by the remote control apparatus. In that case, the terminal apparatus can selectively utilize those personal attribute information items which may be necessary for determining whether a particular service can be provided to the user.

Figure 27:
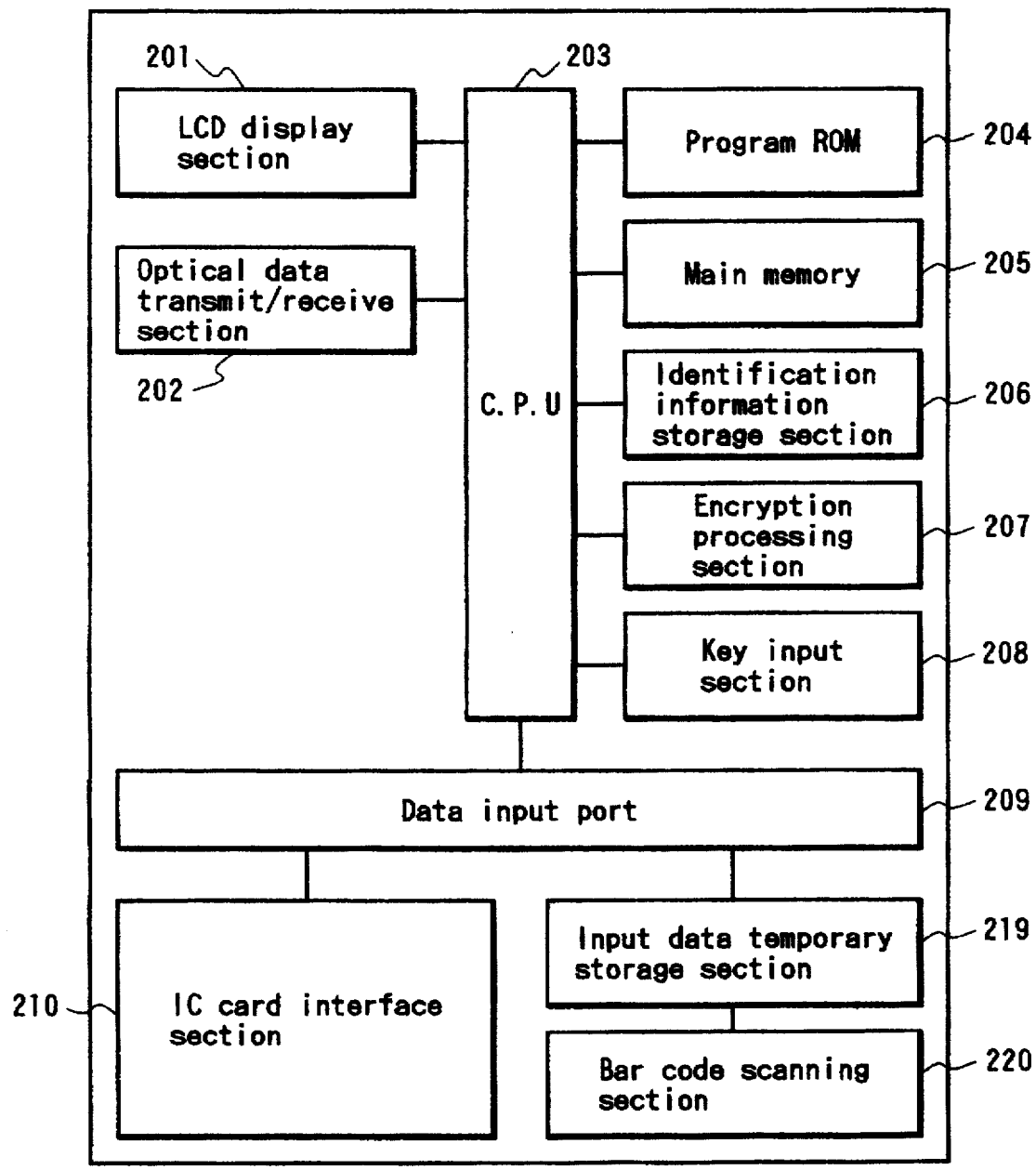
FIG. 27 is a system block diagram showing an example of the basic configuration of a remote control apparatus for use in an interactive television system according to a fourth embodiment of the invention, whereby service request data appearing on a printed page in the form of bar code can be read into the remote control apparatus by scanning.

In the above it has been assumed that a user inputs service request data by actuating keys of the key input section 208 of a remote control apparatus. However in certain applications, such as video home shopping, it has been necessary for a user to successively select various menu pages to be displayed by the display apparatus 319, each containing a list of services or other menu pages, in order to find a desired service. Alternatively, it may be necessary for a user to read through various pages of printed matter, in order to find information that is necessary for requesting a desired service from the interactive television system, and to then input the necessary information, as service request data, by using the key input section 208. This is troublesome for the user. A fourth embodiment of the invention will be described whereby service request data can be input by scanning data which are printed in bar code form, on printed pages. This embodiment differs from the third embodiment described above only with respect to the configuration of each remote control apparatus, as shown in FIG. 27. As shown, this includes a bar code scanning section 220, i.e. a combination of an optical bar code scanning device and a suitable interface circuit for converting the resultant signals to digital data, and an input data temporary storage section 219. Data which are read in by bar code scanning and set into the input data temporary storage section 219 can be supplied via the data input port 209 to the CPU 203, to be then converted to suitable form for supply to the LCD display section 201 of the remote control apparatus, and displayed to the user. The user can thereby confirm that the correct information has been obtained by bar code scanning, and can then actuate a predetermined key of the key input section 208 (e.g. an "enter" key), causing the CPU 203 to generate a corresponding request data set as described above for the second and third embodiments, and send that to the center apparatus via the corresponding terminal apparatus.

Figure 28:
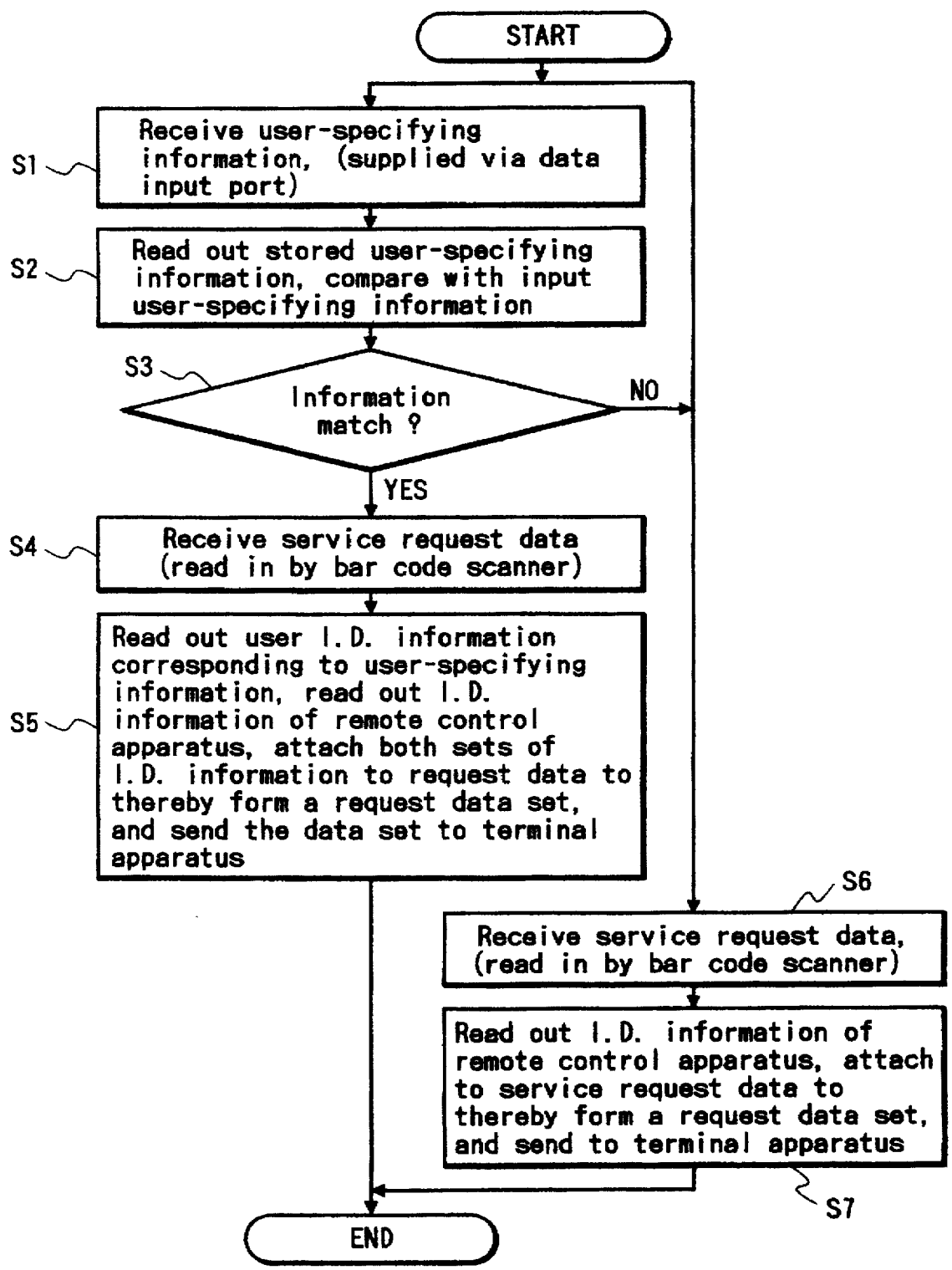
FIG. 28 is a flow diagram showing an example of the operation of a remote control apparatus of an interactive television system according to the fourth embodiment.

FIG. 28 is a flow diagram of an example of the processing which is executed by the CPU 203 of a remote control apparatus of this embodiment to perform the operation described above, i.e. whereby the user inputs service request data by utilizing bar code scanning.

In some applications, particularly in the case of video home shopping, a user may wish to send a large number of different service requests to the system, e.g. a number of requests to purchase various different articles. In that case it is inefficient, with respect to system utilization, for separate data transfer operation to be executed from the terminal apparatus to the center apparatus in response to each of these successive requests. As a modification of the above embodiment, this can be configured such that successive items of information which are input by successive bar code scanning operation are stored in the input data temporary storage section 219, until the user has completed selecting the various items. The user can then actuate the aforementioned predetermined key, or perform some other action which indicates to the remote control apparatus that bar code item selection has been completed, whereupon a request data set will be generated which consists of the entire set of selected items, i.e. entire set of service request data items, with the remote control apparatus identifier and user identifier information attached thereto, and this request data set will be transmitted via the terminal apparatus to the center apparatus. The various service request items will then be handled sequentially by the center apparatus. By sending all of the selected service requests together in this way, efficient use of the CATV network is achieved.

Figure 29:
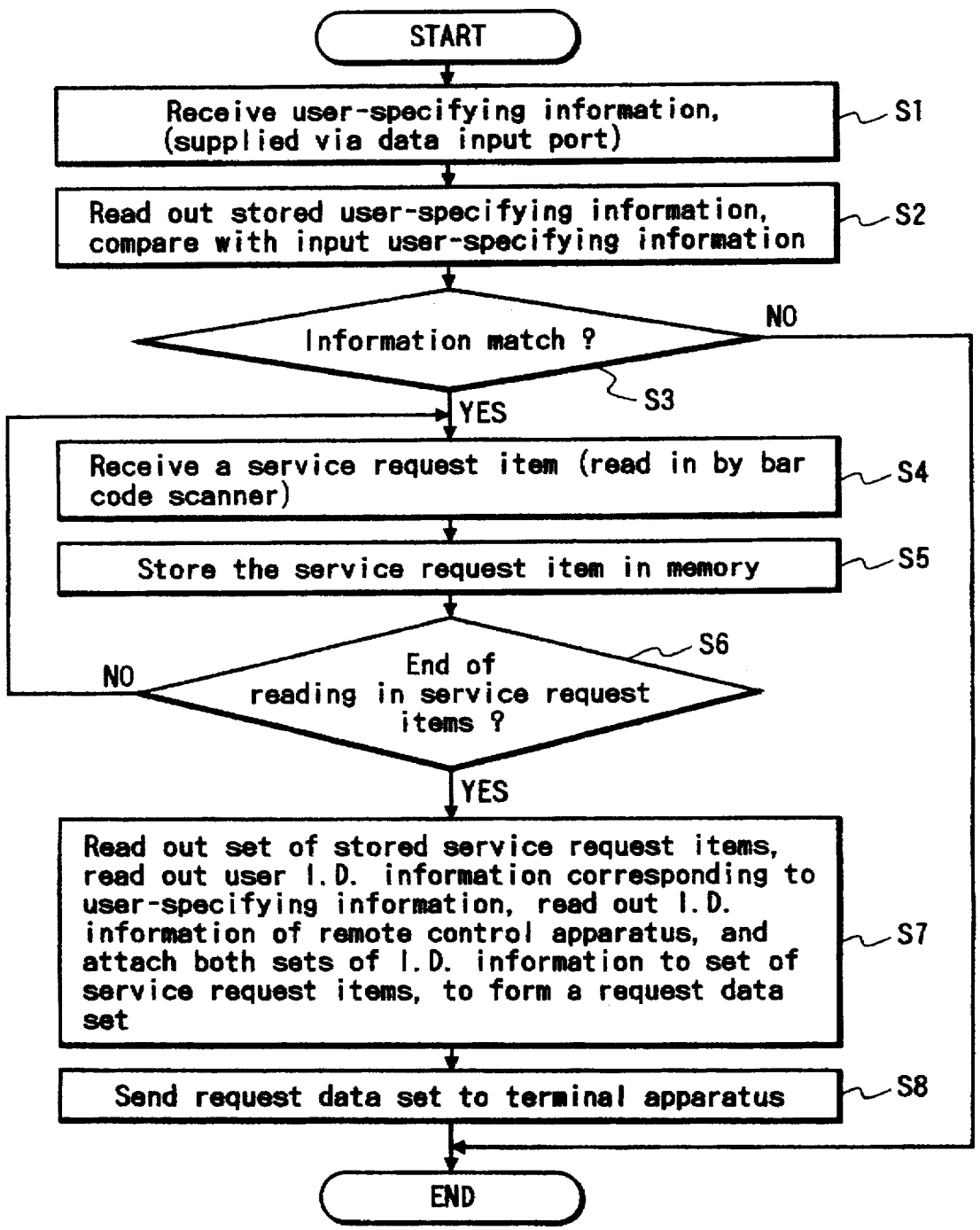
FIG. 29 is a flow diagram showing an example of the operation of a remote control apparatus of an interactive television system according to a modification of the fourth embodiment, whereby a plurality of service request data items can be read in by successive bar code scanning operations, with all of the data items being sent together from the remote control apparatus to the corresponding terminal apparatus.

FIG. 29 is a flow diagram of an example of the processing which is executed by the CPU 203 of a remote control apparatus of this embodiment to perform the operation described above, i.e. whereby the user inputs service request data by utilizing bar code scanning, but whereby a plurality of service request data items can be accumulated and then sent together to the center apparatus.

As another embodiment of the invention, utilizing the same remote control apparatus configuration as that shown in FIG. 27, it is possible for a plurality of data items, respectively input by bar code scanning, to be held in the input data temporary storage section 219, with corresponding data being generated by the CPU 203 and supplied to be displayed by the LCD display section 201, in the form of a menu. In the case of video home shopping for example, each such data item might correspond to information necessary for requesting the purchase of a specific article. The user can then designate one or more of these data items to be sent (i.e. as service request data) to the center apparatus, as described for the preceding embodiments. For example, each item in the menu thus displayed may be shown beside a specific numeral, in which case it can be arranged that a user can select a menu item by inputting the appropriate number, using the key input section 208.

Figure 30:
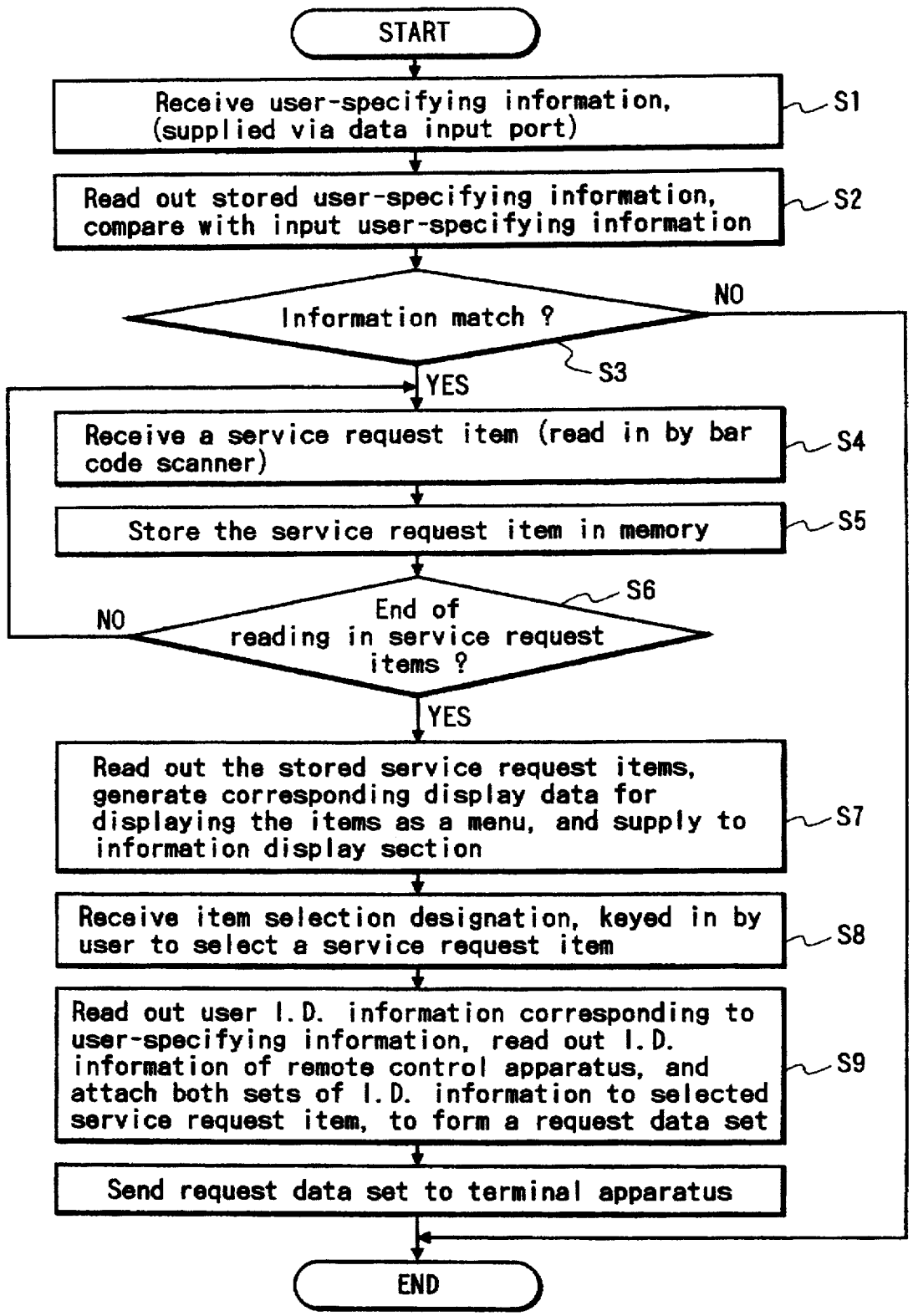
FIG. 30 is a flow diagram showing an example of the operation of a remote control apparatus of an interactive television system according to a second modification of the fourth embodiment, whereby a plurality of service request data items can be read in by successive bar code scanning operations, with the items then being displayed as a menu by an information display section of the remote control apparatus.

FIG. 30 is a flow diagram of an example of the processing which is executed by the CPU 203 of a remote control apparatus of this embodiment to perform the operation described above, i.e. whereby the user inputs data items by utilizing bar code scanning, but whereby a plurality of data items can be accumulated and then displayed to the user in the form of a menu, from which the user can select one or more data items to be sent as service request data via the corresponding terminal apparatus to the center apparatus.

An embodiment will now be described whereby for the center apparatus controls the assignment of services to the users, in accordance with whether a service is restricted to users of registered remote control apparatuses, i.e. authorized users, and whether a requesting user is utilizing a registered remote control apparatus. An example of the operation of such an embodiment is shown in the flow diagrams of FIGS. 31, 32 and 33. It is assumed here that a request data set is generated by a remote control apparatus by attaching only the remote control apparatus identifier to the service request data that has been input by the user, i.e. that no actual recognition of the user is performed by each remote control apparatus. However it would be equally possible of course to incorporate a user recognition function (as described hereinabove) into this embodiment, with each remote control apparatus being configured in that case as shown in FIG. 17 or FIG. 27.

Figure 31:
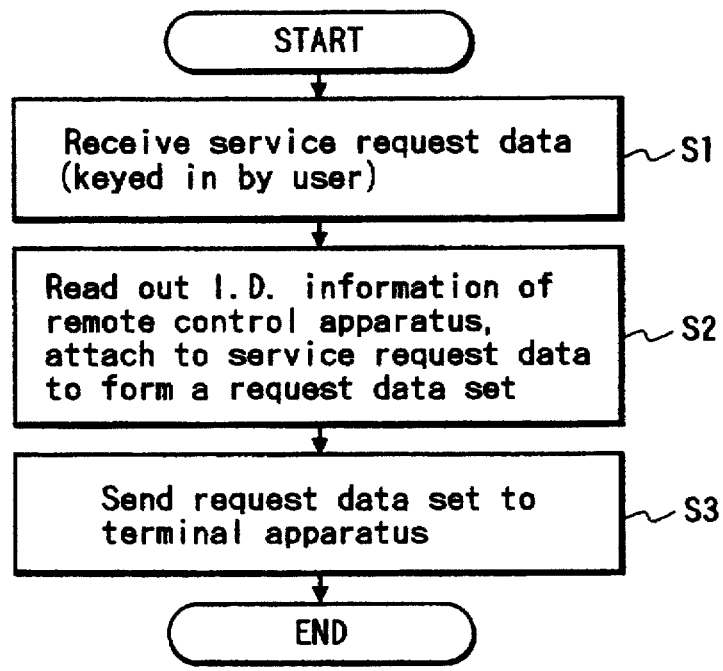
FIGS. 31, 32 and 33 are flow diagrams showing an example of the operations of a remote control apparatus, a terminal apparatus, and the center apparatus, of an interactive television system according to a fifth embodiment, whereby the center apparatus executes processing to selectively supply requested services to users in accordance with whether a service is designated as restricted to authorized users and a requesting user is identified as being an authorized user.
Figure 32:
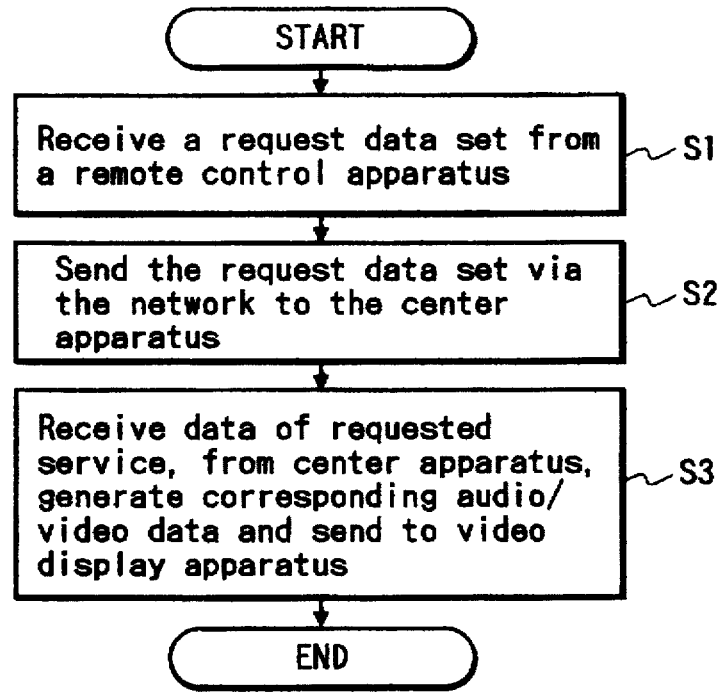
Figure 33:
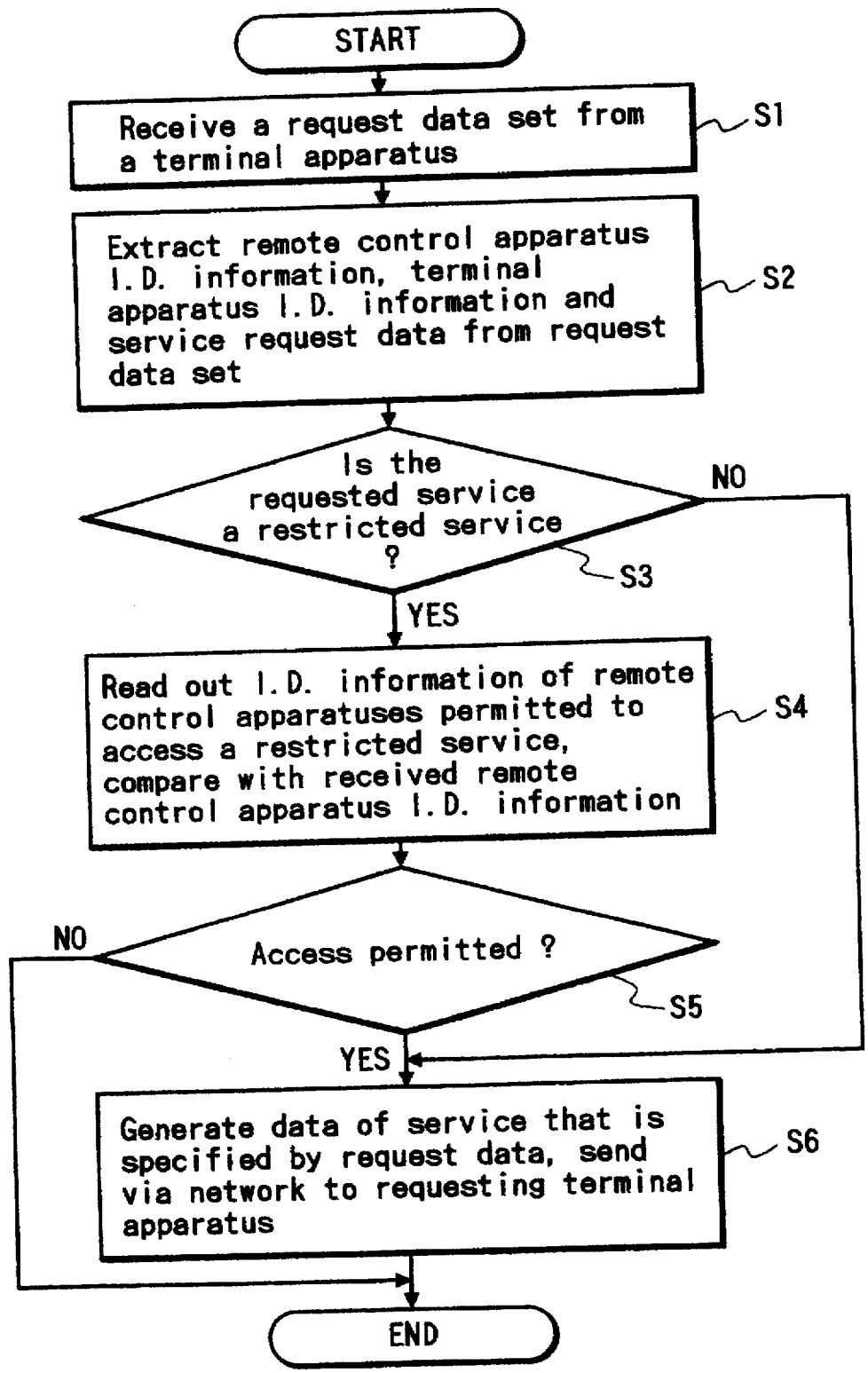

FIG. 31 shows an example of the processing executed by the CPU of a remote control apparatus in an interactive television system according to this embodiment, FIG. 32 shows the corresponding processing which is executed by the CPU of a terminal apparatus of this embodiment, while FIG. 33 shows the corresponding processing which is executed by the CPU of the center apparatus.

With this embodiment, as shown in the flow diagrams of FIGS. 32, 32, and 33, the center apparatus holds stored in memory a list of registered remote control apparatus identifiers, i.e. identifiers of of remote control apparatuses which are respectively assigned to authorized users, and also has service status data stored in memory, which specifies those services which are restricted to being accessed only by registered users, i.e. a corresponding list of services which are available only to authorized users. It can thereby be ensured that a request from a user for a service will only be responded to by the center apparatus if the service is not restricted, or if the service is restricted but the remote control apparatus identifier of the user is listed as that of an authorized user.

A specific example of using such a system would be in a hotel, in which a center apparatus can be controlled by hotel staff, e.g. at the front desk, while the terminal apparatuses are installed in respective rooms of the hotel. In that case, identifier numbers could be assigned to the remote control apparatuses which are identical to the numbers of the respective rooms in which they are located. In that way the hotel staff can easily prevent undesirable services (i.e. entertainment programs or films) from being provided to the hotel guests who are occupying the respective rooms. This can be done by ensuring that such service items are listed as being "restricted" in the aforementioned service status data, and by omitting to list the identifiers of remote control apparatuses of rooms which are occupied by certain hotel guests (such as elderly ladies or ministers of religion, for example) as being registered remote control apparatuses, at the center apparatus. In that way it can be ensured that undesirable services cannot be inadvertently supplied to such guests.

It is equally possible to use such a simplified method of identifying users, i.e. by assuming that each remote control apparatus will only be used by its assigned user, for the case in which each terminal apparatus controls the supply of restricted services. In that case, each terminal apparatus holds stored in memory a list of remote control apparatus identifiers of remote control apparatuses which are respectively assigned to authorized users, and a corresponding list of services which are restricted to only authorized users. It can thereby be ensured that in response to a request from a user for a service, the corresponding terminal apparatus will only permit the resultant service data (sent from the center apparatus) to be displayed and made audible by the display apparatus of that terminal apparatus if the service is not restricted, or if the service is restricted but the remote control apparatus identifier of the user is listed as that of an authorized user.

Figure 34:
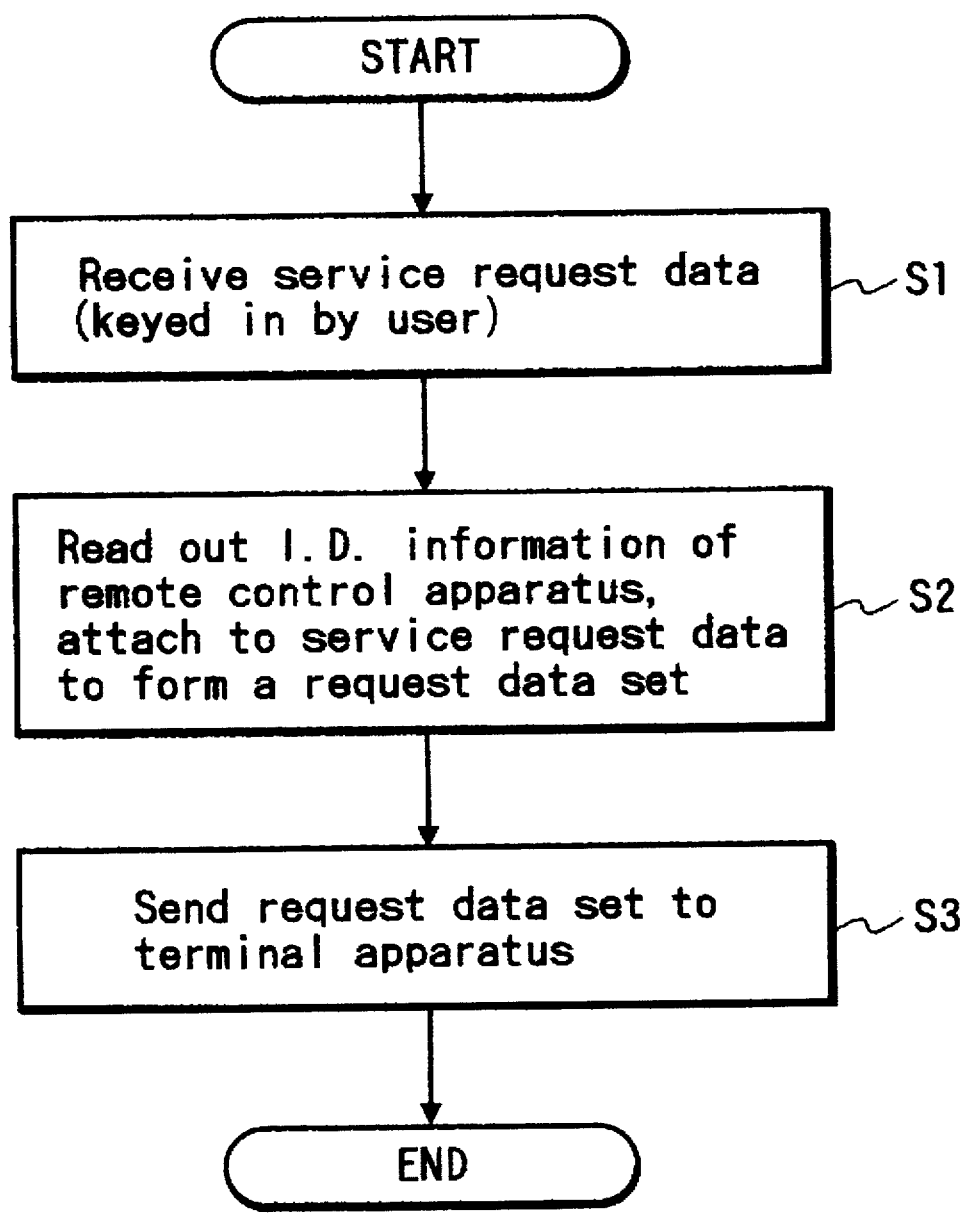
FIGS. 34, 35 and 36 are flow diagrams showing an example of the operations of a remote control apparatus, a terminal apparatus, and the center apparatus, of an interactive television system according to a sixth embodiment, whereby each terminal apparatus executes processing to selectively enable/inhibit the providing of requested services to users in accordance with whether a service is designated as restricted to authorized users and a requesting user is identified as being an authorized user.
Figure 35:
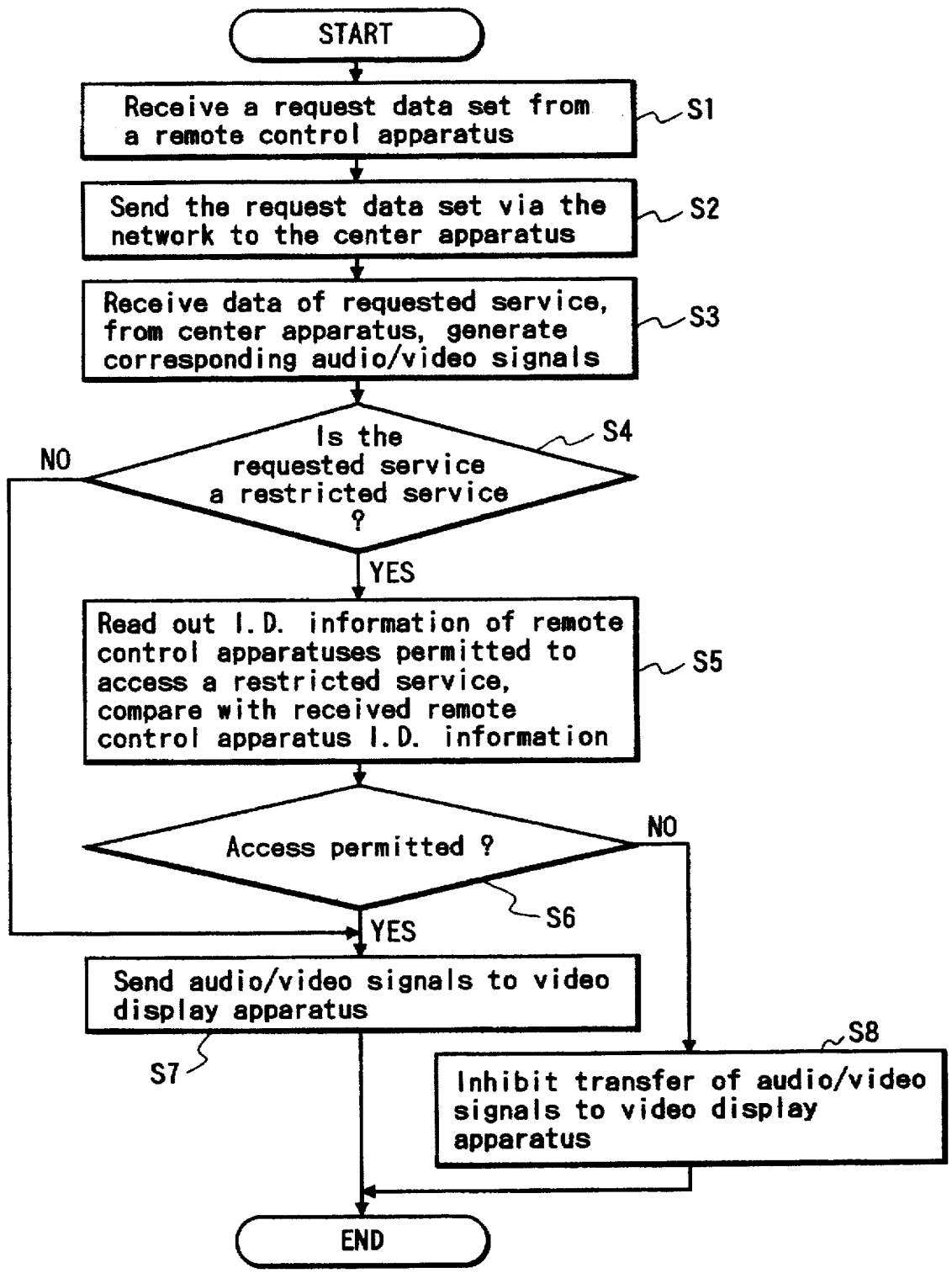
Figure 36:
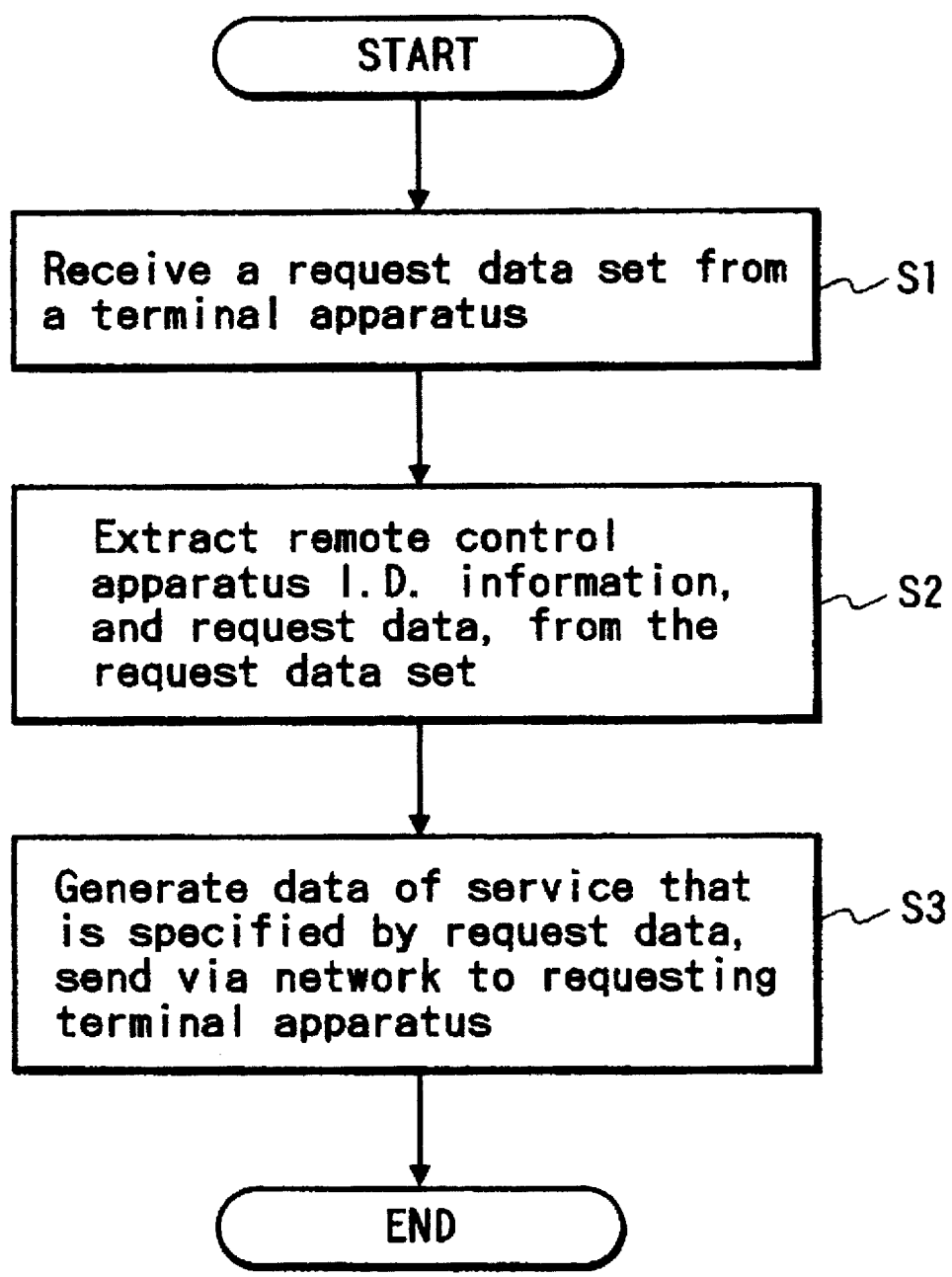

FIG. 34 shows the processing executed by the CPU of a remote control apparatus in an interactive television system according to such an embodiment, FIG. 35 shows the corresponding processing which is executed by the CPU of a terminal apparatus of this embodiment, while FIG. 36 shows the corresponding processing which is executed by the CPU of the center apparatus. In this case it is assumed that a restricted service is prevented from being provided to an unregistered user by the action of the terminal apparatus in inhibiting supply of video/audio data or signals to the corresponding display apparatus. However it would be equally possible to utilize other methods of prevention by the terminal apparatus, i.e. the terminal apparatus could simply omit to send a request data set to the center apparatus, if the request is for a restricted service, requested by an unregistered user.

Another embodiment of the invention will be described, whereby information which specifies respective services that are restricted to authorized users is held stored at the center apparatus, but whereby information which specifies respective remote control apparatus identifiers of remote control apparatuses assigned to authorized users is held stored at each terminal apparatus. With this embodiment too, the center apparatus holds service status data stored in memory, indicating those services which are restricted to being available only to registered users. When a service request is received by the center apparatus, i.e. a request data set is received as described for the preceding embodiments, the center apparatus checks to find if the requested service is a restricted service. If so, then the center apparatus superimposes a special code, which will be referred to as a restriction code, on the service data which are sent from the center apparatus to the terminal apparatus of the requesting user. If the terminal apparatus detects the presence of this restriction code in the received service data, then determines whether the requesting user is authorized to receive that service. If the user is not authorized, i.e. is not a registered user, then the terminal apparatus inhibits the service data from being displayed or made audible by the display apparatus.

The identification of a user by as being authorized, by a terminal apparatus, can be performed based on the remote control apparatus identifier of the remote control apparatus employed by the user, or based on user identifier information which is supplied when the user has been recognized by the remote control apparatus (i.e. in response to input of a password code, fingerprint recognition, or voice pattern recognition, as described above).

Figure 37:
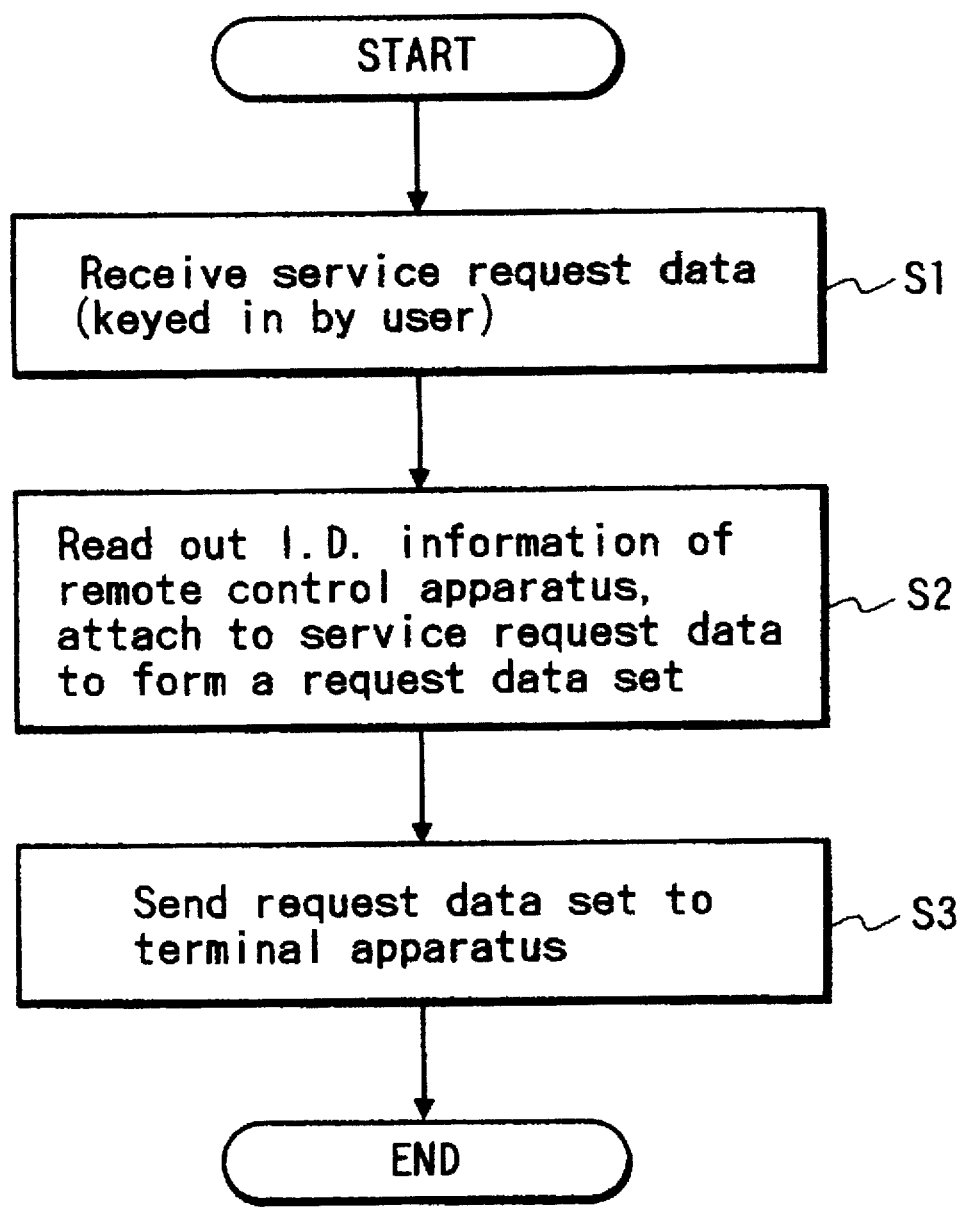
FIGS. 37, 38A, 38B and 39 are flow diagrams showing an example of the operations of a remote control apparatus, a terminal apparatus, and the center apparatus, of an interactive television system according to a seventh embodiment, whereby each terminal apparatus executes processing to selectively enable/inhibit the providing of requested services to users in accordance with whether a service is designated as restricted to authorized users (as indicated by a restriction code which is superimposed on the service data by the center apparatus) and a requesting user is identified as being an authorized user.
Figure 38A:
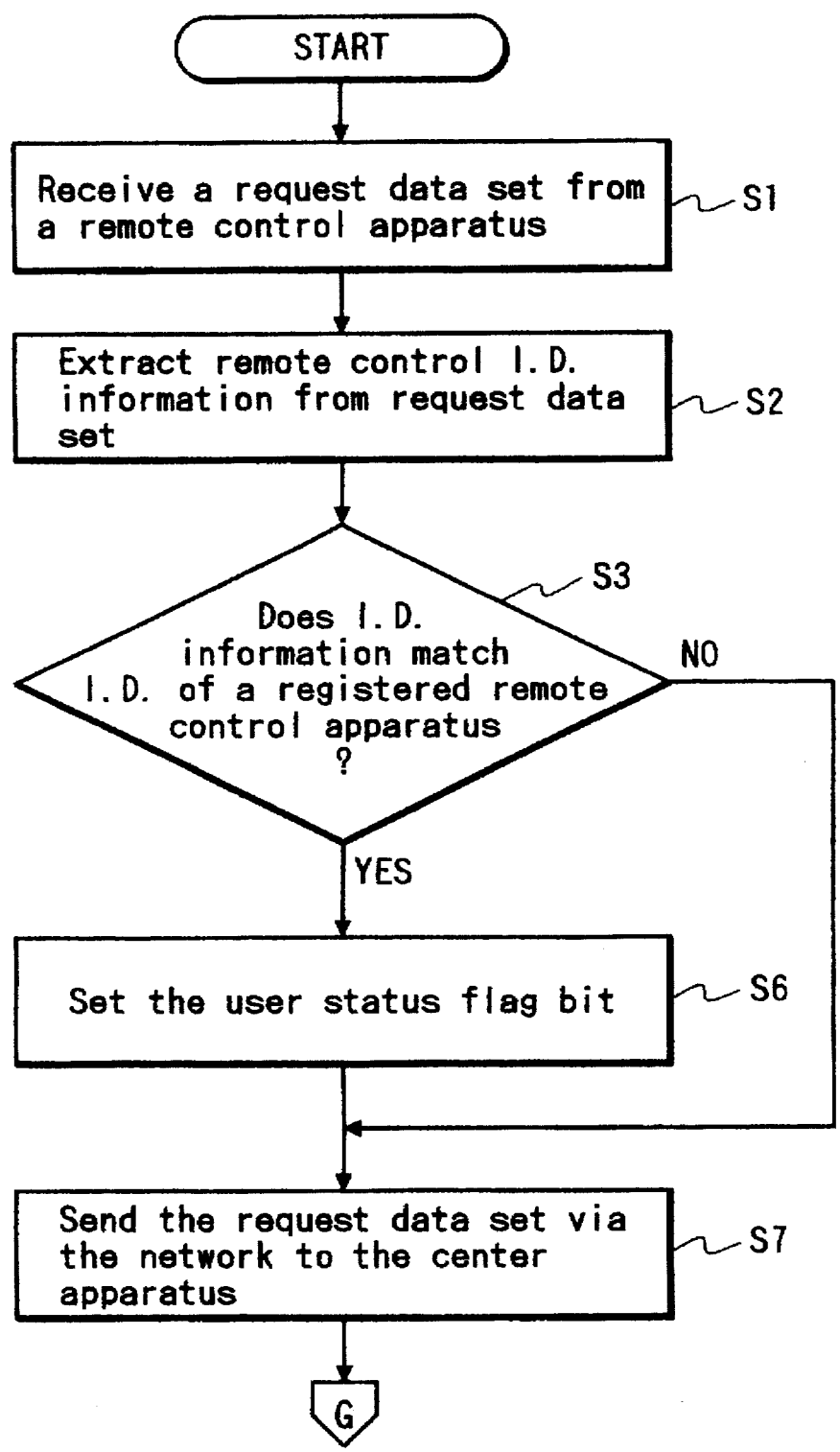
Figure 38B:
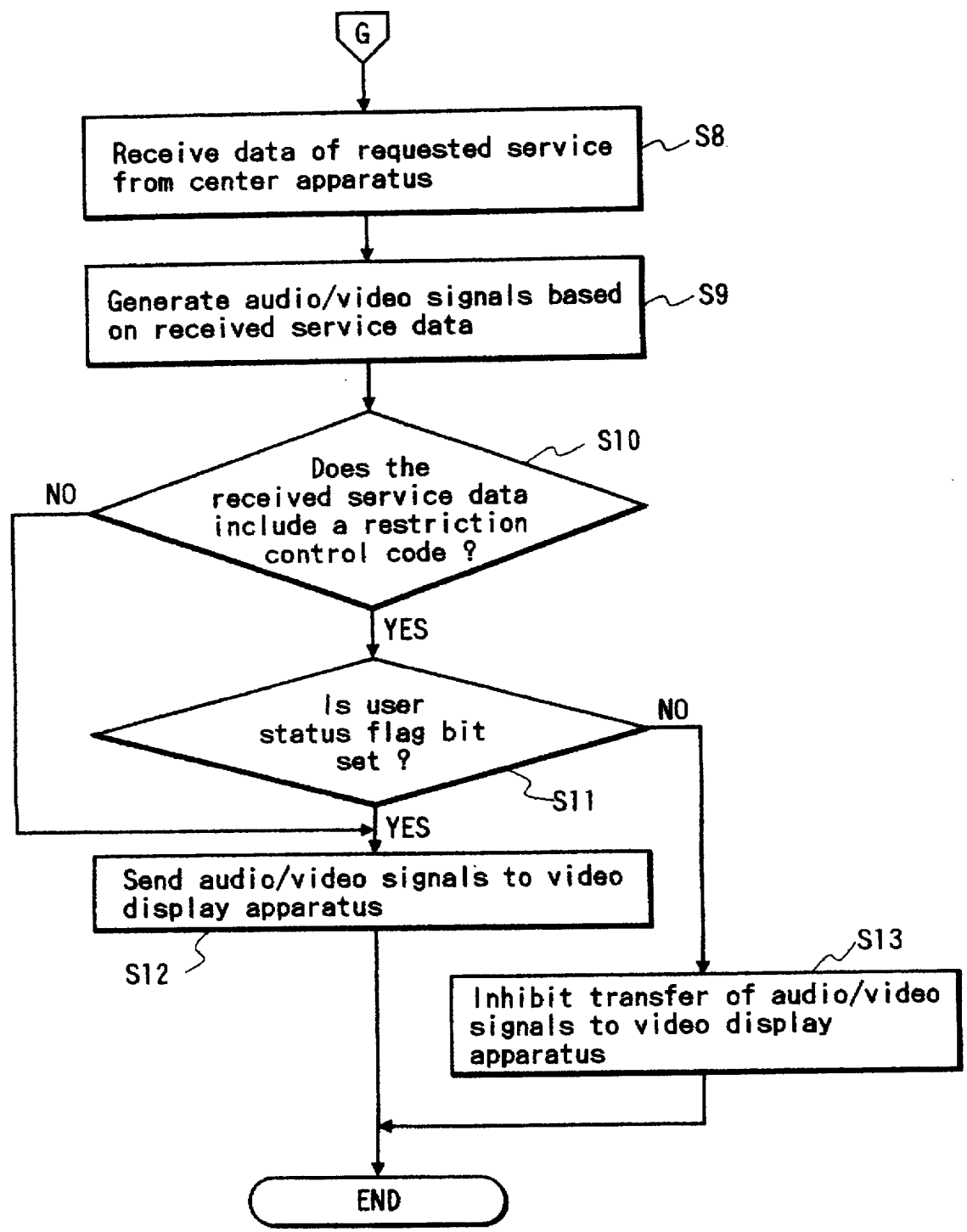
Figure 39:
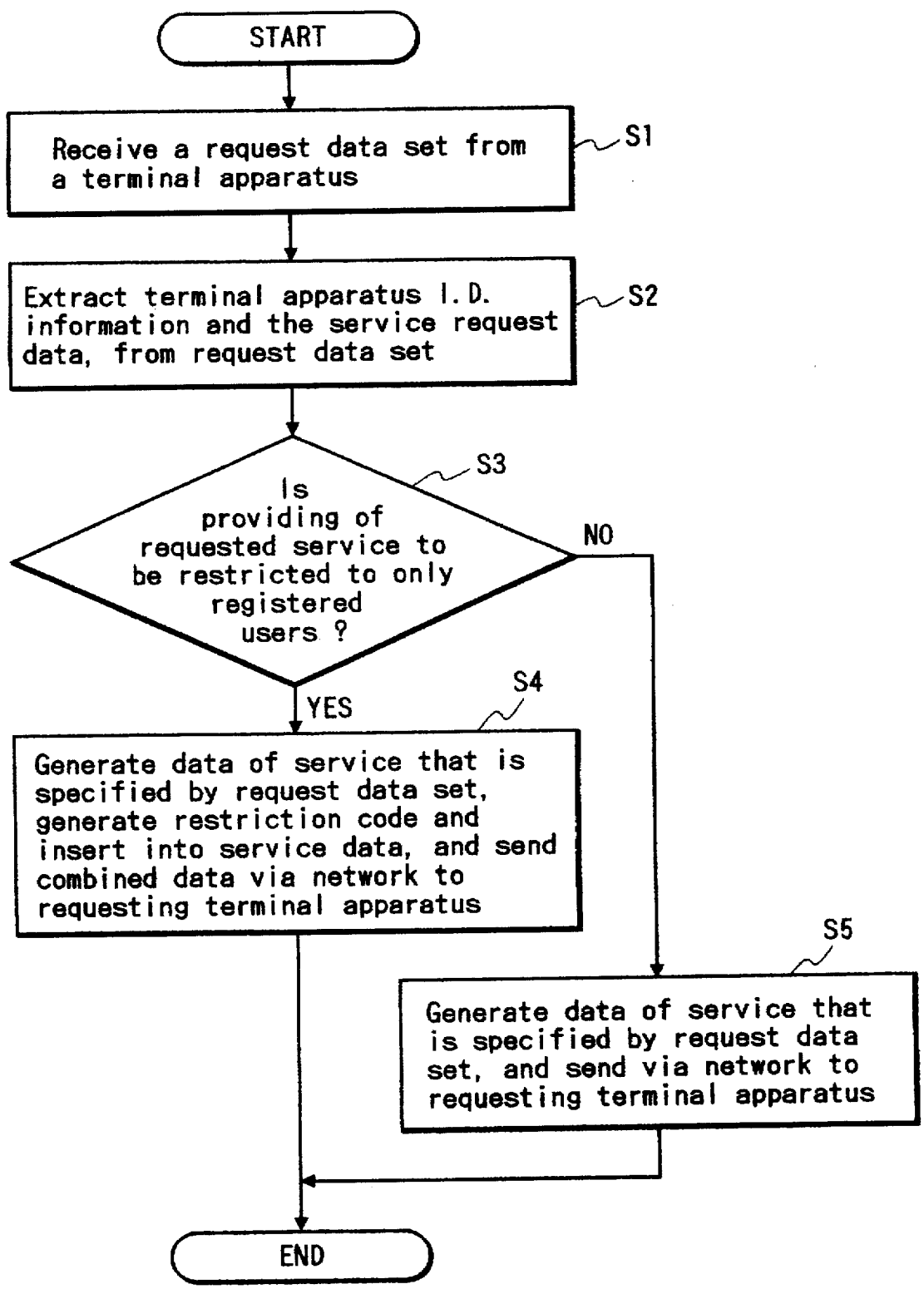
Figure 40:
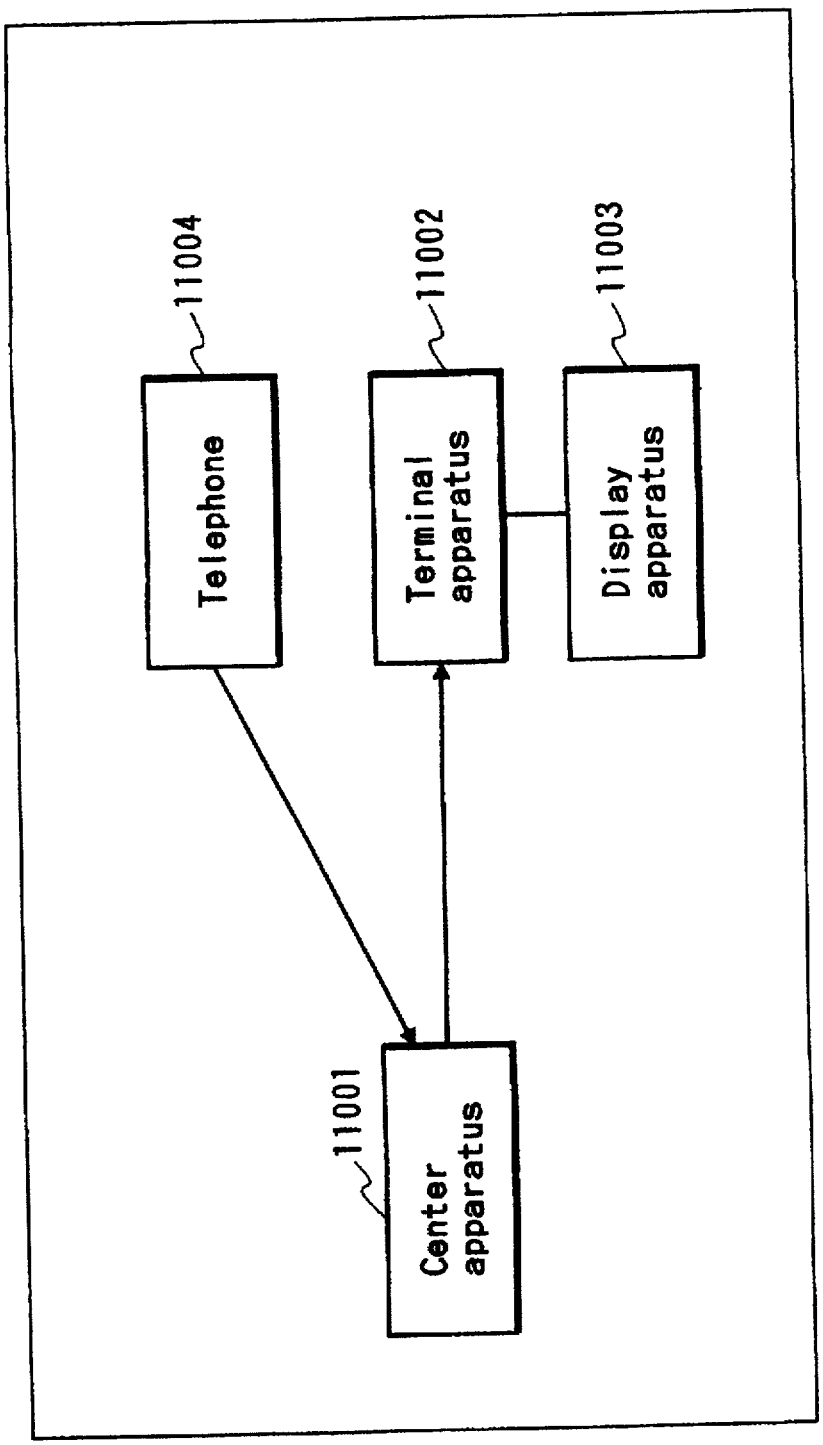
FIG. 40 is a basic conceptual system block diagram, showing the basic features of a prior art system for executing electronic polling by using television interactively.

FIG. 37 is a flow diagram of an example of the processing executed by-the CPU of a remote control apparatus in an interactive television system according to such an embodiment, assuming that each message data set, i.e. each service request data set, consists only of the service request data with the identifier of the originating remote control apparatus attached thereto. FIGS. 38A, 38B constitute a flow diagram of the corresponding processing which is executed by the CPU of a terminal apparatus of this embodiment, while FIG. 39 shows the corresponding processing which is executed by the CPU of the center apparatus.

In these flow diagrams, it is assumed for simplicity of description that identification of a user by as being authorized, by a terminal apparatus, is performed based on the remote control apparatus identifier of the remote control apparatus employed by the user. However as mentioned above, it would be equally possible to utilize recognition of individual users, to supply user identifier information from the remote control apparatuses to the terminal apparatus, for enabling the terminal apparatus to identify authorized users.

In addition, it would be possible to apply the principles of user recognition (i.e. by input of user-specifying information to a remote control apparatus) to an interactive television system which functions as an electronic polling system. That is to say, the first or second embodiments of the invention described above could be modified to include such a user recognition capability. In that case, each response data set which is sent from a remote control apparatus could be reliably identified by the user as originating from a specific user, or a member of a specific class of user, in spite of the fact that each remote control apparatus need not be exclusively assigned to the user of a specific user.

Preferably, the identifiers assigned to the remote control apparatuses and to the terminal apparatuses are respectively unique within the system, while the center apparatus holds information which relates the remote control apparatus identifiers to their respective terminal apparatus identifiers. In that case, it is unnecessary for the terminal apparatus identifier to be attached to data which are sent from a remote control apparatus via its terminal apparatus to the center apparatus. The center apparatus must store information relating each remote control apparatus identifier to the identifier of the corresponding terminal apparatus. Such an arrangement is assumed in the various embodiments of the invention described hereinafter. However that is not essential, and it would be equally possible to ensure only that the terminal apparatus identifiers are unique within the system, and to arrange that when data are sent from a remote control apparatus via its terminal apparatus to the center apparatus, both the remote control apparatus identifier and terminal apparatus identifier are attached. In that case, it becomes unnecessary for the center apparatus to store the aforementioned relationships between remote control apparatus identifiers and terminal apparatus identifiers, but requires greater amounts of data to be transmitted from the terminal apparatuses to the center apparatus via the CATV network.

In the above descriptions of embodiments, it has been assumed for simplicity of description that there are only two possible classes of users, i.e. registered and unregistered users, who are respectively permitted, or not permitted, to access the restricted services. However in general the invention is applicable to a multi-level arrangement for classifying users. That is to say, certain individual users, or a certain category of users, might be registered by the system as being permitted to access a specific set of services, while other users or another category of users would be registered as being permitted to access a different set of services. In that case, the center apparatus (or each terminal apparatus) would store respectively different sets of service status data for the different sets of restricted service, with such data being relationally linked to remote control identifiers of respectively different sets of remote control apparatuses, for example. The operation of the system in such a case could easily be envisaged, by extension from the descriptions of embodiments provided hereinabove. In that way it would be possible to provide a plurality of different levels of service which are intended for respectively different users of the system.

What is claimed is:

1. An interactive television system comprising a center apparatus, a plurality of terminal apparatuses, a plurality of display apparatus and a plurality of remote control apparatuses, said terminal apparatuses being respectively configured for bidirectional data communication with said center apparatus via a digital data communication network and each configured for receiving data by a wireless communication link from at least a corresponding one of said remote control apparatuses and for sending, to a corresponding one of said display apparatuses, data supplied thereto from said center apparatus;

wherein each said remote control apparatus comprises means for input of message data by a user, means for storing a predetermined remote control apparatus identifier, means for reading out and attaching at least said remote control apparatus identifier to said user message data to form a message data set, and means for sending said message data set via said wireless communication link to said terminal apparatus, each said terminal apparatus comprises means for storing a predetermined terminal apparatus identifier, means for receiving a message data set which is sent from a remote control apparatus, and means for sending said message data set to said center apparatus via said data communication network and means for receiving data sent from said center apparatus via said data communication network and for supplying at least a part of said received data to a corresponding one of said display apparatuses in a form suitable for display thereby, said center apparatus comprising means for storing data which relate each of said remote control apparatus identifiers to the terminal apparatus identifier of a corresponding one of said terminal apparatuses, means for receiving said message data set sent from a terminal apparatus, means for extracting said remote control apparatus identifier and said user message data from said message data set, means for generating resultant data in response to said user message data, and means for sending said resultant data via said network to the terminal apparatus having a terminal apparatus identifier which corresponds to the remote control apparatus identifier contained in said received message data set.

2. An interactive television system according to claim 1, wherein said wireless communication link which connects each remote control apparatus to a terminal apparatus is a bidirectional data communication link, wherein each said remote control apparatus comprises data display means, wherein said resultant data which are sent by said center apparatus to a terminal apparatus may include user-directed data which are directed to a specific remote control apparatus as designated by a remote control apparatus identifier, and wherein each said terminal apparatus comprises means for supplying said user-directed data to said specific remote control apparatus via said wireless communication link, to be displayed by said data display means of said remote control apparatus.

3. An interactive television system according to claim 2, wherein said center apparatus comprises means for judging each said received message data set in accordance with predetermined criteria, and for selectively generating, based on results of said judgement, said user-directed data, to be sent to a remote control apparatus which corresponds to a remote control apparatus identifier contained in said message data set.

4. An interactive television system according to claim 1, wherein each of said remote control apparatuses further comprises means for input of user-specifying data by a user, means for comparing said input user-specifying data with said stored user-specifying data to judge whether said user is a specific registered user, and means for determining the contents of said message data set in accordance with results of said judgement of the user-specifying data.

5. An interactive television system according to claim 4, wherein said means for inputting said user-specifying data comprises a plug-in integrated circuit card and interface means for electrically connecting said plug-in integrated circuit card to said remote control apparatus, said integrated circuit card having mounted thereon an integrated circuit operable for supplying data or signals which have been predetermined as being specific to an individual user.

6. An interactive television system according to claim 4 wherein said means for inputting said user-specifying data comprises key input means, manually actuatable by a user for inputting a password code which has been predetermined as being specific to an individual user.

7. An interactive television system according to claim 4, wherein said means for inputting said user-specifying data comprises fingerprint scanning means and fingerprint pattern processing means for operating on information obtained from said fingerprint scanning means to generate fingerprint pattern data, said stored user-specifying data comprising fingerprint pattern data which have been predetermined as being specific to an individual user.

8. An interactive television system according to claim 4, wherein said means for inputting said user-specifying data comprises microphone input means for generating an audio signal in response to voice input by a user, and voice pattern processing means for operating on said audio signal to derive voice pattern data, said stored user-specifying data comprising voice pattern data which have been predetermined as being specific to an individual user.

9. An interactive television system according to claim 1, wherein said interactive television system is operable to take a poll of respective users of said remote control apparatuses, wherein said user message data comprises polling response data, wherein each of said remote control apparatuses comprises means for storing personal attribute information relating to a corresponding user, and wherein said center apparatus comprises means for sending a polling request data set to each of said terminal apparatuses via said network said polling request data set including data specifying at least a requisite part of said set of personal attribute information and data specifying polling eligibility conditions, each said terminal apparatus comprises means for obtaining, from each of said remote control apparatus which communicate therewith, said requisite part of the personal attribute information, and means for using said obtained part in judging whether respective users of said remote control apparatus satisfy said polling eligibility conditions.

10. An interactive television system according to claim 1, wherein said interactive television system is operable to take a poll of respective users of said remote control apparatuses, wherein said user message data comprises polling response data, wherein each of said remote control apparatuses comprises means for storing a set of predetermined personal attribute information items relating to a corresponding user, and wherein said center apparatus comprises means for sending a polling request data set to each of said terminal apparatuses via said network, said polling request data set comprising polling request data, a personal attribute information list specifying a list of personal attribute information items, and polling eligibility conditions data for specifying conditions whereby a user is made eligible to participate in said polling, each said terminal apparatus comprises means for receiving said polling request data set, extracting said polling eligibility conditions data from said polling request data set and temporarily storing said polling eligibility conditions data, supplying said polling request data to be displayed by said corresponding data display apparatus, and sending said personal attribute information list to each of said corresponding remote control apparatuses;

each said remote control apparatus comprises means for receiving said personal attribute information list, means for extracting, from said stored set of personal attribute information items, specific personal attribute information items which are defined in said personal attribute information list, means for receiving said polling response data as data which are input by a user in response to said displayed polling request data, means for reading out said remote control apparatus identifier, attaching said remote control apparatus identifier and said extracted personal attribute information items to said polling response data to form a message data set, and means for sending said message data set to said corresponding terminal apparatus, and each said terminal apparatus comprises means for reading out said polling eligibility conditions data, extracting said personal attribute information items from said message data set, comparing said extracted personal attribute information items with said polling eligibility conditions data to judge the eligibility of said user to participate in said poll, and means for sending said message data set via said communication network to said center apparatus when said user is thereby judged to be eligible;

said center apparatus further comprising means for extracting said remote control identifier, said personal attribute information items and polling response data from each said message data set which is received thereby, means for storing said remote control identifiers, and means for storing said personal attribute information and polling response data of respective users in a predetermined relational manner, means for analyzing said personal attribute information and polling response data obtained from a plurality of users to thereby obtain polling result data, and means for sending said polling result data via said data communication network to said terminal apparatuses.

11. An interactive television system according to claim 10, wherein said center apparatus further comprises means for comparing each remote control apparatus identifier of a received message data set with respective remote control apparatus identifiers which have been previously received and stored, for thereby detecting reception of multiple responses from any of said remote control apparatuses, and means for inhibiting use of the polling response data an personal attribute information contained in said message data set in deriving said polling result data.

12. An interactive television system according to claim 11, wherein said wireless communication link which connects each remote control apparatus to a terminal apparatus is a bidirectional data communication link, wherein each said remote control apparatus comprises data display means, and wherein said center apparatus comprises means responsive to said detection of multiple responses from a remote control apparatus for generating data of a warning message, attaching said warning message data to the identifier of said remote control apparatus to form a warning message data set and for sending said warning message data set via said data communication network to the terminal apparatus having a terminal apparatus identifier which corresponds to the remote control apparatus identifier of said remote control apparatus, and wherein each said terminal apparatus comprises means responsive to receiving a warning message data set for extracting the remote control apparatus identifier therefrom and sending said warning message data to the corresponding remote control apparatus, to be displayed by said data display means of said remote control apparatus.

13. An interactive television system according to claim 1, wherein said interactive television system is operable to take a poll of respective users of said remote control apparatuses, said center apparatus comprises means for sending polling request data to each of said terminal apparatuses via said network, each said terminal apparatus comprises means for receiving said polling request data and supplying said polling request data to be displayed by said corresponding display apparatus, each said remote control apparatus is operable by a user to generate polling response data in response to said display of polling request data, and comprises means for reading out said remote control apparatus identifier, attaching said remote control apparatus identifier to said polling response data to form a message data set, and means for sending said message data set to said corresponding terminal apparatus, and each said terminal apparatus further comprises means for measuring, for each of said corresponding remote control apparatuses, an elapsed time amount which occurs from a commencement of said displaying of said polling request data until a message data set containing said polling response data is received from said remote control apparatus, and means for sending said elapsed time amounts in conjunction with respectively corresponding remote control apparatus identifiers, as resultant data, to said center apparatus via said data communication network, said center apparatus further comprising means for analyzing said resultant data received from said terminal apparatuses to obtain, as polling result data, data relating said remote control apparatus identifier to successively increasing values of said elapsed time amounts, and means for sending said polling result data to said terminal apparatuses.

14. An interactive television system according to claim 1, wherein said interactive television system is operable to take a poll of respective users of said remote control apparatuses, said center apparatus comprises means for sending polling request data to each Of said terminal apparatuses via said network, each said terminal apparatus comprises means for receiving said polling request data, for supplying said polling request data to be displayed by said corresponding display apparatus, each said remote control apparatus is operable to by a user to generate polling response data in response to said displaying of polling request data, and comprises means for reading out said remote control apparatus identifier, attaching said remote control apparatus identifier to said polling response data to form a message data set, and means for sending said message data set to said corresponding terminal apparatus, each said terminal apparatus further comprises means for measuring, for each of said corresponding remote control apparatuses, an elapsed time which amount occurs from a commencement of said displaying said polling request data until a message data set containing said polling response data is received by said terminal apparatus from said remote control apparatus, means for registering respective elapsed time amounts obtained for each of said corresponding remote control apparatuses in correspondence with respective remote control apparatus identifier, and means functioning, after a specific time duration has elapsed following said start of displaying said polling request data, to successively read out said elapsed time amounts, attach each said elapsed time amount to the corresponding remote control apparatus identifier, and sending resultant data to said center apparatus via said data communication network, said center apparatus further comprising means for analyzing said resultant data received from said terminal apparatuses to obtain, as polling result data, data relating said remote control apparatus identifiers to successively increasing values of said elapsed time amounts, and means for sending said polling result data to said terminal apparatuses.

15. An interactive television system according to claim 13 wherein said wireless communication link which connects each remote control apparatus to a terminal apparatus is a bidirectional data communication link, wherein each said remote control apparatus comprises data display means, wherein said center apparatus comprises means for selectively assigning said polling result data to be user-directed data which are directed to specific ones of said remote control apparatus as designated by respective remote control apparatus identifiers, and wherein each said terminal apparatus comprises means for supplying said user-directed data to said specific remote control apparatus via said wireless communication link to respective remote control apparatus corresponding to said remote control apparatus identifiers, to be displayed by said data display means of said remote control apparatus.

16. An interactive television system according to claim 15, wherein each said terminal apparatus sends said user-directed data, with remote control apparatus identifiers attached thereto, to each of the remote control apparatuses which are linked to said terminal apparatus, and wherein each said remote control apparatus comprises means for judging whether user-directed data sent thereto from the corresponding terminal apparatus has attached thereto a remote control identifier which is identical to the identifier of said remote control apparatus, and for displaying said user-directed data by the data display means of said remote control apparatus when said remote control apparatus identifiers are judged to be identical.

17. An interactive television system according to claim 14, wherein said wireless communication link which connects each remote control apparatus to a terminal apparatus is a bidirectional data communication link, wherein each said remote control apparatus comprises data display means, wherein said center apparatus comprises means for selectively assigning said polling result data to be user-directed data which are directed to specific ones of said remote control apparatus as designated by respective remote control apparatus identifiers, and wherein each said terminal apparatus comprises means for supplying said user-directed data to said specific remote control apparatus via said wireless communication link to respective remote control apparatus corresponding to said remote control apparatus identifiers, to be displayed by said data display means of said remote control apparatus.

18. An interactive television system comprising a center apparatus, a plurality of terminal apparatuses, a plurality of display apparatus and a plurality of remote control apparatuses, said center apparatus including means for selectively providing data of a plurality of services, each of said terminal apparatuses being configured for bidirectional data communication with said center apparatus via a digital data communication network, and configured for receiving data by a wireless communication link from at least a corresponding one of said remote control apparatuses and for sending, to a corresponding one of said display apparatus, service data which are supplied thereto from said center apparatus;

wherein each said remote control apparatus comprises means operable by a user for inputting service request data to request a specific one of said services, means for storing a predetermined remote control apparatus identifier, means for storing predetermined user-specifying data which is specific to an individual user, means for storing a predetermined user identifier which is specific to said individual user, means for input of user-specifying data by a user, means for comparing said input user-specifying data with said stored user-specifying data to achieve recognition of said specific individual user, means functioning when said recognition has been achieved, in response to input of said service request data, for reading out said user identifier and said remote control apparatus identifier and for attaching said user identifier and said remote control apparatus identifier to said service request data to form a message data set, and functioning, when said recognition has not been achieved, to attach said remote control apparatus identifier to said service request data to form a message data set, and means for sending said message data set via said wireless communication link to said terminal apparatus;

wherein each said terminal apparatus comprises means for receiving a message data set sent from a remote control apparatus, and means for sending said message data set to said center apparatus via said data communication network;

and wherein said center apparatus further comprises means for storing information which relates each of said remote control apparatus identifiers to the terminal apparatus identifier of the corresponding one of the terminal apparatuses, means for receiving respective ones of said message data sets from said terminal apparatuses sent via said network, means for extracting said remote control apparatus identifier and said service request data from each said message data set, means for extracting said user identifier from each said message data set which contains said user identifier, means for storing user status data designating at least one of said user identifiers as as that of a registered user, means for storing service status data designating at least one of said plurality of services as being a restricted service, available only to registered users, means responsive to receiving a message data set which contains a user identifier for judging, based on said user status data, said service status data and said user identifier, whether a service specified by the service request data of said message data set is a restricted service which is available to the requesting user corresponding to the user identifier of said message data set, or is a service which is available to all users, and means functioning when it is judged that said service specified by the service request data of a message data set is available to said user, for providing the corresponding service data and sending said service data via said network to the terminal apparatus having a terminal apparatus identifier which corresponds to the remote control apparatus identifier contained in said received message data set.

19. An interactive television system according to claim 18, wherein said means for inputting said user-specifying data comprises a plug-in integrated circuit card and interface means for electrically connecting said plug-in integrated circuit card to said remote control apparatus, said integrated circuit card having mounted thereon an integrated circuit operable for supplying data or signals which have been predetermined as being specific to an individual user.

20. An interactive television system according to claim 18, wherein said means for inputting said user-specifying data comprises key input means, manually actuatable by a user for inputting a password code which has been predetermined as being specific to an individual user.

21. An interactive television system according to claim 18, wherein said means for inputting said user-specifying data comprises fingerprint scanning means and fingerprint pattern processing means for operating on information obtained from said fingerprint scanning means to generate fingerprint pattern data, said stored user-specifying data comprising fingerprint pattern data which have been predetermined as being specific to an individual user.

22. An interactive television system according to claim 18, wherein said means for inputting said user-specifying data comprises microphone input means for generating an audio signal in response to voice input by a user, and voice pattern processing means for operating on said audio signal to derive voice pattern data, said stored user-specifying data comprising voice pattern data which have been predetermined as being specific to an individual user.

23. An interactive television system according to claim 18, wherein each said remote control apparatus comprises data encryption means for encrypting said user identifier before sending to said terminal apparatus as part of a message data set, and wherein each said terminal apparatus further comprises data decryption means for decrypting an encrypted user identifier.

24. An interactive television system according to claim 18, wherein each said remote control apparatus comprises key input means, actuatable by a user for inputting said service request data.

25. An interactive television system according to claim 18, wherein each said remote control apparatus comprises bar code scanner means, operable to acquire said service request data by scanning a bar code which appears on printed matter.

26. An interactive television system according to claim 25, wherein each said remote control apparatus further comprises temporary data storage means for storing a plurality of service request data items which are successively acquired by said scanning of respective bar codes, means operable for designating that acquisition of said plurality of service request data items has been completed, and means responsive to said designation that said acquisition has been completed for reading out said plurality of service request data items from said temporary data storage means, reading out said remote control apparatus identifier and attaching said identifier to said plurality of service request data items to form a message data set, and means for sending said message data set via said wireless communication link to said terminal apparatus.

27. An interactive television system according to claim 25, wherein said wireless communication link which connects each remote control apparatus to a terminal apparatus is a bidirectional data communication link, wherein each said remote control apparatus comprises data display means, and wherein each said remote control apparatus further comprises temporary data storage means for storing a plurality of service request data items which are successively acquired by said scanning of respective bar codes, means for reading out said plurality of stored service request data items, generating display data for displaying said plurality of stored service request data items in the form of a menu, and supplying said display data to said data display means of the remote control apparatus, means operable for designating at least one of said plurality of stored service request data items, as displayed in said menu, as a selected service request data item, means for reading out said selected service request data item from said temporary data storage means, reading out said remote control apparatus identifier and attaching said identifier to said selected service request data item to form a message data set, and means for sending said message data set via said wireless communication link to said terminal apparatus.

28. An interactive television system comprising a center apparatus, a plurality of terminal apparatuses, a plurality of display apparatus and a plurality of remote control apparatuses, said center apparatus including means for selectively provide data of a plurality of services, each of said terminal apparatuses being configured for bidirectional data communication with said center apparatus via a digital data communication network, and configured for receiving data by a wireless communication link from at least a corresponding one of said remote control apparatuses and for sending, to a corresponding one of said display apparatus, service data which are supplied thereto from said center apparatus;

wherein each said remote control apparatus comprises means for storing a predetermined remote control apparatus identifier, means operable by a user for inputting service request data to request a specific one of said services, means for reading out and attaching said remote control apparatus identifier to said service request data to form a message data set, and means for sending said message data set via said wireless communication link to said terminal apparatus, wherein each said terminal apparatus comprises means for storing a predetermined terminal apparatus identifier, means for receiving a message data set sent from a remote control apparatus, means for reading out and attaching said terminal apparatus identifier to said message data set to form a message data set, and means for sending said message data set to said center apparatus via said data communication network, and wherein said center apparatus further comprises
means for storing information which relates each of
said remote control apparatus identifiers to the terminal
apparatus identifier of the corresponding one of the
terminal apparatuses,
means for receiving respective ones of said message
data sets from said terminal apparatuses sent via said
network,
means for extracting said remote control apparatus
identifier and said service request data from each
said message data set,
means for storing service status data designating at
least one of said plurality of services as being a
restricted service, available only to users of registered remote control apparatuses,
means for storing information specifiying identifiers of
registered remote control apparatuses,
means for judging, based on said service status data,
information specifying registered remote control
apparatuses, and the remote control apparatus identifier contained in a received message data set,
whether a service specified by the service request
data of said message data set is a restricted service
which is available to the user of the remote control
apparatus having said remote control apparatus
identifier, or is a service which is available to all
users, and
means functioning when it is judged that said service
specified by the service request data of a message
data set is available to said user, for providing the
corresponding service data and sending said service
data via said network to the terminal apparatus
having a terminal apparatus identifier corresponding
to said remote control apparatus identifier which is
contained in said received message data set.

29. An interactive television system comprising a center
apparatus, a plurality of terminal apparatuses, a plurality of
display apparatus and a plurality of remote control
apparatuses, said center apparatus including means for
selectively provide data of a plurality of services, each of
said terminal apparatuses being configured for bidirectional
data communication with said center apparatus via a digital
data communication network, and configured for receiving
data by a wireless communication link from at least a
corresponding one of said remote control apparatuses and
for sending, to a corresponding one of said display
apparatus, service data which are supplied thereto from said
center apparatus;
wherein each said remote control apparatus comprises
means for storing a predetermined remote control apparatus identifier,
means operable by a user for inputting service request
data to request a specific one of said services,
means for reading out and attaching said remote control
apparatus identifier to said service request data to
form a message data set, and
means for sending said message data set via said
wireless communication link to said terminal apparatus;
wherein each said terminal apparatus comprises
means for storing a predetermined terminal apparatus
identifier,
means for receiving a message data set sent from a
remote control apparatus,
means for storing service status data designating at
least one of said plurality of services as being a
restricted service, available only to users of registered remote control apparatuses,
means for storing information specifiying respective
identifiers of registered remote control apparatuses,
means for judging, based on said service status data,
information specifying identifiers of registered
remote control apparatuses, and the remote control
apparatus identifier contained in said received message data set, whether a service specified by the
service request data of said message data set is a
restricted service which is available to the user of the
remote control apparatus having said remote control
apparatus identifier, or is a service which is available
to all users, and
means functioning when it is judged that said service
specified by the service request data of said message
data set is available to said user, for sending said
message data set to said center apparatus via said
data communication network;
and wherein said center apparatus further comprises
means for storing information which relates each of
said remote control apparatus identifiers to the terminal
apparatus identifier of the corresponding one of the
terminal apparatuses,
means for receiving respective ones of said message
data sets from said terminal apparatuses sent via said
network, and
means for extracting said remote control apparatus
identifier and said service request data from each
said received message data set, providing the corresponding service data, and sending said service data
via said network to the terminal apparatus having a
terminal apparatus identifier corresponding to said
remote control apparatus identifier which is contained in said received message data set.

30. An interactive television system comprising a center
apparatus, a plurality of terminal apparatuses, a plurality of
display apparatuses and a plurality of remote control
apparatuses, said center apparatus including means for
selectively provide data of a plurality of services, each of
said terminal apparatuses being configured for bidirectional
data communication with said center apparatus via a digital
data communication network, and configured for receiving
data by a wireless communication link from at least a
corresponding one of said remote control apparatuses and
for sending, to a corresponding one of said display
apparatuses, service data which are supplied thereto from
said center apparatus;
wherein each said remote control apparatus comprises
means for storing a predetermined remote control apparatus identifier,
means operable by a user for inputting service request
data to request a specific one of said services,
means for reading out and attaching said remote control
apparatus identifier to said service request data to
form a message data set, and
means for sending said message data set via said
wireless communication link to said terminal apparatus;
wherein each said terminal apparatus comprises means for
receiving a message data set sent from a remote control
apparatus, and means for sending said message data set
to said center apparatus via said data communication
network;
wherein said center apparatus comprises means for storing information which relates each of said remote
control apparatus identifiers to the terminal apparatus
identifier of the corresponding one of the terminal
apparatuses, means for receiving respective ones of said message data sets from said terminal apparatuses sent via said network, means for extracting said remote control apparatus identifier and said service request data from each said message data set, means for storing service status data designating at least one of said plurality of services as being a restricted service, available only to users of registered remote control apparatuses, means functioning, when said service status data indicates that a service specified in a received message data set is a restricted service, for combining a restriction code within service data corresponding to said specified service and sending resultant combined data via said network to the terminal apparatus corresponding to the terminal apparatus identifier which is contained in said message data set, and functioning, when said service status data indicates that said specified service is not a restricted service, for providing said service data corresponding to the specified service and sending said service data directly via said network to the terminal apparatus having a terminal apparatus identifier corresponding to said remote control apparatus identifier which is contained in said received message data set;

wherein each said terminal apparatus further comprises
means for receiving service data which have been sent by said center apparatus via said network in response to a message data set, means for detecting that said received service data includes said restriction code, means for storing remote control apparatus status information specifying at least one remote control apparatus identifier as the identifier of a registered remote control apparatus, means for operating on said remote control apparatus status information and the remote control apparatus identifier contained in said message data set, for judging whether said message data set has been issued by a registered remote control apparatus, and means functioning when said received service data includes said restriction code and said message data set is judged to be a registered remote control apparatus, or when said received service data does not include said restriction code, for supplying said service data to be displayed by said corresponding display apparatus, and otherwise for inhibiting displaying of said service data by said display apparatus.

* * * * *